United States Patent [19]

Shiroto et al.

[11] 4,444,655

[45] Apr. 24, 1984

[54] HYDROTREATMENT OF HEAVY HYDROCARBON OILS CONTAINING ASPHALTENES, AND CATALYSTS THEREFOR

[75] Inventors: Yoshimi Shiroto, Yokohama; Takeo Ono, Kawasaki; Sachio Asaoka; Munekazu Nakamura, both of Yokohama, all of Japan

[73] Assignee: Chiyoda Chemical Engineering & Construction Co., Ltd., Yokohama, Japan

[21] Appl. No.: 428,796

[22] Filed: Sep. 30, 1982

Related U.S. Application Data

[62] Division of Ser. No. 210,059, Nov. 24, 1980.

[30] Foreign Application Priority Data

Feb. 19, 1980 [JP] Japan .................................. 55-19596

[51] Int. Cl.³ ............................................. C10G 45/04
[52] U.S. Cl. ............................... 208/210; 208/216 PP; 208/251 H; 208/97; 208/111
[58] Field of Search ............. 208/210, 216 PP, 251 H, 208/97, 111

[56] References Cited

U.S. PATENT DOCUMENTS

| | | | |
|---|---|---|---|
| 3,622,500 | 11/1971 | Alpert et al. | 208/216 PP |
| 3,891,541 | 6/1975 | Ouck et al. | 208/251 H |
| 4,016,069 | 4/1977 | Christman et al. | 208/210 |
| 4,081,406 | 3/1978 | Sawyer | 252/465 X |
| 4,297,242 | 10/1981 | Hensley et al. | 252/465 |
| 4,328,127 | 4/1982 | Angeine et al. | 208/216 PP |
| 4,340,466 | 7/1982 | Inecka | 208/210 |

Primary Examiner—Delbert E. Gantz
Assistant Examiner—Cynthia A. Prezlock
Attorney, Agent, or Firm—Armstrong, Nikaido, Marmelstein & Kubovcik

[57] ABSTRACT

A catalyst for hydrotreating a heavy hydrocarbon oil containing asphaltenes comprises a porous carrier composed of one or more inorganic oxides of at least one element selected from among those of Groups II, III and IV of the Periodic Table, and at least one catalytic metal component composited with the carrier. The metal of the catalytic metal component is selected from among those of Groups VB, VIB, VIII and IB of the Periodic Table. The catalyst contains about 1 to 30% by weight of such catalytic metal component and has the following pore characteristics with regard to its pores having a diameter of 75 Å or more: an average pore diameter APD of about 180 to 500 Å, a total pore volume PV, expressed in cc/g, being equal to or greater than a value X $$X = \frac{0.46}{1 - \left(\frac{100}{APD}\right)^2},$$

the volume of pores with a diameter of about 180 to 500 Å being at least about 0.2 cc/g, the volume of pores with a diameter of at least 1,500 Å being not greater than about 0.03 cc/g, and a total surface area being at least about 60 m²/g. The catalyst has an average catalyst diameter ACD, expressed in millimeters, of not greater than a value of the formula, ACD=(APD/100)⁰·⁵. Disclosed also are a method of preparing such a catalyst, and a process for hydrotreating a heavy hydrocarbon oil containing asphaltenes in the presence of such a catalyst.

15 Claims, 15 Drawing Figures

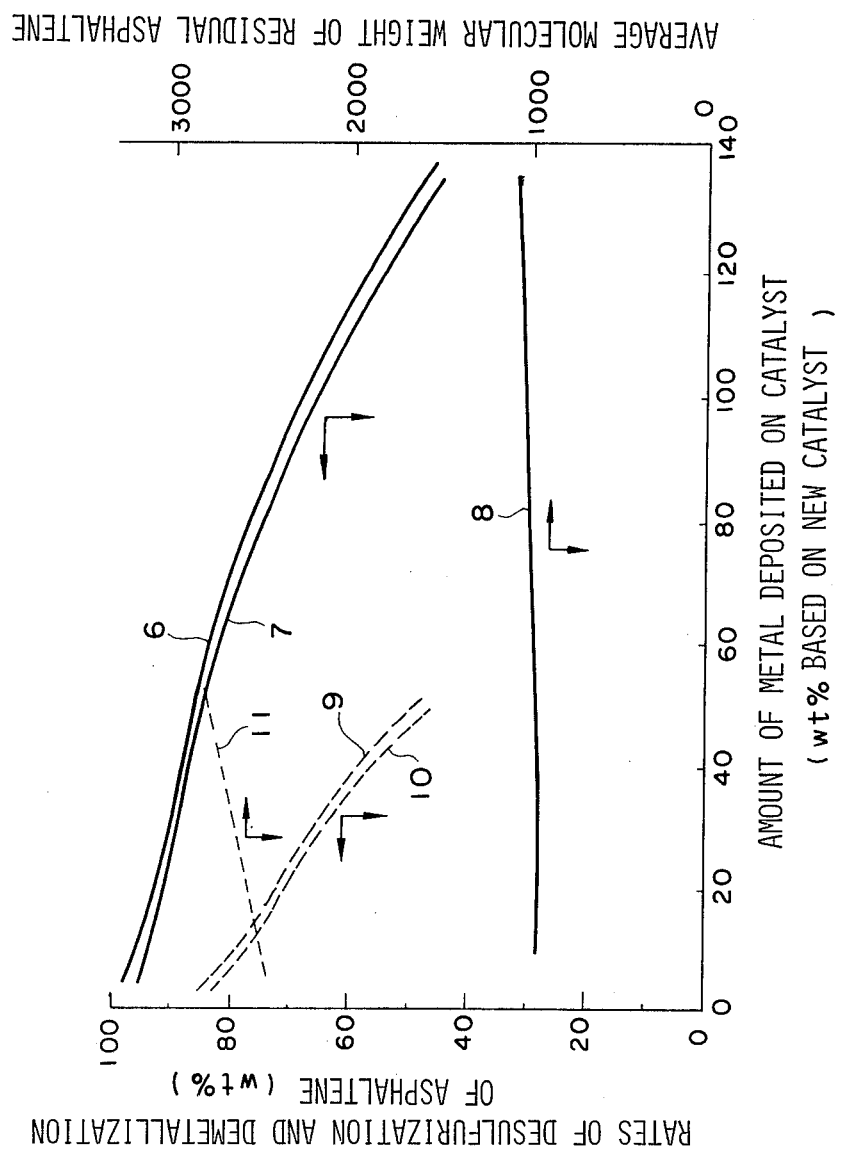
F I G. 3

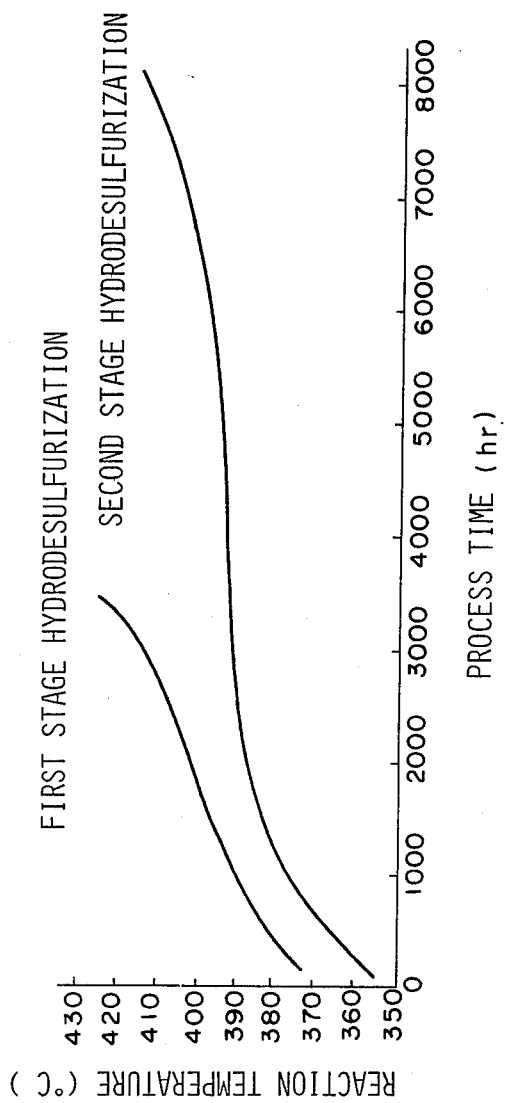

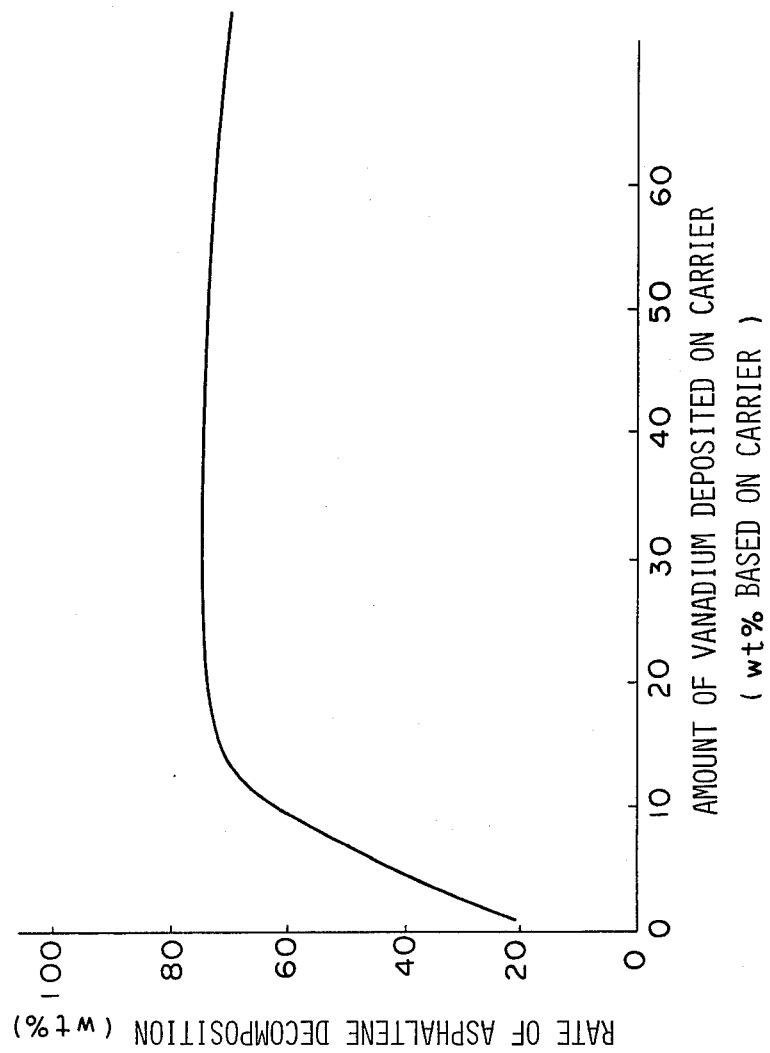

HYDROTREATMENT OF HEAVY HYDROCARBON OILS CONTAINING ASPHALTENES, AND CATALYSTS THEREFOR

This is a division of application Ser. No. 210,059, filed Nov. 24, 1980.

BACKGROUND OF THE INVENTION

1. Field of the Invention:

This invention relates to a novel and improved catalyst which is effective for the treatment of a heavy hydrocarbon oil containing asphaltenes, especially for the decomposition and conversion of asphaltenes into lower molecular compounds, and the removal of metals and sulfur from asphaltenes. This invention is also directed to a method of preparing such a catalyst and to a process for hydrotreating an asphaltene-containing heavy hydrocarbon oil using such a catalyst.

2. Description of the Prior Art:

The heavy hydrocarbon oils to which this invention is applicable include reduced crude oils, vacuum residues, certain crude oils produced in South America, etc., heavy oils extracted from tar sand or oil sand produced in Canada, etc., and mixtures thereof. These hydrocarbon oils usually contain asphaltenes, heavy metals, sulfur compounds, nitrogen compounds, or the like. The term "asphaltene" used herein means a substance which is insoluble in normal heptane (n-heptane), and mostly composed of high molecular condensed aromatic compounds. These compounds are associated with one another to form micellar colloids in heavy oils. Specific examples of such heavy hydrocarbon oils include high-asphaltene and high-heavy metal Venezuelan crude oil having a specific gravity (ÅPI) of 9.4, an asphaltene content of 11.8% by weight, a vanadium content of 1,240 ppm, a sulfur content of 5.36% by weight and a nitrogen content of 5,800 ppm, atmospheric residues from Canadian tar sand extracted oil and having a specific gravity (ÅPI) of 9.2, an asphaltene content of 8.1% by weight, a vanadium content of 182 ppm, a sulfur content of 4.41% by weight and a nitrogen content of 4,200 ppm, and vacuum residue of Middle and Near East oil and having a specific gravity (ÅPI) of 5.1, an asphaltene content of 14.6% by weight, a vanadium content of 165 ppm, a sulfur content of 5.24% by weight and a nitrogen content of 4,000 ppm.

Table 1 shows properties of typical heavy hydrocarbon oils. In the table, the letters A to F indicate the following oils, respectively:

TABLE 1

| | Properties of feedstock oils | | | | | |
|---|---|---|---|---|---|---|
| | A | B | C | D | E | F |
| Specific gravity, ÅPI | 9.4 | 9.2 | 5.1 | 4.8 | 6.0 | 16.4 |
| Carbon, wt % | 83.06 | 83.11 | 83.11 | 84.85 | 83.42 | 85.35 |
| Hydrogen, wt % | 10.49 | 10.50 | 10.05 | 10.36 | 10.12 | 11.50 |
| Sulfur, wt % | 5.36 | 4.41 | 5.24 | 3.67 | 5.25 | 2.62 |
| Nitrogen, wt % | 0.58 | 0.42 | 0.40 | 0.65 | 0.42 | 0.36 |
| Conradson carbon residue, wt % | 15.8 | 13.5 | 23.8 | 21.6 | 23.0 | 8.88 |
| Asphaltenes, wt % | 11.8 | 8.1 | 14.6 | 7.8 | 4.9 | 2.87 |
| Metals, wt ppm | | | | | | |
| Ni | 106 | 79 | 53 | 92 | 35 | 42 |

TABLE 1-continued

| | Properties of feedstock oils | | | | | |
|---|---|---|---|---|---|---|
| | A | B | C | D | E | F |
| V | 1,240 | 182 | 165 | 298 | 117 | 130 |

A: Boscan crude oil
B: Athabasca bitumen
C: Khafji vacuum residue
C: Gach Saran vacuum residue
E: Kuwait vacuum residue
F: Gach Saran atmospheric residue As shown above, a heavy hydrocarbon oil contains a very large amount of impurities, such as sulfur and nitrogen compounds, vanadium and nickel. Such impurities are contained in the asphaltene fraction in concentrated state, and make catalytic hydrodesulfurization difficult. Heavy hydrocarbon oils having such a high content of asphaltenes exist abundantly in nature, and while they are considered as promising hydrocarbon resources, they are presently used merely for producing extremely low grade fuel oil or asphalt for pavement of roads. When these heavy hydrocarbon oils are used as fuel and burnt, they produce oxides of sulfur, nitrogen, heavy metal, etc. which cause air pollution. Despite these disadvantages, heavy hydrocarbon oils containing asphaltenes and heavy metals are important under the present political and economical situation facing energy crisis due to the depletion of high quality petroleum resources in the near future. It is strongly desired to develop technology which is effective for converting those heavy hydrocarbon oils to more useful hydrocarbon oils containing no substance causing environmental pollution, and which are substantially free from any asphaltenes or heavy metals.

Various kinds of catalysts and desulfurization processes have been proposed for hydrodesulfurization of a heavy hydrocarbon oil having a relatively low asphaltene and heavy metal content to obtain a higher grade desulfurized oil, and some of them have already been used commercially. A typical process employs a fixed or ebullated bed by which a heavy hydrocarbon oil is hydrodesulfurized directly. The development of this direct hydrodesulfurization process is largely attributable to the improved catalyst performance [M. W. Raney, Chemical Technology Review No. 54, "Desulfurization of Petroleum", Noyes Data Corporation, New Jersey (1975)]. It is, however, well known among those of ordinary skill in the art of petroleum refining that a number of economical disadvantages may result from the use of this process if the oil to be treated contains large amounts of asphaltenes and heavy metals, because the macromolecules of asphaltenes are colloidally dispersed in the oil and are not able to diffuse easily into the active sites in the pores of the catalyst. This seriously inhibits the hydrocracking of asphaltenes, and the presence of the asphaltenes inhibits desulfurization and other reactions for hydrotreating the hydrocarbon oil. Another obstacle to the practical application of the direct hydrodesulfurization process lies in the formation of coke and carbonaceous materials highly promoted by the presence of asphaltenes, leading to a sharp reduction in the activity of the catalyst. The formation of such carbonaceous materials does not only occur in the intraparticles of the catalyst, but also in the interparticles among the catalyst particles. If the feedstock oil contains a large amount of asphaltenes, an increased amount of carbonaceous material derived from asphaltenes is deposited into the spaces among the catalyst particles, and the gummy carbonaceous sediment unites the catalyst particles together. This causes blocking of the catalyst particles and plugging of the catalyst bed, so that there occur serious problems, such as maldistribution of the reactant flow through the bed, and an increased differential pressure across the bed.

A further serious disadvantage of the direct hydrodesulfurization process resides in an extremely shortened catalyst life which is due to the poisoning and pore-plugging action of the metals contained abundantly in the feedstock oil, namely due to the metal deposition on the catalyst active surfaces.

The catalytic hydrotreatment of heavy hydrocarbon oils, using the conventional catalyst, requires an extremely high catalyst consumption relative to the amount of the oil being handled, and even if the aforementioned disadvantages may have been overcome, the conventional catalysts make it imperative to set severe conditions for the reactions, which accelerate catalyst deactivation, in the event the operation is primarily intended for decomposing asphaltenes selectively to obtain light oil. Moreover, a high rate of gasification resulting from the secondary cracking of light oil prevents production of light oil at a high yield, and an increased hydrogen consumption causes a serious problem in the economy of the operation. It has also been pointed out that the gummy matter contained in the product oil lowers its thermal stability, and that sludge material is likely to settle down, causing phase separation (U.S. Pat. No. 3,998,722). Accordingly, in order to obtain a low sulfur fuel oil by hydrodesulfurization of a heavy hydrocarbon oil having high asphaltene and heavy metal contents, e.g., containing at least about 5% by weight of asphaltenes and at least about 80 ppm of vanadium, pretreatment of the heavy hydrocarbon oil has currently been required [C. T. Douwes, J. Van Klinken et al., 10th World Petroleum Congress, Bucharest, 1979, PD-18(3)]. A variety of processes have been proposed for the pretreatment, and can be classified into the following two groups. One of the groups covers the processes for removing asphaltenes and heavy metals from the feedstock oil by extraction, such as solvent deasphalting or otherwise physically, or by heat treating, such as coking. These methods, however, produce a considerably large quantity of by-products, such as deasphalting residue (asphalt) or coke, and the effective utilization of these heavy by-products is not feasible, since they contain highly concentrated impurities, such as heavy metals, sulfur and nitrogen. As the quantity of the by-products increases with an increase in the asphaltene content of the feedstock oil, the application of these processes is not effective.

Another group involves hydrotreatment of a heavy hydrocarbon oil in the presence of an appropriate catalyst, mainly for the hydrodemetallization thereof to thereby reduce the poisoning to the catalyst by heavy metals in the subsequent catalytic hydroprocessing. There have been proposed various types of catalysts and processes for such pretreatments. For example, there are known demetallization processes using inexpensive catalysts, such as natural minerals containing alumina, such as bauxite, ores such as manganese nodules and nickel ore, and industrial waste such as red mud and spent desulfurization catalysts (U.S. Pat. Nos. 2,687,985, 2,769,758, 2,771,401, 3,839,187, 3,876,523, 3,891,541 and 3,931,052 and Japanese Laid-Open Patent Applications Nos. 13236/1972, 21688/1973, 5402/1974, 121805/1974, 122501/1974, 78203/1978 and 3481/1979). These catalysts are, however, unsatisfactory. Some of them have certainly high activity for demetallization, but still encounter the problem of deactivation by metal deposition because they have a small pore diameter or an insufficient pore volume. Other catalysts have an insufficient surface area resulting in an insufficient activity for demetallization, thereby requiring the treatment to be carried out in a relatively high temperature operation. Consequently, carbonaceous matter is formed by polycondensation, etc. of high molecular compounds such as asphaltenes, and the catalysts are strongly deactivated by coke. Thus, these pretreatment methods are faced with a number of problems, such as reduction in the activity of the demetallization catalyst during continuous operation, and necessity of the regeneration or disposal of the spent catalyst. Although demetallization with such catalysts may to some extent reduce the poisoning of the catalyst by heavy metals in the subsequent desulfurization processing, it hardly serves to remove macromolecules of asphaltenes from a heavy oil, and leaves outstanding problems of catalyst poisoning, plugging, or the like by asphaltenes.

There have been many proposals made for improving the demetallization activity by specifying the kind and quantity of the catalytic metal component for hydrotreatment to be used in the catalyst which is similar to those for the hydrodesulfurization of heavy hydrocarbon oils (see, e.g., U.S. Pat. Nos. 2,577,823, 2,730,487, 2,764,525, 2,843,552, 3,114,701, 3,162,596, 3,168,461, 3,180,820, 3,265,615, 3,297,588, 3,649,526, 3,668,116, 3,712,861, 3,814,683, 3,876,680, 3,931,052, 3,956,105 and 3,960,712, and Japanese Patent Publications Nos. 20914/1971, 33223/1971 and 9664/1974). There are, however, problems in the practical application of these catalysts for the hydrodemetallization of heavy hydrocarbon oils having high asphaltene and heavy metal contents, since various difficulties, such as the poisoning of the catalyst by asphaltenes and heavy metals, still remain substantially unsolved as pointed out with reference to the previously-described hydrotreating catalyst. Various hydrotreating processes have been proposed for the purpose of overcoming these problems (U.S. Pat. Nos. 1,051,341, 2,890,162, 3,180,820, 3,245,919, 3,340,180, 3,383,301, 3,393,148, 3,630,888, 3,640,817, 3,684,688, 3,730,879, 3,764,565, 3,876,523, 3,898,155, 3,931,052, 3,902,991, 3,957,622, 3,977,961, 3,980,552, 3,985,684, 3,989,645, 3,993,598, 3,993,599, 3,928,176, 3,993,601, 4,016,067, 4,054,508, 4,069,139 and 4,102,822, Japanese Patent Publication Nos. 38146/1970, 18535/1972, 17443/1973, 16522/1974, 18763/1974, 18764/1974, 3081/1975, 26563/1979, and Japanese Laid-Open Patent Applications Nos. 2933/1971, 5685/1972, 44004/1974, 121805/1974, 123588/1975, 31947/1973, 9664/1974, 144702/1975, 160188/1975, 4093/1976, 55791/1976, 30282/1977, 50637/1977, 22181/1978, 23303/1978, 145410/1977, 36485/1978, 2991/1979, 11908/1979, 14393/1979, 23096/1979, 104493/1979, 112902/1979 and 125192/1979).

The aforementioned processes proposed for attaining this purpose can be classified roughly into the following groups with respect to the catalyst to be used:

(1) Process for hydrotreating characterized by using a catalyst having small pores (i.e., catalyst having a peak of a pore diameter of about 100 Å or below in its a pore volume distribution);

(2) Process for hydrodesulfurization and demetallization characterized by using a catalyst having middle pores (i.e., catalyst having a pore volume which is for the greater part occupied by pores having a diameter in the range of about 100 Å to 200 Å);

(3) Process for hydrodemetallization characterized by using a catalyst having macro pores (i.e., catalyst having a pore volume of which the greater part is occupied by pores having a diameter of about 200 Å or above);

(4) Process for hydrodemetallization and desulfurization characterized by using a catalyst having both the pore characteristics mentioned at (2) and (3) above;

(5) Process for hydrodesulfurization and demetallization characterized by using a catalyst having a double-peak in its pore volume distribution defined by both the pore characteristics mentioned at (1) and (3) above;

(6) Process for multistage hydrotreatment with a combination of some treatments using the aforementioned catalysts;

(7) Process for hydrotreating using a catalyst comprising a composition which is substantially the same as one of the aforementioned catalysts, but having a specific shape; and (8) Process for hydrotreating characterized by the mode and conditions of the reaction.

None of the processes listed above is, however, satisfactory, since none of them gives a basic solution to the aforementioned technical problems found in the hydrotreatment of heavy hydrocarbon oils containing large amounts of asphaltenes and heavy metals. The problems involved in each of these proposed processes will hereunder be pointed out, together with its characteristic features.

The process belonging to the group (1) is intended for coping with the difficulties which are due to the metal compounds present in heavy hydrocarbon oils, and uses a catalyst having a narrow pore volume distribution defined by small pores which are capable of excluding macromolecules of asphaltenes. According to this method, therefore, asphaltenes are hardly demetallized or desulfurized, but metal and coke are likely to deposit near inlets of pores. Because of these disadvantages, this process is unsuitable for the treatment of a heavy hydrocarbon oil containing large amounts of asphaltenes and heavy metals, and is applicable only to oil having a heavy metal content of about 50 ppm or below.

The process of the group (2) is widely utilized on a commercial scale for the hydrodesulfurization of an atmospheric residue, and makes it possible to lessen to some extent the reduction in the activity of the catalyst which is due to the heavy metal and asphaltenes in the feedstock oil. However, the effect of this method depends mainly on the metal content of the feedstock oil, and the application of the process is substantially limited to oil having a metal content of about 80 to 100 ppm, or below. The diameters of the pores in the catalyst used for this process are sharply reduced at the mouths thereof by deposition of metals therein, and the diffusion of macromolecules of asphaltenes or the like into the pores is greatly inhibited. Therefore, there are necessarily limitations to the asphaltene content of the feedstock oil which can be treated by this method, and the application of this method is limited to a feedstock oil having an asphaltene content of about 5% by weight or below.

The process of the group (3) uses a catalyst of which nearly all the pores have a diameter of at least about 200 Å in order to facilitate diffusion of metal compounds into the pores. The increased pore diameter facilitates the diffusion into the pores of high molecular compounds having a high heavy metal content, but as the catalyst has a sharply reduced pore surface area, its activity for demetallization is not substantially improved. If the volume of macropores is increased to enlarge the pore surface area, coke precursors, such as asphaltenes, stay in the pores for a long time, thereby promoting the coking reaction, with a resultant increase in the deposition of coke in the catalyst pores. Thus, most of the catalysts employed for carrying out this method have a relatively low activity for demetallization. If for hydrotreating, the conditions for the reaction are made severer in order to raise the demetallization activity of the catalyst to a practically acceptable level, and particularly if the reaction temperature is increased, there occur an excess consumption of hydrogen, and other problems which are similar to those already pointed out with respect to the process in which inexpensive material, such as bauxite, is used as a catalyst. In the event a macropore catalyst with many pores having a diameter of at least about 400 Å is used, a slight increase in the surface area does not improve the performance of the catalyst very much, since the amount of the coke to be deposited also increases. Further drawbacks which are common to such a molded catalyst include an insufficient mechanical strength which is likely to cause disintegration of the catalyst due to its breakage and abrasion when it is charged into the reactor, and during the operation. According to this process, the catalyst is primarily intended for demetallization, and does not have any appreciable effect on the decomposition of asphaltenes.

The process of the group (4) is an improvement over the processes (2) and (3), and uses a catalyst having specifically controlled ranges of pore volume and particle diameter in a pore diameter range of at least 100 Å. This process is, however, primarily intended for demetallization of the feedstock oil as a whole, or simultaneous demetallization and desulfurization, and is not considered complete for either demetallization or desulfurization. The process is not considered to provide a very satisfactory improvement from the standpoint of efficient use of the catalyst, either.

Generally, a heavy hydrocarbon oil contains large amounts of impurities, such as heavy metals and sulfur compounds, which are widely distributed, not only in high molecular fractions such as asphaltene fractions, but usually considerably in relatively low molecular hydrocarbon oil fractions as well. It is practically difficult to obtain a catalyst having pores with a diameter range which is suitable for the demetallization and desulfurization of both asphaltene and low molecular fractions, and a pore surface area which is sufficiently large to satisfy both of the purposes. It is actually impossible to obtain a single catalyst which is capable of performing the functions of demetallization and desulfurization simultaneously to an optimum degree. The molecular sizes of the heavy metal and sulfur compounds which a heavy hydrocarbon oil contains differ over a wide range, and their diffusion into the catalyst pores has largely different effects on the reactions of each molecule. The rates of desulfurization and demetallization of asphaltenes are extremely low as compared with those of other light oil fractions. Moreover, a comparison between the demetallization and desulfurization rates reveals that demetallization is more likely to be affected by the intrapore diffusion. It is practically impossible to accomplish with a single catalyst the hydrometallization or desulfurization of a heavy hydrocarbon oil containing large amounts of asphaltenes and heavy metals at a substantially satisfactory reaction rate, since it means an excessive need for the total surface area and total pore volume of the catalyst. The surface area of a catalyst is determined almost solely by the pore diameter and pore volume, and an increase in the pore diameter results in a sharp reduction of the surface area, as already pointed out.

Thus, the maximum pore volume of the catalyst for the group (4) is inevitably limited to the level which the mechanical strength required thereof permits, and the catalyst fails to show any such degree of activity as the optimum catalysts for the groups (2) and (3) can provide individually for desulfurization or demetalization. Those portions of the catalyst which are provided with pores having a diameter of about 100 to 200 Å lose their catalytic activity rapidly due to pore plugging by metal accumulation, while the remaining portions with larger pores has only a limited surface area and do not contribute to the reaction. The catalyst for the group (4) does not provide any appreciably improved efficiency, since it does not always permit a sufficiently large amount of metal to be accumulated thereon before the rates of the various reactions involved can be kept equal, as opposed to the optimum catalysts for the groups (2) and (3). In order to overcome these disadvantages, it is necessary to use a catalyst composed of very fine particles, but such a catalyst is not suitable for a fixed or ebullated bed system which is usually employed for the hydrotreatment of a heavy hydrocarbon oil. As the demetallization of heavy hydrocarbon oils is generally determined by the rate of intrapore diffusion, the overall reaction velocity shows a decrease as an exponential function of the diameter of the catalyst particles.

The process of the group (5) is based on the fact that in the hydrotreatment of heavy hydrocarbon oils, desulfurization is not very largely influenced by intrapore diffusion, while demetallization is largely affected by it. According to this process, there is used a catalyst provided with both small pores having a diameter not greater than about 100 Å, and macropores having a diameter of at least about 500 Å, or even at least about 1,000 Å. Although this catalyst does certainly relax the limitations relating to the diffusion of metal-containing high molecular compounds into the pores, it shows a sharp reduction in activity due to metal accumulation in the pores having a diameter not greater than about 100 Å, and the mouths of these pores are likely to be blocked, as is the case with the catalyst used for the group (1). Thus, the catalyst for the group (5) fails to maintain a high activity for a long time for the feedstock oil having a high metal content, and eventually, only the larger pores act mainly for demetallization. Therefore, it is not considered to have an improved efficiency over the catalysts for the groups (1) and (3) which are used individually.

Groups (6), (7) and (8) have been proposed to improve the efficiency of hydrotreating of heavy hydrocarbon oils by selecting a catalyst composition from the groups (1) to (5), but fail to provide any basic solution to the problems inherent in the catalysts for the groups (1) to (5).

It will be noted from the foregoing that the various proposals made for the hydrotreatment of heavy hydrocarbon oils share a number of disadvantages. First of all, there has been no proposal suggesting an optimum catalyst for the decomposition of asphaltenes. Moreover, none of the processes proposed for simultaneous desulfurization and demetallization with a single type of catalyst is well aware of the fact that the great difference in molecular size between asphaltene and the other oil fractions leads to a large difference in the reaction velocity between desulfurization and demetallization.

As already pointed out repeatedly, the pretreatment of oil for effective reduction and removal of asphaltenes therefrom is essential for obtaining a high grade hydrocarbon oil by hydrotreating the feedstock oil containing a large amount of asphaltenes. There has been proposed no catalyst that is suitable for that purpose. A number of attempts have, however, been made recently for decomposing asphaltenes in heavy hydrocarbon oils. For Example, various processes have been proposed in Japanese Patent Publications Nos. 33563/1976, 42804/1977 and 5212/1978 which have recently been issued. These processes propose conversion of a heavy hydrocarbon oil to a light hydrocarbon oil by dispersing vanadium sulfide, e.g., vanadium tetrasulfide, in the heavy hydrocarbon oil to form a slurry mixture, or mixing oil-soluble vanadium, e.g., vanadium resinate, into the heavy oil, and activating the vanadium at high temperature and hydrogen pressure, so that fine particles of the activated vanadium sulfide may be circulated for use as the catalyst. In order to obtain a satisfactory rate of decomposition for asphaltenes, however, it is necessary to raise the reaction temperature, or increase the concentration of the catalyst. Moreover, it can easily be supposed that these processes may reveal new and serious disadvantages when put into practice, since they all involve a slurry process in which a vanadium sulfide catalyst having no carrier is used. A typical slurry process for catalytic hydrotreatment at high temperature and pressure has long been known as a process for direct liquefaction of coal. It is known that these slurry processes share a number of drawbacks which must be eliminated before they can be adopted on an industrial basis. For example, the operation is complicated, troubles, such as blocking of the passage, are likely to occur, and special technical consideration must be given to the recovery of the fine-grained catalyst from the apparatus used and the heavy fractions.

As pointed out, it is difficult to achieve catalytic hydrotreatment of a heavy hydrocarbon oil containing large quantities of asphaltenes and heavy metals, such as vanadium, by any conventional process in a fixed bed or other reaction apparatus which is often used in industry. It is desired to develop a catalyst conforming to the requirement, and which can maintain a high activity for a long period of time.

The members of the group to which the present inventors belong became aware of the possibility that the establishment of an effective process for decomposing asphaltenes might be a key to the development of a process which would make it possible to obtain a high grade hydrocarbon oil by hydrotreating a heavy hydrocarbon oil containing large amounts of asphaltenes and heavy metals. They have continued extensive research for several years in order to develop a catalyst which eliminates the aforementioned drawbacks of the catalysts known in the art, and which is effective for the catalytic hydrotreatment of such heavy hydrocarbon oils. As a result, they have found that a catalyst composed of a naturally available clay mineral having a double-chain structure, such as sepiolite, shows a relatively high activity for the hydrotreatment of a heavy hydrocarbon oil, particularly for the decomposition and demetallization of asphaltenes, and have already proposed such a catalyst in U.S. Pat. Nos. 4,152,250 and 4,166,026, Japanese Laid-Open Patent Applications Nos. 95598/1977 and 1306/1979, etc. Further, they have paid their attention to the characteristics of heavy hydrocarbon oils containing a large amount of asphaltenes, particularly asphaltenes per se, and conducted various kinds of analyses and detailed studies for various types of oil in order to ascertain the form in which asphaltenes exist in the oils. They have consequently found that different types of asphaltenes present in different types of oil share a number of characteristics, though the asphaltene contents differ from one kind of heavy hydrocarbon oil to another. Table 2 shows the results of detailed analysis for the asphaltene fractions (a) and deasphalted fractions (b) which were obtained by removing asphaltenes from typical types of heavy hydrocarbon oils. In Table 2, the figures in parentheses indicate the weight percentages of the respective substances relative to their contents in the feedstock oil, and the letters A to E refer to the various types of feedstock oil shown in Table 1. The average molecular weight shown in Table 2 was determined by the vapor pressure osmosis method using pyridine as a solvent.

As is obvious from the results shown in Table 2, all types of asphaltenes have a lower hydrogen/carbon atom ratio than the corresponding deasphalted oils, and comprise macromolecules containing large quantities of undesirable impurities, such as sulfur, nitrogen, vanadium and nickel. The heavy metals, such as vanadium and nickel, in heavy hydrocarbon oils occupy higher proportions in asphaltenes than sulfur or nitrogen does. Asphaltenes have an average molecular weight of about 4,000 to 6,000 which indicates that they comprise macromolecules, but they do not differ very largely from one type of heavy hydrocarbon oil to another. The deasphalted oils have a higher hydrogen/carbon atom ratio than asphaltenes, extremely lower vanadium and nickel contents, and mostly an average molecular weight which is less than 1,000. It is, however, noted that at least about 60 to 80% of the sulfur and nitrogen contained in heavy hydrocarbon oils, and generally about 40 to 50% and, in some cases, over 80% of the vanadium and nickel are present in the deasphalted oils.

The molecular weight distributions of the asphaltenes and deasphalted oils were determined by gel permeation chromatography using polystyrene gel as a molecular weight calibrating standard. The results are shown in FIG. 1. In FIG. 1, the results obtained with respect to asphaltene are shown at (a), and those relating to deasphalted oil at (b). Both in FIGS. 1(a) and (b), the axis of abscissa represents the molecular weights of those substances calibrated with polystyrene, and the axis of ordinate indicates the differential refractive indices showing the weight proportions of those substances in relation to their molecular weights. As is obvious from FIG. 1, asphaltenes and deasphalted oils have widely different molecular weight distributions from each other; asphaltenes are formed from high molecular compounds having different molecular weights ranging from about 1,000 to about 50,000, while deasphalted oil comprises compounds of which nearly all have a molecular weight in the vicinity of 1,000. Moreover, it should be noted that the molecular weight distribution of asphaltenes does not largely depend on the type of the heavy hydrocarbon oil.

In short, it is noted that a heavy hydrocarbon oil is composed of asphaltenes forming macromolecules containing large quantities of undesirable sulfur, vanadium and nickel, and an oil fraction containing compounds mostly having a molecular weight not greater than 1,000, and considered to be highly reactive for desulfurization and demetallization, and that the average molecular weight of asphaltenes and its distribution hardly change from one type of oil to another, though its amount may differ with oils. Thus, it is recognized from the results of the analyses that in order to produce a high grade hydrocarbon oil by catalytic hydrotreatment of a heavy hydrocarbon oil, it is more effective to preliminarily hydrotreat the feedstock oil with a catalyst having a porous structure best suited for the asphaltene molecules, and a high degree of selectivity and activity for the decomposition and conversion of asphaltenes into lower molecular compounds, and the demetallization or desulfurization of asphaltene molecules, and then hydrotreat the pretreated oil with another catalyst having a high activity for the desulfurization and demetallization of the oil fraction, than to hydrotreat the oil with a single catalyst.

SUMMARY OF THE INVENTION

The present invention provides a catalyst for the hydrotreatment of a heavy hydrocarbon oil containing asphaltenes, which comprises one or more catalytic metal components composited with a porous carrier.

TABLE 2

| | Properties of (a) asphaltenes in feedstock oil and (b) deasphalted oil | | | | | | | | | |
|---|---|---|---|---|---|---|---|---|---|---|
| | A | | B | | C | | D | | E | |
| | a | b | a | b | a | b | a | b | a | b |
| Yield wt % | 11.8 | 87.2 | 8.1 | 89.9 | 14.6 | 83.4 | 7.8 | 91.0 | 4.9 | 92.2 |
| H/C atom ratio | 1.15 | 1.59 | 1.18 | 1.52 | 1.10 | 1.48 | 1.08 | 1.48 | 1.11 | 1.48 |
| Sulfur wt % | 6.76 | 5.10 | 8.40 | 4.01 | 7.54 | 4.75 | 5.70 | 3.46 | 7.26 | 4.80 |
| | (14.9) | (83.0) | (15.4) | (81.7) | (21.0) | (75.6) | (12.1) | (85.8) | (6.76) | (84.3) |
| Nitrogen wt % | 1.60 | 0.40 | 1.53 | 0.36 | 0.81 | 0.31 | 1.18 | 0.59 | 0.87 | 0.41 |
| | (32.6) | (60.1) | (29.5) | (77.1) | (29.6) | (64.6) | (14.2) | (82.6) | (10.2) | (90.0) |
| Metals wt ppm | | | | | | | | | | |
| Ni | 466 | 58 | 349 | 43 | 193 | 28 | 392 | 66 | 182 | 32 |
| | (51.9) | (47.7) | (35.8) | (48.9) | (53.2) | (44.1) | (33.2) | (65.3) | (25.5) | (84.3) |
| V | 5390 | 594 | 779 | 109 | 608 | 90 | 1378 | 205 | 562 | 107 |
| | (51.3) | (41.8) | (34.7) | (53.8) | (53.8) | (45.5) | (36.1) | (62.6) | (23.5) | (84.3) |
| Average mol wt | 5625 | 690 | 5460 | 694 | 5280 | 851 | 4730 | 940 | 4302 | 850 |

The metal of the catalytic metal components is selected from the group consisting of the metals of Groups VB, VIB, VIII and IB of the Periodic Table, and the porous carrier is composed of one or more inorganic oxides of at least one element selected from the group consisting of the elements of Groups II, III and IV of the periodic table. The catalytic metal components occupy about 0.1 to 30% in terms of oxide based on the total weight of the catalyst. The catalyst has the following pore characteristics (a)–(c) with regard to its pores having a diameter of 75 Å or more:

(a) An average pore diameter, APD, is between about 180 Å and about 500 Å;

(b) A total pore volume, PV, expressed in cc/g, is at least a value X calculated according to the following equation:

$$X = \frac{0.46}{1 - \left(\frac{100}{APD}\right)^2},$$

while the volume of pores having a diameter of between about 180 Å and about 500 Å is at least about 0.2 cc/g, and the volume of pores having a diameter of at least 1,500 Å is not greater than about 0.03 cc/g; and (c) A total surface area, SA, is at least about 60 m²/g. Moreover, the catalyst has an average catalyst diameter, ACD, expressed in millimeters, of not greater than a value Y calculated according to the following equation:

$$Y = (APD/100)^{0.5}$$

The inventors of this invention has conducted further experiments for the hydrotreatment of various types of heavy hydrocarbon oils by using many kinds of catalysts composed of different types of porous inorganic oxides in order to find out a suitable catalyst for the decomposition and conversion of asphaltenes into lower molecular compounds, and the demetallization and desulfurization of asphaltenes to perform the effective pretreatment of heavy hydrocarbon oils containing a large amount of asphaltenes. Based on the results of these experiments, they have made an extensive study of the suitability of various catalysts for the treatment of asphaltenes, particularly their pore structures, to obtain an improved catalyst which is suitable for the purpose intended. As the result, they have discovered that an optimum catalyst for the aforementioned purpose is required to satisfy a specific range of requirements for the average pore diameter, pore volume, pore distribution, total surface area and average catalyst diameter of the particles. The optimum catalyst means a molded catalyst having such a degree of activity as to permit production of a refined oil having a satisfactorily low asphaltene content under industrially permissible conditions for hydrotreating, including temperature, pressure and liquid space velocity, and which can maintain such a degree of activity with a minimum loss thereof for a substantially long period of time. The catalyst is also required to have a sufficiently high mechanical strength which prevents any appreciable breakage or crush of the catalyst that is recognizable during its use.

The present invention also provides a novel and improved method of preparing such a catalyst.

In further aspect of this invention, there is provided a process for catalytic hydrotreatment, using the aforementioned catalyst, in the presence of hydrogen in a reaction zone under appropriate operating conditions, mainly for the purpose of reducing considerable amounts of asphaltenes and metals from asphaltene-containing heavy hydrocarbon oils.

In accordance with a further aspect of this invention, there is provided a novel and improved process for two-stage hydro-treatment of asphaltene-containing heavy hydrocarbon oils in the presence of the aforementioned catalyst, whereby high grade hydrocarbon oils may be obtained by reducing the contents of asphaltenes, heavy metals, sulfur, nitrogen, etc. and Conradson crbon residue thereof.

It is, therefore, an object of the present invention to provide a novel catalyst which is effective for hydrotreating an asphaltene-containing heavy hydrocarbon oil, especially in decomposing asphaltenes and concomitantly removing heavy metals therefrom.

Another object of this invention is to provide a catalyst which is devoid of the afore-mentioned drawbacks of the conventional catalysts and which can exhibit a high degree of activity for a long period of time.

A further object of this invention is to provide a simple and economically acceptable method by which a porous catalyst having specific surface area, average pore diameter and pore size distribution suitable for hydrotreating asphaltene-containing heavy oils can be obtained.

It is yet a further object of this invention to provide a process for hydrotreating heavy hydrocarbon oil, especially an oil containing large amounts of asphaltenes and heavy metals, by which such an oil can be effectively converted into a substantially asphaltene-free and heavy metal-free light oil.

BRIEF DESCRIPTION OF THE DRAWINGS

Other objects, features and advantages of the present invention will become apparent from the detailed description of the invention to follow when considered in light of the accompanying drawings in which:

FIG. 3 is a graph showing the rate of sulfur and metal removal from asphaltenes in relation to the quantity of metal deposition on the catalyst;

FIG. 12 is a graph showing the relation between the reaction temperature and the process time; and FIG. 13 is a graph showing the relation between the decomposition rate of asphaltenes and the amount of vanadium deposition on the carrier.

DETAILED DESCRIPTION OF THE INVENTION

Figure 1A:
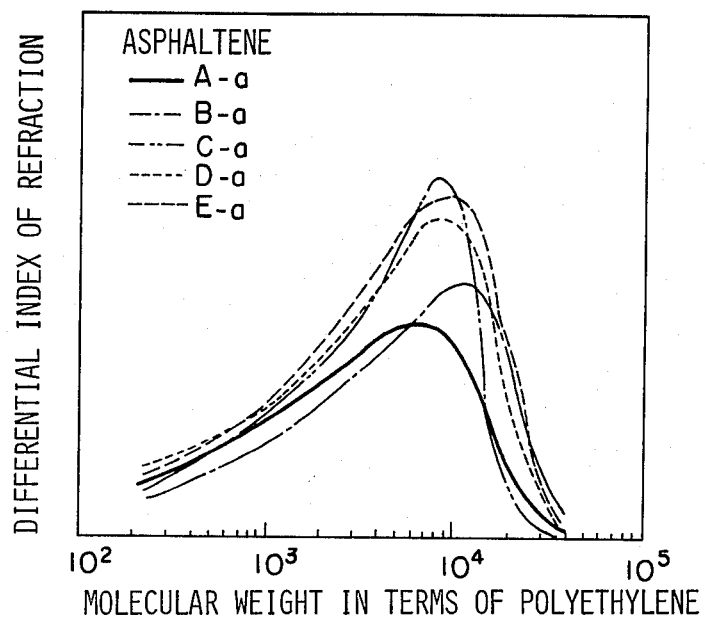
FIG. 1(a) is a graph showing the molecular weight distribution of the asphaltene fraction in the feedstock oil.
Figure 1B:
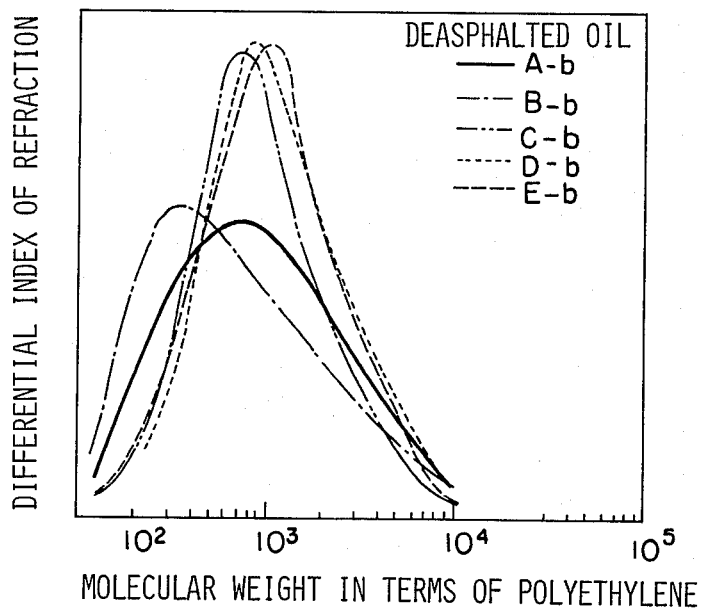
FIG. 1(b) is a graph showing the molecular weight distribution of deasphalted oil.

For the purpose of this specification, the value of the average pore diameter, APD, is defined by the following formula, and expressed in Å:

$$APD = \frac{4 \times PV \times 10^4}{SA} \quad (1)$$

wherein PV and SA represent the total pore volume and total surface area, respectively, of the pores having a diameter of 75 Å or more, per unit catalyst weight, which are expressed in cc/g and m²/g, respectively. The total pore volume and the total surface area of the pores having a diameter of at least 75 Å, per gram of the catalyst will hereinafter referred to simply as the pore volume and the surface area, respectively, of the catalyst, unless otherwise noted.

The pore diameter, pore volume and surface area of the catalyst were determined by the mercury penetration method [of which details are described in, for example, E. W. Washburn, Proc. Natl. Acad. Sci., 7, page 115 (1921), H. L. Ritter and L. E. Drake, Ind. Eng. Chem. Anal., 17, pages 782 and 787 (1945), L. C. Drake, Ind. Eng. Chem., 41, page 780 (1949), and H. P. Grace, J. Amer. Inst. Chem. Engrs., 2, page 307 (1956)] using a mercury penetration porosimeter, Model 70 (made by Carlo Elba of Milano, Italy). The determination was made with a mercury surface tension of 474 dyne/cm at 25° C., a contact angle of 140° and an absolute mercury pressure which was varied between 1 and 2,000 kg/cm². The diameter of the pores having a diameter of at least 75 Å can be expressed by the following formula:

$$\text{Pore diameter (Å)} = \frac{150,000}{\text{Absolute mercury pressure (kg/cm}^2)}$$

The average catalyst diameter, ACD, of the catalyst particles according to this invention is defined by the following formula, and expressed in millimeter:

$$ACD = 6 \times \frac{\text{Average volume of catalyst particles (mm}^3)}{\text{Average outer surface area of catalyst particles (mm}^2)} \quad (2)$$

In this formula, the average volume and average outer surface area of the catalyst particles represent the volume and outer surface area, respectively, of a spherical equivalent having a diameter which is equal to the average particle diameter of the catalyst which may be determined by an appropriate method, for example, by direct measurement, screening or sedimentation, as specifically set forth in "Particle Size Determination", Powder Engineering Society, Nikkan Kogyo Shinbunsha (1975).

The novel catalyst according to this invention is composed of one or more specific catalytic metal components composited with a porous carrier formed from inorganic oxides of specific elements, and featured most saliently by its physical properties defined within the aforementioned specific ranges. According to the catalyst of this invention, its ultimate physical properties, particularly its average pore diameter, pore volume, pore distribution, surface area and other features of its pore structure, and the average catalyst diameter of its particles have a significant bearing on the effective hydrotreatment of a heavy hydrocarbon oil containing asphaltenes. According to this invention, there has been developed, by restricting those properties to the specific ranges, an optimum catalyst having a high activity for asphaltene decomposition and an appropriate selectivity for removal of sulfur and metals from asphaltenes, which have not been achieved by any known catalyst. Moreover, the catalyst can maintain its activity for a substantially long period of time with a high degree of stability, and as it is a molded catalyst, it has a sufficiently high mechanical strength.

The features and advantages of the catalyst according to this invention will now be described more specifically.

The various reactions involved in the catalytic hydrotreatment of a heavy hydrocarbon oil generally depend more or less on the intrapore diffusion of the reactants into the catalyst. When reference is made particularly to the decomposition of asphaltenes, the catalyst is required to have a different pore diameter from those of the catalysts which have heretofore been used for removal of sulfur and metal from a heavy hydrocarbon oil. A larger pore diameter enables easier diffusion of macromolecules, such as asphaltenes into the active sites of the pores in the catalyst. With an increase in the pore diameter, however, the active surface area of the pores is reduced with a resultant lowering of the overall reaction rate. The catalyst shows a satifactory activity for asphaltene decomposition if it has an average pore diameter ranging from about 180 Å to about 500 Å, more preferably from about 200 Å to about 400 Å. Pores having an average diameter less than about 180 Å show a high activity for removal of sulfur and metals from oil fractions other than asphaltenes, but are not effective for asphaltene decomposition or other reactions involving asphaltenes which depends largely on the rate of intrapore diffusion of the asphaltenes. If the feedstock oil contains large amounts of asphaltenes and heavy metals, small and middle pores are easily reduced in size by deposition of metals and coke therein, resulting in diffusion of asphaltenes into the pores being further restricted, and ultimately, their mouths are plugged by such metal and coke. Therefore, a catalyst having such small or middle pores is far from being practically acceptable, since there are easily formed useless pores having substantially no catalytic activity for the feedstock oil containing large quantities of asphaltenes and heavy metals, though there remain active surfaces inside the pores after a short period of use.

Thus, pores having an average diameter less than about 180 Å are not effective for the decomposition of asphaltenes in a heavy hydrocarbon oil containing large amounts of asphaltenes and heavy metals. That portion of the total pore volume of the catalyst which is defined by pores having a diameter less than about 180 Å should be minimized. Specifically, the pore volume defined by pores having a diameter less than about 100 Å is preferably less than about 0.1 cc/g, more preferably less than 0.08 cc/g. Pores having a diameter greater than about 500 Å are large enough for the diffusion of asphaltenes, but such an increase in pore diameter brings about a sharp decrease in the pore surface area and a reduction in the activity for asphaltene decomposition per unit volume of the catalyst employed. The larger pores prolong residence time, and hence, deposition of more coke on the pore surfaces with a resultant reduction in the pore surface activity due to poisoning by coke. Accordingly, the catalyst can be used with a higher degree of efficiency with a greater pore volume defined by pores having a diameter in the most effective range of about 180 Å to about 500 Å for asphaltene decomposition. According to this invention, the total volume of the pores having a diameter of about 180 Å to about 500 Å is preferably greater than about 0.2 cc/g, more preferably greater than about 0.3 cc/g, and most preferably, greater than about 0.35 cc/g. In other words, a catalyst having a high activity for asphaltene decomposition is provided with a large number of pores having a diameter of about 180 Å to about 500 Å, as compared with smaller or larger pores.

An optimum catalyst for the decomposition of asphaltene in a heavy hydrocarbon oil is required to maintain a sufficiently high level of activity and stability for that purpose. For the purpose of this invention, a catalyst is considered to have a high degree of stability, if it can for a sufficiently long time remain sufficiently active for forming an oil product having a sufficiently low asphaltene content without causing any such trouble as agglomeration of catalyst particles and increased pressure drop in the catalyst bed, though its activity may be reduced by deposition of metal in the pores. The most important factor that determines the stability of the catalyst is its pore volume. During the demetallization of a heavy hydrocarbon oil, an increasing amount of metals is deposited in the pores of the catalyst with an increase in the treatment time, and reduces the volume and diameter of the pores, especially their mouth diameter. If the reduction in the pore diameter exceeds a certain degree, the diffusion of asphaltenes into the pores is extremely inhibited, and the rate of conversion is sharply reduced. In order for a catalyst to maintain a satisfactory level of stability, therefore, it is necessary to ensure that the diffusion of asphaltenes into the pores not be inhibited, for a sufficiently long period of time, by the metals deposited therein, and in this connection, it is necessary for the catalyst to maintain a sufficiently large pore volume to maintain an appropriate average pore diameter of at least about 180 Å for asphaltene decomposition for a sufficiently long period of time. For the purpose of this specification, the term "sufficiently long period of time" refers specifically to a treatment time of at least about 4,000 hours, preferably at least about 6,000 hours, for the treatment of a heavy hydrocarbon oil with a given reactor filled with or holding a catalyst under the treatment conditions specified according to this invention. In order to maintain decomposition of asphaltenes for such a long period of time, it is necessary that the amount of metal deposition which is permissible on the catalyst be at least about 50% by weight, and preferably at least about 60% by weight, in terms of vanadium, relative to the weight of the fresh (or new) catalyst.

The inventors of this invention have discovered that a catalyst which can maintain a satisfactory level of stability for a sufficiently long period of time is required to have a pore volume, PV, expressed in cc/g, which is equal to, or greater than the value X calculated according to the following equation:

$$X = \frac{0.46}{1 - \left(\frac{100}{APD}\right)^2} \quad (3)$$

The catalyst should have a surface area, SA, of at least about 60 m$^2$/g, preferably at least about 70 m$^2$/g, in order to provide a desirable catalytic activity.

It is known that the size of the catalyst particles is generally a very important factor in the reactions in which intrapore diffusion prevails [for details, see P. H. Emmett, "Catalysis", Vol. II, Reinhold Publishing Corporation, New York (1955), and C. N. Satterfield, "Mass Transfer in Heterogeneous Catalysis", M.I.T. Press, Massachusetts (1970)]. This invention is saliently featured by defining the size of the catalyst particles in relation to the pore diameter.

After examining the relation between the particle and pore diameters of the catalyst in connection with the decomposition of asphaltene in various types of heavy hydrocarbon oils, the inventors of this invention have found that the particle diameter of the catalyst which is suitable for this reaction, i.e., the average catalyst diameter, ACD, expressed in millimeter as hereinbefore defined must not exceed the value obtained by the following formula:

$$ACD = (APD/100)^{0.5} \quad (4)$$

The activity of the catalyst for asphaltene decomposition decreases as an exponential function of its particle diameter; a particle diameter in excess of the aforementioned average catalyst diameter is too large to provide a satisfactory level of catalytic activity. If the catalyst particles are too small, it is difficult to use them with a fixed, moving or ebullated bed, or other reaction system widely used in the art for the catalytic hydrotreatment of a heavy hydrocarbon oil. For instance, various disadvantages may result from the use of too small catalyst particles with a fixed bed system, including an increased pressure drop in the catalyst bed, pulverization of the catalyst during use, and agglomeration of the particles by deposition of heavy metals and coke. Accordingly, if any such ordinary reaction system is employed, the catalyst is desired to have a particle diameter of about 0.6 to about 3.0 mm, preferably about 0.6 mm to about 1.5 mm, in terms of the average catalyst diameter. One of the important requirements which an optimum catalyst must satisfy from the standpoint of industrial use is that it should have a satisfactory level of mechanical strength. The mechanical strength of a molded catalyst is generally expressed by way of its crushing strength and abrasion loss. In order to be suitable for the hydrotreatment of a heavy hydrocarbon oil, particularly the decomposition of asphaltenes therein, it is preferred that the catalyst have a crushing strength of at least about 1.5 kg, more preferably at least 2.0 kg, and an abrasion loss not greater than about 10% by weight, more preferably not greater than about 6% by weight. An optimum catalyst having at least a required level of mechanical strength, especially crushing strength, has been found to require a pore volume, PV, which is not greater than the value X' calculated according to the following equation:

$$X = \frac{1.19}{0.5 \ln APD - \ln ACD - 2.28} - 0.300 \qquad (5)$$

A catalyst has an extremely large abrasion loss, if its pores having a diameter of at least 1,500 Å have a large pore volume in total. In order to reduce the abrasion loss to a desirable level, it is preferable to decrease the pores having a diameter of at least 1,500 Å to the extent that their total volume may be reduced to a level not greater than about 0.03 cc/g. Macropores having a diameter of at least 1,500 Å hardly contribute to providing any catalytic activity for asphaltene decomposition, but are only concerned with the crushing of the catalyst. Therefore, it is desirable to minimize such macropores.

For the purpose of this specification, the strength of a catalyst was determined by applying the method according to the standard of the Japanese Association of Powder Industry [Journal of the Japanese Society of Powder Engineering, Vol. 15, No. 4, page 213 (1978)] and the method proposed by J. C. Dart [Chem. Engr. Progr., Vol. 71, No. 1, page 46 (1975)]. More specifically, the abrasion loss of the catalyst was determined by taking 100 g of a catalyst sample dried to the extent that it did not contain more than about 2% of moisture, placing it in a cylindrical covered stainless steel drum having a diameter of about 25 cm and a depth of about 15 cm, and provided with an about 2 cm wide and about 5 cm long baffle projecting from its inner wall, rotating the drum at a speed of about 60 rpm for 30 minutes to cause abrasion of the catalyst, and measuring the amount of the powder thereby formed. The crushing strength of the catalyst was determined by placing a likewise pretreated or dried catalyst sample on an appropriate support, compressing the catalyst particles at a constant rate hydraulically by a cylinder having a diameter of about 5 mm, and measuring the load under which the particles were crushed. For the purpose of this specification, the crushing strength of the catalyst was measured with respect to fifty catalyst samples, and expressed by way of the average crushing load therefor.

A preferred catalyst embodying this invention may be defined by the following characteristics:
Pore volume, PV, of pores having a diameter of at least 75 Å—0.5 to 1.5 cc/g;
pore volume of pores having a diameter not greater than 100 Å—not greater than 0.1 cc/g;
pore volume of pores having a diameter of 180 Å to 500 Å—at least 0.2 cc/g;
pore volume of pores having a diameter of at least 1,500 Å—not greater than 0.03 cc/g;
surface area, SA—at least 70 m$^2$/g; and
average catalyst diameter of the particles—0.6 to 1.5 mm.

The more preferred catalyst of this invention satisfies these physical properties, and is further characterized in that the ratio (Q/P) of the total volume of the pores having a diameter of 180 to 400 Å (Q) to that of the pores having a diameter of 180 to 500 Å (P) is at least about 0.5. With an increase in the total surface area of the pores having a diameter of 180 to 400 Å, the catalyst shows a higher activity for asphaltene decomposition, and if the pore volume of such pores (Q) is equal to, or greater than about a half of the volume of the pores having a diameter of 180 to 500 Å (P), an increased activity of the catalyst greatly improves its working efficiency per unit volume occupied thereby.

The carrier for the catalyst of this invention comprises one or more inorganic oxides of at least one element selected from among the elements belonging to Groups II, III and IV of the Periodic Table. Examples of the oxide include alumina, silica, titania, boria, zirconia and other oxides of a single element, and silica-alumina, silica-magnesia, alumina-magnesia, alumina-titania, silica-titania, alumina-boria, alumina-zirconia, silica-zirconia and other composite oxides of more than one element. These oxides are used alone, or as a mixture of two or more thereof.

One or more catalytic metal components are composited with the inorganic oxide carrier. The metal of the catalytic metal components is selected from among the metals belonging to Groups VB, VIB, VIII and IB of the Periodic Table, most preferably vanadium, molybdenum, tungsten, chromium, cobalt, nickel or copper. These catalytic metal components can be effectively used, whether in the form of a metal, metal oxide or metal sulfide, or alternatively, they may be partially combined with the carrier material by ion exchange or otherwise. The catalytic metal component should be present in the range of about 0.1% to about 30% by weight in terms of oxide based on the total weight of the catalyst.

The "Periodic Table" as herein referred to is one which appears on page 628 of Webster's 7th New Collegiate Dictionary, G & C Merriam Company, Springfield, Mass., U.S.A. (1965).

These catalytic metal components dictate the activity of the catalyst for various reactions involved in the hydrotreatment of a heavy hydrocarbon oil, such as the decomposition and conversion of asphaltenes into lower molecular compounds, and removal of metals, sulfur and nitrogen from asphaltenes. The selection and combination of metals may be made as desired to suit the reaction on which stress is particularly placed on a case to case basis. For instance, it is effective to choose at least one from among vanadium, molybdenum and copper, or use it in combination with at least one of cobalt, nickel, tungsten and chromium, for a catalyst which is primarily intended for the decomposition of asphaltenes and removal of metals therefrom. If it is desired to promote the activity of the catalyst for desulfurization, as well as for those reactions, it is recommended to use a combination of, for example, cobalt and molybdenum; nickel, cobalt and molybdenum; vanadium, cobalt and molybdenum; or vanadium, nickel, cobalt and molybdenum. In the event only the decomposition of asphaltenes and removal of metals therefrom are of interest, it may be sufficient to use one or both of vanadium and molybdenum in the quantity of about 0.1% to about 10% weight in terms of oxide based on the total weight of the catalyst.

Description will now be made in detail of the manufacture of the catalyst according to this invention.

A variety of methods have hitherto been proposed for manufacturing a catalyst for hydrotreating heavy hydrocarbon oils which includes a carrier composed of at least one member selected from oxides of the elements belonging to Groups II, III and IV of the Periodic Table. They are, for example, set forth in detail in The Japanese Catalyst Society, "Handbook of Catalysts", Chijin Shokan (1967); B. Belmon et al., "Preparation of Catalyst", Vol. 1 (1976) and Vol. II (1979), Elsevier Scientific Publishing Company, New York; R. J. Peterson, "Hydrogenation Catalysts", Noyes Data Corporation, New Jersey (1977); and M. W. Ranney, "Desulfurization of Petroleum", Noyes Data Corporation, New Jersey (1975).

As already stated, the catalyst of this invention is featured by having a specific pore structure, particularly specific ranges of average pore diameter, pore volume and pore distribution, selected so as to provide the optimum catalytic activity, stability and strength. Accordingly, a method for preparing the catalyst according to this invention must include the step of controlling the pore structure of the catalyst to the specific one. In order to control the average pore diameter of a porous catalyst carrier composed of an inorganic oxide, it is generally known to control the size of the basic particles of the oxide, thereby controlling the size of the pores formed among the particles. If this method were to be applied for the preparation of a catalyst having a relatively large average pore diameter as is the case with the catalyst of this invention, it would be imperative to enlarge the basic particles of the carrier oxide, resulting disadvantageously in an extremely great reduction of the total surface area of the carrier. In order to overcome this disadvantage, and maintain a large surface area for the carrier, while controlling the average pore diameter, it has been proposed to control in various ways the shrinkage of the gel structure during the process of drying and calcining the hydrogel of the carrier oxide. In connection with these methods, however, it is to be noted that as carriers having a substantially equal surface area can be obtained, the control of the average pore diameter does not mean anything but the control of the pore volume. The shrinkage of the gel structure of the hydrogel forming the carrier can, for example, be controlled by varying the drying speed for the hydrogel (J. Polymer Science, Vol. 34, page 129), or by applying a shearing force to a thick hydrogel (Japanese Laid-Open Patent Application No. 31597/1974). These methods are, however, capable of controlling the pore volume only within a very narrow range, and are not desirable for the preparation of the catalyst according to this invention.

There have been proposed a number of methods which can be employed in the preparation of the catalyst according to this invention. For example, a water soluble high molecular compound, such as polyethylene glycol, is added to the hydrogel in order to control the pore volume within a wide range as disclosed in Japanese Laid-Open Patent Application Nos. 50637/1977, 104498/1977 and 104493/1979, or a part or substantially all of the water in the hydrogel is replaced with alcohol or the like as disclosed in Japanese Laid-Open Patent Application Nos. 123588/1975 and 4093/1976. The former method is intended for varying the pore volume by varying the quantity of the high molecular compound to be added, and preventing dense cohesion of fine hydrogel particles. The latter method controls the pore volume of the carrier by varying the amount of alcohol replacement to thereby change the surface tension of water to control the cohesion of hydrogel particles. Although the catalyst of this invention can be prepared by either of these two methods, neither of them is very desirable for the preparation of the catalyst according to this invention, since they both produce only expensive catalysts, and involve complicated processes. For instance, they are economically not desirable, since they finally require removal of the cohesion inhibitor by combustion, and it is also difficult to prevent the surface area reduction which may result during the calcination of the catalyst. The latter method requires an apparatus for recoverng alcohol, and only produces a carrier which is inferior in water resisting property, and likely to break upon absorbing water. In addition, it is known to prepare molded catalyst by uniting a powdered inorganic oxide, or a xerogel thereof with a specific bonding agent or adhesive, as disclosed in Japanese Patent Publication Nos. 37517/1974 and 1677/1979, and Japanese Laid-Open Patent Application Nos. 55791/1976 and 125192/1979. This method does not only require the use of a special additive as has been the case with the aforementioned methods, but is also likely to produce a carrier having a double peaked pore distribution in which both small and large pores coexist. Thus, it is basically not suitable for the preparation of the catalyst according to this invention.

In view of the aforementioned problems heretofore involved in the manufacture of catalysts, the inventors of this invention have conducted extensive research to develop a method which can easily be applied for the preparation of the catalyst according to this invention without using any special additive such as the cohesion inhibitor required in the prior art, or any particularly complicated process, and have succeeded in developing a method which can very advantageously be employed for the purpose intended.

The method comprises adding to a seed hydrosol of at least one member selected from hydroxides of the elements belonging to Groups II, III and IV of the Periodic Table, while changing the pH value of the hydrosol to a hydrosol-dissolution region and to a hydrosol-precipitation region alternately, at least one hydrosol forming substance containing an element selected from the elements belonging to Groups II, III and IV of the Periodic Table during the change in the pH value to at least one side of the regions, thereby effecting growth of a crystallite of the seed hydrosol to a coarse aggregate hydrogel from which the carrier is prepared. Each of the steps of changing the pH value of the hydrosol to the dissolution region and changing the pH value to the precipitation region is performed at least one time, preferably 2 to 50 times.

The hydrosol forming substance is an element selected from among the elements belonging to Groups II, III and IV of the Periodic Table, or a compound thereof. Examples of preferred hydrosol forming substance include magnesium, boron, aluminum, silicon, titanium, zirconium, compounds thereof and mixtures thereof.

Specific examples of the hydrosol forming substance include magnesium compounds, such as magnesium hydroxide, $Mg(OH)_2$; magnesium oxide, $MgO$; magnesium carbonate, $MgCO_3$ or $MgCO_3.3H_2O$; magnesium nitrate, $Mg(NO_3)_2.6H_2O$; magnesium chloride, $MgCl_2.6H_2O$; and magnesium sulfate, $MgSO_4.7H_2O$. They also include boron compounds, such as boric acid, $H_3BO_3$; ammonium borate, $NH_4B_5O_8.4H_2O$; sodium borate, $Na_2B_4O_7.10H_2O$; and sodium perborate, $NaBO_3.4H_2O$. Also included as preferred starting materials are metallic aluminum, Al; and aluminum compounds, such as aluminum chloride, $AlCl_3$ or $AlCl_3.6H_2O$; aluminum nitrate, $Al(NO_3)_3.9H_2O$; aluminum sulfate, $Al_2(SO_4)_3$ or $Al_2(SO_4)_3.18H_2O$; polyaluminum chloride, $[Al_2(OH)_n—Cl_{6-n}]_m$ ($1 < n < 5$, and $m < 10$); ammonium alum, $(NH_4)_2SO_4.Al_2(SO_4)_3.24H_2O$; sodium aluminate, $NaAlO_2$; potassium aluminate, $KAlO_2$; aluminum isopropoxide, $Al[OCH(CH_3)_2]_3$; aluminum ethoxide, $Al(OC_2H_5)_3$; aluminum t-butoxide, Al-

[OC(CH$_3$)$_3$]$_3$; and aluminum hydroxide, Al(OH)$_3$. Particularly preferable are aluminum salts, such as aluminum chloride, AlCl$_3$ or AlCl$_3$.6H$_2$O; aluminum nitrate, Al(NO$_3$)$_3$.9H$_2$O; and aluminum sulfate, Al$_2$(SO$_4$)$_3$; and aluminates, such sodium aluminate, NaAlO$_2$; and aluminum hydroxide, Al(OH)$_3$. Preferred materials involving silicon include untrafine-grained anhydrous silica (SiO$_2$) or colloidal silica (SiO$_2$.XH$_2$O), which is a colloidal solution of ultrafine particles of silicon oxide, or silicic acid anhydride; sodium silicate, Na$_2$O.XSiO$_2$.YH$_2$O (x=1 to 4); silicon tetrachloride, SiCl$_4$; and silicic acid ester, Si(OCH$_3$)$_4$ or Si(OC$_2$H$_5$)$_4$. Particularly preferred are colloidal silica, and sodium silicate. Preferred materials involving titanium are, for example, orthotitanic acid, H$_4$TiO$_4$; metatitanic acid, H$_2$TiO$_3$; titanium oxide, TiO$_2$; titanium chloride, TiCl$_3$ or TiCl$_4$; titanium sulfate, Ti$_2$(SO$_4$)$_3$ or Ti(SO$_4$)$_2$; titanium oxysulfate, TiOSO$_4$; titanium bromide, TiBr$_4$; titanium fluoride, TiF$_3$ or TiF$_4$; and titanic acid ester, Ti[O.CH(CH$_3$)$_2$]$_4$. Examples of preferred materials involving zirconium are zirconyl chloride, ZrOCl$_2$.8H$_2$O; zirconyl hydroxide, ZrO(OH)$_2$; zirconyl sulfate, ZrO(SO$_4$); sodium zirconyl sulfate, ZrO(SO$_4$).Na$_2$SO$_4$; zirconyl carbonate, ZrO(CO$_3$); ammonium zirconyl carbonate, (NH$_4$)$_2$ZrO(CO$_3$)$_2$; zirconyl nitrate, ZrO(NO$_3$)$_2$; zirconyl acetate, ZrO(C$_2$H$_3$O$_2$)$_2$; ammonium zirconyl acetate, (NH$_4$)$_2$ZrO(C$_2$H$_3$O$_2$)$_3$; zirconyl phosphate, ZrO(HPO$_4$)$_2$; zirconium tetrachloride, ZrCl$_4$; zirconium silicate, ZrSiO$_4$; zirconium oxide, ZrO$_2$.

The preferred hydrosol forming substances for the preparation of a catalyst according to this invention are those which ultimately give a porous inorganic oxide carrier, such as alumina, silica, magnesia, titania, boria, zirconia, silica-alumina, silica-magnesia, silica-titania, silica-zirconia, alumina-magnesia, alumina-titania, alumina-boria and alumina-zirconia.

The preparation of a catalyst according to this invention will now be described in further detail.

(1) Formation of a Seed Hydrosol

According to this invention, a seed hydrosol formed of at least one member selected from hydroxides of the elements belonging to Groups II, III and IV of the Periodic Table is first established. The seed hydrosol can be prepared by any known method, such as by heterogeneous precipitation, homogeneous precipitation, coprecipitation, ion exchange, hydrolysis and metal dissolution using as starting material at least one of the above-mentioned hydrosol forming substances. If it is desired to obtain larger seed hydrosol particles, it is sufficient to age or hydrothermally treat the seed hydrosol obtained by any of the aformentioned methods.

Heterogeneous precipitaton is a method in which an alkaline or acidic solution of a hydrosol forming substance is neutralized with a solution containing an acid or alkaline salt. For example, ammonia, sodium hydroxide, or the like is added as a neutralizing agent into a solution of a hydrosol forming substance in the form of a nitrate or sulfate, while it is being stirred; or a solution of a hydrosol forming substance in the form of an alkali metal salt or an ammonium salt is neutralized with hydrochloric or sulfuric acid, and converted to a hydroxide. A specific example of such heterogeneous precipitation comprises adding ammonia or sodium hydroxide into a solution containing aluminum nitrate, magnesium nitrate or titanium sulfate as a neutralizing agent, while it is being stirred, thereby forming a seed hydrosol of alumina, magnesia or titania.

Homogeneous precipitation is basically the same as heterogeneous precipitation, but is distinguished from it by maintaining the concentration of the neutralizing agent uniform throughout neutralization to ensure uniform precipitation. For example, homogeneous precipitation from a solution containing a hydrosol forming substance in the form of an acid salt employs an ammonia releasing substance, e.g., urea or hexamethylenetetramine, as a neutralizing agent. A specific example of homogeneous precipitation comprises dissolving a necessary quantity of urea in an aluminum nitrate solution, heating the resulting mixed solution gradually while stirring it, whereby decomposing the neutralizing agent gradually to cause it to release ammonia, and neutralizing the aluminum nitrate with the released ammonia gradually to convert it to a seed alumina hydrosol.

Coprecipitation is a method for preparing a hydrosol by neutralizing simultaneously at least two acidic or alkaline hydrosol forming substances together, or neutralizing a mixture of at least one acidic hydrosol forming substance and at least one alkaline hydrosol forming substance. A specific example of this method comprises adding sodium hydroxide as a neutralizing agent into a mixed solution containing both aluminum nitrate and magnesium nitrate, while stirring it, thereby forming a coprecipitated seed hydrosol of alumina and magnesia; or adding a magnesium nitrate solution into a sodium aluminate solution for neutralization, while stirring it, whereby a coprecipitated seed hydrosol of alumina-magnesia is formed.

The ion exchange method forms a colloidal sol by exchanging with an ion exchange resin cations or anions coexisting in a solution containing a hydrosol forming substance. A specific example of this method comprises passing a dilute solution of sodium silicate through a cation exchange resin, and heating the resulting solution to polymerize the silica particles therein, thereby forming a colloidal silica sol. Commercially available colloidal silica or alumina is usually prepared in this way.

The method involving hydrolysis forms a hydrosol by adding water into a hydrolyzable hydrosol forming substance to effect its hydrolysis. A specific example of this method comprises adding an alcoholic solution of titanium tetrachloride or aluminum isopropoxide gradually into water, while stirring it, to effect its hydrolysis, whereby a seed titania hydrosol or alumina hydrosol is formed.

The method involving metal dissolution employs an alkaline substance formed by dissolution of a metal, as a neutralizing agent for an acidic hydrosol forming substance. A specific example of this method comprises keeping an aluminum nitrate solution boiling, and adding metallic aluminum powder gradually into the solution to dissolve it therein, whereby aluminum hydroxide is formed and acts as a neutralizing agent to form a seed alumina hydrosol.

The properties, or crystal size or condition of the hydrosol particles thus formed can be modified appropriately, for example, by aging or hydrothermal treatment. For example, an alumina hydrosol can have its particles enlarged by aging, and if the aging treatment is conducted under heat, there are formed particles enlarged by the progress of pseudo-boehmitization. If the pseudoboehmitized hydrosol particles are treated hydrothermally at a temperature of 100° C. to 300° C., there are obtained hydrosol particles having a boehmite crystal form. If the degree of this hydrothermal treatment is controlled appropriately, it is possible to vary the size of the particles in the range of about 50 Å to about 5,000 Å. The crystal growth of the hydrosol particles can be easily controlled, if the hydrothermal treatment is performed in the presence of chromic, tungstic or molybdic acid ions. If a hydrosol composed of magnesium hydroxide particles is aged under heat for several hours, it is possible to increase its stability in water several times. If a hydrosol of titanium hydroxide particles is aged under boiling for at least one hour, its crystal form can be changed from the $\alpha$- to $\beta$-form.

For the manufacture of a catalyst according to this invention, it is preferable to prepare a seed hydrosol as described below:

An aqueous solution of an aluminum salt is mantained at a temperature of at least 70° C., and an acid or alkaline solution is added into the aluminum salt solution to adjust its pH value to 6–11, thereby forming a seed alumina hydrosol, and additionally if desired, the hydrosol is aged at 70° C. or above for 0.5 hour;

An aluminum salt or an aqueous solution thereof is neutralized to form an alumina hydrosol, and the hydrosol is hydrothermally treated at a temperature of about 100° C. to about 300° C. for about 0.5 to 24 hours, by adding chromic, tungstic or molybdic acid ions if desired;

An aqueous solution of sodium silicate containing 1 to 8% by weight of silica is maintained at a temperature of 10° C. to 70° C., and an acid is added thereinto to adjust its pH to a value ranging from 6 to 10, whereby a silica hydrosol is formed, and if desired, the hydrosol is aged at a temperature of 10° C. to 100° C. for 0.5 to 24 hours;

An aqueous solution of a titanium salt is maintained at a temperature of 10° C. to 100° C., and an alkaline solution is added thereinto to adjust it to pH 4 to 11, or alternatively, a titanium salt or an aqueous solution thereof is gradually added into water at room temperature for the hydrolysis of the titanium salt, whereby a titania hydrosol is formed, and if desired, the hydrosol is aged at a temperature of 50° C. to 100° C. for 0.5 to 24 hours;

An aqueous solution of a zirconium salt is maintained at a temperature of 10° C. to 100° C., and an alkaline solution is added thereinto to adjust it to pH 4 to 11, or alternatively, a zirconium salt or an aqueous solution thereof is added gradually thereinto for the hydrolysis of the zirconium salt, whereby a zirconia hydrosol is formed, and if desired, the hydrosol is aged at a temperature of 50° C. to 100° C. for 0.5 to 24 hours; or An aqueous solution of an acidic magnesium salt is maintained at a temperature of 10° C. to 100° C., and an alkaline solution is added thereinto to adjust it to pH 6 to 11, whereby a magnesia hydrosol is formed, and if desired, the hydrosol is aged at a temperature of 50° C. to 100° C. for 0.5 to 24 hours.

As described above, various methods are known for preparing seed hydrosols, and modifying them. In this connection, it is to be noted that as the preparation of those seed hydrosols is a matter well known to the art, nothing connected therewith imposes any limitation on the method of preparing a catalyst according to this invention. The preparation of the seed hydrosol may be carried out appropriately to suit the type of the hydrosol forming substance to be used as the starting material for the seed hydrosol, and the intended physical properties of the catalyst to be prepared. A commercially available hydrosol may be employed, if appropriate. There is no limitation in particular to the hydrosol concentration, unless it has undergone total gelation to the extent that it cannot be stirred. Usually, however, its concentration is not greater than 10% by weight, particularly about 0.1 to 5.0% by weight.

(2) Growth of Seed Hydrosol to a Hydrogel

The method of preparing a catalyst according to this invention is saliently featured by including a step for homogeneous growth of the seed hydrosol, as this step enables the industrial manufacture of the catalysts having the physical properties intended by this invention.

During this step, the pH of the seed hydrosol is changed between a dissolution region (or a first pH region) where fine hydrosol particles are dissolved, and a precipitation region (or a second pH region) where the dissolved hydrosol is precipitated, by alternatively adding first and second pH controlling agents. At least one of the first and second pH controlling agents includes the aforementioned hydrosol forming substance or substances so that ultimately, the size of the seed hydrosol particles increases uniformly. When the pH of the hydrosol is in the precipitation region, fine hydrosol particles dissolved in the dissolution region and the hydrosol formed from the hydrosol forming substance deposit on the undissolved hydrosol, whereby the hydrated oxide crystallites are allowed to grow. On the other hand, when the pH of the hydrosol is in the dissolution region, fine crystallites of the hydrosol are dissolved so that there remains only seed hydrosol having a certain level of sizes.

Such pH variation is effected by using a pH controlling agent. As the pH adjusting agent, it is advantageous to use the hydrosol forming substance per se. If the hydrosol forming substance is an acid substance, it acts as a pH controlling agent for lowering the pH of the hydrosol, while an alkaline hydrosol forming substance can be used to raise it. If the hydrosol forming substance is neutral, or if the hydrosol forming substance alone is not sufficient to provide a satisfactory pH control for the hydrosol, another suitable acidic or alkaline material may be used for the pH control. If an acidic material is required, both organic and inorganic acids can be used, and include, for example, nitric acid ($HNO_3$), hydrochloric acid (HCl), sulfuric acid ($H_2SO_4$), carbonic acid ($H_2CO_3$), formic acid (HCOOH), and acetic acid ($CH_3COOH$). Examples of suitable alkaline substances include ammonia ($NH_3$), sodium hydroxide (NaOH), potassium hydroxide (KOH), sodium carbonate ($Na_2CO_3$, $Na_2CO_3.H_2O$, $Na_2CO_3.7H_2O$ or $Na_2CO_3.10H_2O$), potassium carbonate ($K_2CO_3$ or $K_2CO_3.1.5H_2O$), sodium hydrogencarbonate ($NaHCO_3$), potassium hydrogencarbonate ($K_2HCO_3$), potassium sodium hydrogencarbonate ($KNaCO_3.6H_2O$) and sodium aluminate ($NaAlO_2$). Thus, when, for example, the dissolution and precipitation regions are acidic and alkaline pH regions, respectively, an acidic hydrosol forming substance alone, an acidic material alone or a combination of a neutral or acidic hydrosol forming substance and an acidic material can be used as the first pH controlling agent for adjusting the pH of the hydrosol to the dissolution region, while an alkaline hydrogel forming substance alone, an alkaline material alone or a combination of a neutral or alkaline hydrosol formingsubstance and an alkaline material may be employed as the second pH controlling agent for adjusting the pH of the hydrosol to the precipitation region. A suitable combination may be selected in accordance with the sol intended. When the pH controlling agent is a combination of a hydrosol forming substance and an acidic or alkaline material, the hydrosol forming substance may be added before, simultaneously with, or after the addition of the acidic or alkaline material.

The method of this invention includes a cycle of the sequential steps of changing the pH of the hydrosol from the precipitation region to the dissolution region and bringing it back to the precipitation region to effect the crystal growth of the seed hydrosol to a coarse mass of hydrogel particles having an ultimately uniform size. According to this invention, the porous structure of the catalyst to be prepared depends on how often such cyclic pH variation is repeated. The number of times of the cycle of the sequential steps may be only once, but is usually from twice to fifty times. The quantity of the hydrosol forming substance added every time is so controlled as to ensure maintenance of a uniformly agitated condition in the reaction vessel, so that a uniform hydrosol particle dispersion may be established. If the concentration of the hydrosol particles is too high, it is difficult to stir the hydrosol uniformly, resulting undesirably in the occurrence of differences in the hydrosol concentration from one place to another, which may prevent the uniform growth of the hydrosol particles. The quantity of the hydrosol forming substance added every time may generally be expressed by way of the quantity of an oxide thereof, and ranges from 2 to 200 mol % of the total amount, in terms of oxide, of the seed hydrosol and the hydrosol forming substance which has been added to the seed hydrosol, i.e. the total amount of the hydrosol present at each time of addition of the hydrosol forming substance. The total quantity of the hydrosol forming substance added throughout this hydrosol growing stage is so determined that the hydrosol to be ultimately formed may contain about 1 to 10% by weight of hydrosol particles in terms of the weight of an oxide thereof. The quantity of the hydrosol forming substance to be added in each pH variation is preferably the same, but may be variable in the range of $-75\%$ to 400% by weight relative to the average quantity through all the variation steps. The hydrosol forming substance is added into the hydrosol in a form which is easily soluble therein, for example, in the form of fine powder or a solution. In the event the hydrosol forming substance is added in the form of an aqueous solution thereof, it has a concentration of 0.05 to 5% by weight, preferably 0.1 to 3% by weight, in terms of the weight of an oxide thereof.

The reaction for the growth of the seed hydrosol particles is caused to take place with agitation. This agitation is conducted to ensure that the concentration of the hydrosol particles in the reaction vessel may have as uniform a distribution as possible in order to achieve the uniform growth of the hydrosol particles and to prevent fine hydrosol particles from staying in the hydrosol without being adsorbed by larger particles. In order to attain these objects successfully, it is preferable to carry out the agitation as quickly as possible. The hydrosol is maintained in the dissolution region for a sufficient time to ensure that new fine hydrosol particles formed by each addition of the hydrosol forming substance be completely dissolved to form a hydrosol having a uniform particle size. If the hydrosol is left in the dissolution region for an unnecessarily long time, its particles are dissolved to an unnecessary extent, and their crystal growth is seriously inhibited. The length of this holding time is closely related to the value of pH of the dissolution region and the type of the hydrosol, and is desired to be selected appropriately to suit them. The holding time may usually be in the range of about one to sixty minutes after addition of the first pH controlling agent. It should be shortened with a decrease in the value of pH if the pH of the dissolution region is on the acid side, and with an increase in the pH value if the dissolution region is on the alkaline side. For example, a hydrosol of alumina has a pH range of 5 to 2, and the holding time therefor may approximately be from one to thirty minutes. A catalyst prepared from a hydrosol having an uneven particle size is inappropriate for the hydrotreatment of a heavy hydrocarbon oil, since it has its specific surface area reduced by sintering of fine particles during its calcination and is formed with many fine pores. If the hydrosol is held appropriately in the dissolution region, its particles are made uniform in size.

The hydrosol may be held in the precipitation region after addition of the second pH controlling agent for a period of time sufficient to ensure that the hydrosol forming from the hydrosol forming substance and the dissolved fine hydrosol particles be occluded by the seed hydrosol particles unified in size during the dissoluion region to cause new crystal growth of the hydrosol particles, and that the growth of those crystal particles be stabilized. This holding time is usually longer than that for the dissolution region, and may approximately range from one minute to ten hours. For alumina, the holding time may approximately be from one minute to ten hours with a pH range of 9 to 11, and for silica-alumina, it may approximately be from one minute to ten hours with a pH range of 6 to 11.

As is obvious from the foregoing, the pH of the hydrosol provides a guideline for the holding thereof in the dissociation or precipitation region, and its magnitude has a very great bearing on the rates of hydrosol dissolution and precipitation. It is a very important factor, since it also sometimes influences the crystal form of hydrosol particles growing while the hydrosol is in the precipitation region.

The pH range differs with the type of the hydrosol forming substance employed, the pH controlling agent, their combination, the proportions of the components in case of a multi-component hydrosol, the type of the particles in a hydrosol slurry, their crystal form and concentration, the slurry temperature, the type of the salt present in the slurry if any, or the like, but generally, the precipitation region has a pH of 7 $\pm 5$, while the remaining acidic or alkaline range represents the dissolution range. For example, the precipitation region for an alumina hydrosol generally has a pH of 6 to 12, while its dissolution region has a pH value less than 6 or greater than 12. For the purpose of this invention, however, it is desirable to vary the pH value of an alumina hydrosol between the dissolution region of pH 5 or below and the precipitation region of pH 6 to 11. For a silica hydrosol, its precipitation region has a pH less than 9, and its dissolution region a pH of 9 or above. A titania hydrosol has its dissolution region at less than pH 1.5, and its precipitation region at pH 1.5 or above. A magnesia hydrosol has its dissolution region at less than pH 9, and its precipitation region at pH 9 or above. A zirconia hydrosol has its dissolution region at less than pH 2, and its precipitation region at pH 2 or above. For a hydrosol composed of a composite oxide, such as silica-alumina, magnesia-alumina, silica-magnesia and alumina-titania, its dissolution and precipitation regions differ from those for its individual components, but depend on the proportions of its components, temperature, or the like. These pH ranges can be easily determined by simple preliminary tests, and selected appropriately based on the results thereof. It is also possible to obtain any intended mixed hydrosol ultimately merely by effecting the pH variation in the dissolution and precipitation regions for one of the components. An alumina-silica hydrosol has its dissolution region in the vicinity of a pH value less than 6, or pH 9 or above, and its precipitation region in the vicinity of pH 6 to 9, though strictly, these pH ranges must be selected to suit the proportions of its components, and other factors on a case to case basis.

A composite oxide hydrogel may be prepared by using as seed hydrosol a mixed hydrosol composed of a mixture of the hydrosol forming substances containing all the elements required for the intended composite oxide, or a hydrosol containing one of the components of the mixed hydrosol. For example, a silica-alumina hydrogel can be obtained from a mixed hydrosol containing silicon and aluminum as a seed hydrosol by adding thereto alternately an acidic pH controlling agent including a mixed hydrosol forming substance containing silicon and aluminum, and an appropriate alkaline material, or alternatively, by using a seed hydrosol containing only aluminum, and adding thereto alternatively an acidic pH controlling agent including an alumina hydrosol forming substance, and an alkaline pH controlling agent including a silica hydrosol forming substance. As a further alternative, the mixed hydrogel can also be prepared by using a silica hydrosol as a seed hydrosol.

The temperature of a hydrosol is a factor which influences the rates of dissolution and formation of hydrosol particles. It also influences the crystal form of hydrogel particles growing in the precipitation region, as the pH value does. In the case of alumina, for example, there is formed amorphous aluminum hydroxide at room temperature, and pseudoboehmite at a temperature of 50° C. or above. A silica-alumina hydrogel is amorphous in the vicinity of room temperature. Magnesia is in the form of magnesium hydroxide which is stable in water at 50° C. or above. Titania forms $\beta$-titanic acid at 80° C. or above.

The type and quantity of the ions present in the hydrosol also influence the crystal growth of hydrosol particles, and are desired to be appropriately controlled. Particularly, polyvalent anions are likely to inhibit the crystal growth, and are desired to be reduced to 30% by weight or less, preferably 15% by weight or less.

When the hydrosol is placed in the final precipitation range after the repeated pH variation, it is precipitated as a hydrogel. The hydrogel may be aged in the aging process to be hereinafter described.

The aforementioned operating conditions may be appropriately selected to suit the type of the hydrogel to be prepared, and the ultimate catalyst structure intended. The selection of these conditions would be obvious to one of ordinary skill in the art of hydrotreating catalysts from the foregoing disclosure.

For the purpose of this invention, the hydrosol means a uniform dispersion in water of particles of a hydroxide of at least one element selected from among the elements belonging to Groups II, III and IV of the Periodic Table, used for forming the carrier, i.e., hydrosol particles, and in which the water forms a continuous phase in which the particles can freely move. It is usually a colloidal milky liquid. The hydrogel is a substance formed by precipitation of hydrosol particles, and in which the particles contact one another and cannot move freely any longer. It is usually a gel-like solid. The dissolution region for a hydrosol means a pH range in which, when a hydrosol forming substance has been added into the hydrosol, the substance can stay in water stably in dissolved form, and in which fine hydrosol particles can be dissolved. The precipitation region for the hydrosol means a pH range in which the hydrosol forming substance and the dissolved fine hydrosol particles can no longer stay stably in dissolved form in water, but are precipitated.

(3) Aging of a Hydrogel

The aging of a hydrogel is optionally carried out and can be considered as the final step of the aforementioned hydrosol growing stage. It comprises holding the grown hydrogel in the hydrosol precipitation region for a certain length of time, whereby the hydrosol particles are unified in size, and stabilized. The effect of the aging can be enhanced by stirring, and aging under heat is particularly desirable, since it is likely to stabilize the crystal form of the hydrosol particles. Aging is generally conducted at a temperature from ambient to 100° C., and if it is performed at a temperature above 100° C., it is carried out under pressure. The aging time is approximately in the range from 0.5 to 24 hours. The hydrogel does not always need to be aged, but may be transferred to the following process without undergoing any aging treatment.

(4) Washing of the Hydrogel

The grown hydrogel is washed, if required, for removing any unnecessary ions or impurities. Washing is usually performed once, or repeated a plurality of times, alternately with filtration. Water is usually used as a washing medium. The washing of the hydrogel removes sodium, iron, sulfuric acid radicals, and any other component that may poison the catalyst or reduce its strength, to the extent that their presence is not detrimental any more. In order to increase the washing effect, it is possible to add into the washing medium an acidic or alkaline substance which can be decomposed and removed during the later precalcining or calcining process, such as ammonia, nitric acid, ammonium nitrate and ammonium chloride, and to control its pH value in a suitable range, whereby the poisonous or impure matter can be rendered more soluble in the washing medium. In order to improve the solubility of such impure matter in the washing medium, it is also useful to raise the temperature of the washing medium, since it reduces the surface tension of the water and increases the rate of filtration, whereby its washing efficiency is improved. The washing of the hydrogel is preferably continued until its impurity content is minimized, and generally until, for example, sodium as $Na_2O$ has been reduced to 0.2% by weight or less, iron as Fe to 0.2% by weight or less, and sulfuric acid radicals to 4.0% by weight or less. Silica should preferably be reduced to 2.0% by weight or less in the form of $SiO_2$, if any such silica is present as impure matter. The washing or cleaning of the hydrogel may be carried out by using a customary apparatus, such as an atmospheric, vacuum or pressure filtration machine, and a centrifugal separator.

When the sequential pH variation steps are repeated many times, the washing step may additionally be conducted in the midst of the hydrosol growing stage.

(5) Control of Solids in the Hydrogel

The solids content of the hydrogel is controlled in the range of about 10 to 80% by weight, preferably 15 to 65% by weight to facilitate its molding. If its solid content is less than about 10% by weight, it is difficult to maintain a shape molded from the hydrogel, while any solid content in excess of about 80% by weight requires an extremely high molding pressure, and also results in the formation of a catalyst failing to possess any satisfactory physical property. The adjusting of the solids content of the hydrogel may be carried out by dehydration by drying under heat, spray drying, atmospheric, vacuum or pressure filtration, centrifugal separation, or otherwise until a desired solids content is reached.

(6) Molding of the Hydrogel

The hydrogel, of which the solids content has thus been adjusted is molded into a shape which is suitable for the purpose for which the catalyst is intended. The shape may be circular, cylindrical, whether solid or hollow, or non-circular in cross section, e.g., oval, trilob or quadri-lob. The hydrogel may also be molded into a granular form. The molding of the hydrogel may be appropriately carried out by extrusion molding with a piston or screw type extruder, or by tablet formation with a press or the like. The formation of the hydrogel into granules may be performed by, for example, oil dropping and wet granulation.

(7) Drying and Precalcination of Molded Hydrogel Products

The hydrogel product which has been molded into the desired shape and dimensions is dried, and precalcined if required. This is done in order to stabilize the shape of the hydrogel molding. The precalcination is preferably carried out at as high a temperature as practically possible, but appropriate conditions must be selected on a case to case basis, since some types of hydrogel are likely to cause sintering or crystal deformation when calcined. Generally, the hydrogel is precalcined at 300° to 1,000° C., preferably 400° to 700° C. The precalcination of the hydrogel molding is preceded by its drying or xerogelation. The hydrogel molding is air dried, or dried at a temperature of at least 100° C. In practice, the drying and precalcination of the hydrogel molding are carried out by drying it with hot air and calcining it in a heating furnace, or placing it in a heating furnace and raising its temperature from 100° C. to a level required for its calcination. This process usually requires 0.5 to 10 hours. When the hydrogel has, thus, been heated, or calcined or fired at a high temperature, it is converted to an oxide.

(8) Supporting of Catalytic Metal Component

A catalytic metal component is supported on the dry hydrogel (xerogel) or the precalcined product thereof, if no such metal component has been added during the aforementioned hydrogel forming process. For this purpose, any known starting material or method of preparing the same may be employed, only if it is possible to disperse a predetermined quantity of such component uniformly in the catalyst. For example, the starting material can be selected from among various kinds of compounds each containing a single or a plurality of specific elements, and any known method suiting the starting material can be used for preparing the necessary component.

The metal of the catalytic metal component for the catalyst according to this invention is selected from among the metals belonging to Groups VB, VIB, VIII and IB of the Periodic Table. Vanadium, chromium, molybdenum, tungsten, cobalt, nickel and copper are particularly preferred.

Examples of the molybdenum compounds for use as the material for the catalytic metal component include oxides such as $MoO_3$ and $MoO_2$, molybdic acid and its salts such as $H_2MoO_4$, $H_2MoO_3H_2O$, $(NH_4)$—$Mo_2O_7$, $(NH_4)_2MoO_4$ and $(NH_4)_6Mo_7O_{24}.4H_2O$, and chlorides such as $MoCl_3$ and $MoCl_4$. Examples of the relevant cobalt compounds include oxides such as $CoO$, $Co_2O_3$, $CoO_2$ and $Co_3O_4$, cobalt salts such as $CoCl_2$, $CoCl_2.6H_2O$, $Co(NO_3)_2.6H_2O$, $CoSO_4.7H_2O$, $Co(CH_3CO_2)_2.4H_2O$ and $CoC_2O_4.2H_2O$, cobalt hydroxide $Co(OH)_2$, and cobalt carbonate (basic). Examples of the relevant nickel compounds are nickel oxide, $NiO$; nickel salts such as $NiCl_2$, $NiBr_2NiI_2$ and the hydrates thereof, $Ni(NO_3)_2.6H_2O$, $NiSO_4.6H_2O$, $Ni(CH_3CO_2)_2.4H_2O$ and $NiC_2O_4.2H_2O$; nickel hydroxide, $Ni(OH)_2$; nickel carbonate; and nickel acetylacetonato. Examples of the relevant tungsten compounds include oxides such as $WO_3$ and $WO_2$; and tungstic acid and its salts such as ammonium paratungstate and ammonium metatungstate. The relevant copper compounds are, for example, copper nitrate, copper chloride, copper acetate and copper sulfate.

Various methods are available for supporting these catalytic metal components on the carrier prepared as hereinbefore described. For example, predetermined quantities of cobalt and molybdenum are preferably supported on the dried or precalcined hydrogel by impregnating the latter with an ammoniac aqueous solution of cobalt nitrate and ammonium molybdate. It is, however, possible to use any other known method, e.g., mixing, impregnation, kneading, or ion exchange. Alternatively, it is possible, as stated above, to select the aforementioned hydrotreating catalytic metal compound or compounds appropriately as required, and add them as a part of the pH controlling agent during the hydrosol growing stage. Whichever of these methods may be adopted, there is hardly any difference in the performance of the catalyst to be obtained, if the necessary quantity of the catalytic metal component is supported on, or incorporated into the carrier.

Vanadium can be combined with the dried or precalcined hydrogel by contacting the latter with a non-oily, nonhydrocarbon or polar medium containing a soluble vanadium compound, so that the carrier material may contain or support the vanadium compound, followed by sulfurization. The term "non-oily" as herein used refers to a medium, such as an aqueous solution, and an alcoholic solution. Examples of the soluble vanadium compound include vanadyl oxalate, vanadyl sulfate, ammonium metavanadate, acetylacetone vanadium, and vanadium oxide. As these vanadium compounds are generally difficult to dissolve in water or like medium, it is desirable to heat the medium, or acidify or alkalize it in order to improve the solubility of the vanadium compound therein. For example, ammonium metavanadate has a water solubility of 0.52 g/100 g $H_2O$ at 15° C., and 6.95 g/100 g $H_2O$ at 96° C., and its decomposition takes place in the vicinity of 96° C. As the vanadium compound has such a low solubility in water, it is desirable to add oxalic acid in order to improve its solubility.

Vanadium can also be incorporated into the carrier by the method disclosed in Japanese Laid-Open Patent Publication No. 54036/1980, wherein the carrier material is contacted with a heavy hydrocarbon oil containing a large quantity of catalyst metals, particularly vanadium and sulfur is a hydrogen atmosphere with a hydrogen pressure of 30 to 250 atm., preferably 80 to 160 atm. at 300° C. to 500° C., preferably 390° to 420° C., whereby the hydrocarbon oil is demetallized and desulfurized, and a predetermined quantity of sulfurized metal, particularly vanadium sulfide ($VS_x$), is deposited on the carrier surface. The heavy hydrocarbon oil used for this purpose is more effective if it contains more vanadium, and specifically, it is desirable to use oil containing at least 200 ppm of vanadium, preferably at least 400 ppm of vanadium.

In addition to the above-mentioned catalytic metal component for catalytic hydrotreatment, it is effective to add fluorine or phosphorus to the catalyst in order to improve its activity for other specific reactions, such as denitrification and reduction of Conradson carbon residue. These auxiliary catalytic elements can be incorporated into, or supported on the catalyst in a quantity of about 0.2 to 4.0% by weight in a customary manner. In order to incorporate fluorine, it is possible to add hydrogen fluoride (HF), ammonium fluoride ($NH_4F$), ammonium hydrogenfluoride ($NH_4HF_2$), or the like. If phosphorus is to be incorporated, it is possible to use phosphorus oxide ($P_2O_5$), phosphoric acid or a salt thereof, such as orthophosphoric acid, metaphosphoric acid, pyrophosphoric acid and ammonium phosphate, or the like. These fluorine or phosphorus compounds may be added with the metal component for hydrotreatment. In other words, it is possible to use a substance containing two or more catalyst forming elements, such as titanium phosphate, phosphotungstic acid, phosphomolybdic acid and ammonium phosphomolybdate.

Various known methods may be used for incorporating the catalytic metal component or auxiliary components such as fluorine and phosphorus. See, for example, "Handbook of Catalysts", Japanese Catalyst Society, Catalyst Engineering Course, Vol. 10, Chijin Shokan (1967).

The catalytic metal component thus supported on the carrier is dried, and calcined so that it may be firmly secured to the carrier. It may be dried and calcined under the same conditions with the aforementioned precalcination of the hydrogel. The calcination temperature is appropriately selected to suit the components forming the catalyst, since too high a temperature is likely to cause changes in the physical properties of the carrier material by sintering, and reduction in the activity of the catalyst by chemical reaction between the catalytic metal component and the carrier material. The drying and calcining step is carried out in a temperature range of about 100° C. to about 1,000° C. as is the case with the precalcining step.

As described previously, supporting of the catalytic metal component on the carrier material cannot only be effected after drying or calcining the hydrogel, but can also be effected before molding the hydrogel, even during the growth of the hydrosol. For example, the catalytic metal component may be added to the hydrosol in the form of a soluble salt together with a pH controlling agent, or as a part thereof. The hydrogel into which the metal component has been added is molded, formed into xerogel and ultimately calcined, whereby to obtain a catalyst having the catalytic metal component composited with the inorganic oxide carrier. In an alternative, the catalytic metal component may be added into the grown hydrogel and kneaded therewith in order to incorporate the metal component into the hydrogel. The hydrogel into which the metal component has been mixed is molded, formed into a xerogel, and calcined, whereby it is converted to an inorganic oxide in which the metal component is dispersed.

The catalyst of this invention can be prepared industrially advantageously by the method as hereinabove described. It is particularly to be noted that the specific process employed for promoting the growth of the hydrogel makes it possible to manufacture the catalyst having a special porous structure according to this invention.

By virtue of its specific porous structure, the catalyst of this invention provides superior results not achieved by any known catalyst when applied for hydrotreating a heavy hydrocarbon oil containing asphaltenes. Description will now therefore be made in detail of a process for hydrotreating a heavy hydrocarbon oil by using the catalyst of this invention.

The process for hydrotreating according to this invention includes the step of bringing a heavy hydrocarbon oil containing asphaltenes into contact with the catalyst of this invention under hydrotreating conditions to cause the asphaltenes to be decomposed and converted to lower molecular compounds, and reduce the contaminants, such as heavy metals, sulfur compounds and nitrogen compounds, which the oil contains. For the purpose of this invention, therefore, the term "hydrotreatment" means treating a heavy hydrocarbon oil containing high molecular hydrocarbon fractions, such as asphaltenes, to reduce their contents by converting them to distillable hydrocarbon fractions or hydrocarbon fractions soluble in a light hydrocarbon, and also treating the heavy hydrocarbon oil in a hydrogen atmosphere to remove or reduce contaminants, such as heavy metals, and sulfur and nitrogen compounds, therefrom.

The feedstock oil for which the hydrotreating process of this invention is intended is a heavy hydrocarbon oil containing at least about 2% by weight, particularly at least 5% by weight, of asphaltenes, and at least 50 ppm, and particularly at least 80 ppm, of heavy metals. If an asphaltic heavy hydrocarbon oil containing large quantities of vanadium and sulfur is hydrotreated by using the novel catalyst of this invention, vanadium and sulfur are removed from the oil, especially from the asphaltenes therein, and the asphaltenes are decomposed and converted to lower molecular compounds. The vanadium and sulfur thus removed form vanadium sulfide ($VS_x$) and are deposited on the catalyst surface, and this compound shows activity for further demetallization, desulfurization and selective decomposition of asphaltenes. As asphaltenes are decomposed, the catalyst has little coke deposited thereon, and can maintain a high activity for a long period of time. While such vanadium compounds in a heavy hydrocarbon oil have hitherto been considered to poison any known hydrotreating catalyst such as Ni-Co-Mo-$\gamma$ alumina catalyst, it serves as an active substance $VS_x$ for the catalyst of this invention when deposited on its substrate, as disclosed in Japanese Patent Application No. 153200/1978. Thus, the catalyst of this invention has a very high value when put to practical use, as opposed to any known catalyst. The catalyst of this invention shows unique reactions not observed with any known catalyst, such as decomposition and conversion of asphaltenes into lower molecular compounds, and selective demetallization and desulfurization for asphaltenes, though the mechanisms of these reactions have not yet been fully clarified.

Asphaltenes, which are responsible for accelerating reduction in the activity of a catalyst, are generally considered to be micellar macromolecules formed by association of molecules of several high molecular aromatic condensed rings and dispersed in oil in the form of colloid. It is also believed that vanadium plays a significant part in the association of asphaltene molecules in such a manner that an organic vanadyl (VO) compound, or the like forms intramolecular and intermolecular complexes with asphaltene molecules, whereby the asphaltene molecules are associated with one another to form micellar molecules. (T. F. Yen, "In Role of Trace Metals in Petroleum", Ann Arbor, Mich., Ann Arbor Scientific Publishers, 1975.) It is also understood that asphaltenes are high polymers composed of crosslinked recurring units each having an approximate molecular weight of 800 to 1,200 and containing a polycyclic aromatic nucleus to which aliphatic side chains, naphthene rings, etc. are bonded, and that the crosslinked bonds include relatively weak bonds as compared with the C—C bonds in ether and thioether [see, for example, J. P. Dickie and T. F. Yen, Anal. Chem., 39, page 1,847 (1967); G. A. Haley, Anal. Chem., 43, page 371 (1971); P. A. Witherspoon and R. S. Winniford, "Fundamental Aspects of Petroleum Geochemistry", in B. Nagy and U. Colombo (ed), Elsevier, Amsterdam, pages 261–297 (1967); and T. Igrasiak et al., J. Org. Chem., 42, page 312 (1977)]. In view of the properties of asphaltenes heretofore reported and the afore-mentioned characteristics of the reactions caused by the catalyst of this invention, it is possible to give the following qualitative assumption for the mechanisms of the reactions caused by the catalyst of this invention.

When asphaltenes in a heavy hydrocarbon oil diffuse into the pores of the catalyst and are adsorbed by the active centers composed of the catalytic metal components carried on the internal surface of the catalyst, the removal of vanadium and sulfur takes place, and the intramolecular and intermolecular vanadium complexes in asphaltenes are withdrawn, and deposited and fixed on the catalyst surface. As the micells in the asphaltenes have lost the vanadium complexes, its molecular association is broken and decomposed into the individual molecules, and as the intramolecular trioether and other weak bonds in the asphaltenes are selectively broken by desulfurization, the asphaltenes are depolymerized and their molecular weight is lowered. As the vanadium sulfide, $VS_x$, formed during the course of the reaction is active for the decomposition of asphaltenes, the catalyst is hardly poisoned by vanadium, but can maintain its high activity for a long period of time.

The porous structure of the catalyst according to this invention plays an important role in the effective hydrotreatment of a heavy hydrocarbon oil. The catalyst of this invention has a pore diameter distribution which permits easy diffusion of high molecular hydrocarbon compounds, such as asphaltenes, into the active sites in the pores. The pores in the catalyst have a sufficient volume to prevent the rate of diffusion of asphaltenes from being restricted by metal sulfides (mainly vanadium sulfide) formed during the course of the reaction and deposited in the pores. This porous structure permits the catalyst to maintain a high activity for decomposition of asphaltenes. The catalyst of this invention selectively decomposes coke precursors, such as asphaltenes, and maintains a high activity without having its activity reduced appreciably by deposition of coke when applied to a mixed heavy hydrocarbon oil.

The catalyst of this invention is also very advantageous for its small hydrogen consumption, as compared with any known hydro-treating catalyst. While the hydrocracking of a heavy hydrocarbon oil with a known hydrogen treating catalyst, such as Ni—Co—Mo-γ-alumina, mainly comprises hydrodealkylation of polycyclic aromatic compounds based on the hydrogenation and hydrocracking thereof, the hydrogen treatment by the catalyst of this invention mainly includes removing metals from asphaltene molecules forming micelles, thereby lowering the degree of association in the micelles, and converting asphaltenes to lower molecules by breaking their relatively weak bonds. This is considered to be the reason for the low hydrogen consumption relative to the reduction in the molecular weight.

The catalytic hydrogen treatment of this invention may be carried out by any ordinary flow system, such as a fixed, moving, fluidized or ebullated bed, without causing any catalyst to be carried out of the reaction area with the reaction product, if the shape of the catalyst, etc. are properly selected. The reactant may be fed into the reaction zone through the top or bottom of the reactor. In other words, the flow of the gas and the liquid in the reactor may be co-current upwardly or downwardly. The catalyst particles may be granular, spherical or cylindrical, but for the hydrotreatment of a heavy hydrocarbon oil containing large quantities of asphaltenes and heavy metals, it is desirable to use extrusion molded catalyst particles which are hollow cylindrical, non-circular in cross section, e.g., oval, tri-lobed or multi-leafed, or elongated and have a surface provided with at least one groove. When these specially shaped particles are used to form a fixed bed, they increase the voids in the reactor, and it is not only possible to reduce the pressure drop in the catalyst bed, but the blocking of the catalyst bed by deposition of coke and metal among the catalyst particles can also be improved remarkably.

The conditions for the hydrotreatment according to this invention include a temperature of 300° C. to 500° C., preferably 370° C. to 430° C., a hydrogen pressure of 50 to 250 atm., preferably 80 to 200 atm., and a liquid space velocity of 0.1 to 10 hours$^{-1}$, preferably 0.2 to 5 hours$^{-1}$.

If the reaction temperature is below 300° C., the catalyst fails to show its full activity, and the reaction and conversion ratio in the hydrotreating process fails to reach any practically acceptable level. If it exceeds 500° C. on the other hand, asphaltenes undergo polycondensation, and tend to increase, rather than decreases. Moreover, coking occurs more actively, thereby causing degradation of the product, reduction in the activity of the catalyst and agglomeration of catalyst particles. If the hydrogen pressure is below 50 atm., coking occurs so actively that it is very difficult to maintain the activity of the catalyst at a normal level. Any hydrogen pressure in excess of 250 atm. brings about too active hydrocracking, and is not practically acceptable from the economical standpoint, since there result an increased hydrogen consumption, a reduced yield of production, and an increased cost of the reactor and other associated equipment. If the liquid space velocity is less than 0.1 hour$^{-1}$, a prolonged process time for oil brings about degradation of the product due to the thermal change of its heavy components, while any velocity in excess of 10 hours$^{-1}$ brings about a lower reaction and conversion ratio per pass which is practically unacceptable.

The proportion of hydrogen or a gas containing hydrogen to the feedstock oil to be fed into the reaction zone may be 100 to 2,000 volumes of hydrogen at 15° C. per volume of the oil at 1 atm. and 15° C. (i.e., 100 to 2,000 N lit./lit.), preferably 500 to 1,000 N lit./lit. If it is less than 100 N lit./liter, the reaction zone becomes short of hydrogen, no sufficient hydrogen is fed into the liquid, resulting in coking, which has an adverse effect on the properties of the catalyst and the oil to be produced. Any proportion in excess of 2,000 N lit./liter does not provide any additional benefit in the process of this invention, though it does not present any problem in the reaction. The cost of a compressor used for circulating hydrogen depends on the quantity of the hydrogen to be circulated, and is very high for supplying hydrogen in excess of 2,000 N lit./liter. Thus, the quantity of 2,000 N lit./liter may be a practical upper limit to the circulation of hydrogen. The gas which is rich in hydrogen and circulated through the reaction zone may contain hydrogen sulfide. It does not have any adverse effect, but even tends to promote the reaction if its quantity is appropriate. The catalyst used for the purpose of this invention has some interaction with hydrogen sulfide under the aforementioned conditions for the reaction, and hydrogen sulfide plays a certain role in maintaining the activity of the catalyst. The hydrogen to be fed into the reaction zone can contain up to 10 mol % of hydrogen sulfide within the scope of this invention.

The reaction product obtained by the hydrotreating process under the aforementioned conditions, and not containing any catalyst is delivered to a gas-liquid separation zone, where it is separated into a gas which is rich in hydrogen, and a product consisting substantially solely of a liquid. Any method and apparatus used in an ordinary desulfurization process with a fixed or ebullated bed may be employed for the gas-liquid separation.

A preferred conversion ratio for asphaltenes for each pass is in the range of 40 to 90%, depending mainly on the properties of the feedstock oil to be treated, and the hydrogen consumption. An excessively high conversion ratio for each pass under severe reaction conditions does not only result in undesirable side reactions which lower the quality of the oil to be produced, but is also disadvantageous from the economical standpoint with an increase in the consumption of hydrogen and catalyst.

In order to obtain oil containing a markedly reduced quantity of asphaltenes, or a light hydrocarbon oil containing substantially no asphaltenes (hereinafter referred to simply as "light oil") at a high yield from the feedstock oil containing a large quantity of asphaltenes, it is advantageous to follow the following sequence of steps for hydrotreatment:

(a) Treating the feedstock oil under hydrotreating conditions in the presence of the catalyst according to this invention;

(b) separating the reaction product into a hydrogen-rich gas and a liquid product;

(c) separating the liquid product into a substantially asphaltene-free and heavy metal-free light oil fraction and a heavy fraction containing asphaltenes and heavy metals; and (d) recycling the heavy fraction to step (a) for hydrotreatment.

This hydrotreating process involving asphaltene recycling is only possible with the catalyst of this invention having a superior activity for decomposition of asphaltenes, and capable of maintaining its high selective activity in a stable manner for a heavy hydrocarbon oil containing a large quantity of asphaltenes. According to this process, it is possible to convert the stock oil containing a large quantity of asphaltenes continuously to a light oil not containing asphaltenes or heavy metals. Such recycling treatment does not sharply increase the hydrogen and catalyst consumption, and raises the yield of the light oil to be produced.

This process is advantageously applicable to the feedstock oil containing at least 5% by weight, and particularly at least 10% by weight of asphaltenes, and at least 80 ppm, and particularly at least 150 ppm of vanadium. The separating step can be accomplished by any ordinary method, such as distillation and solvent deasphalting. The separating operation can be carried out smoothly, as the liquid product does not contain substantially any solid. If the separation is conducted by solvent deasphalting, it is possible to use as a solvent at least one low molecular hydrocarbon, such as methane, ethane, propane, butane, isobutane, pentane, isopentane, neopentane, hexane and isohexane. The solvent and the liquid reaction product are brought into countercurrent contact with each other.

Solvent deasphalting may be carried out at a temperature of 10° C. to 250° C., preferably 50° C. to 150° C., and a pressure of 3 to 100 atm., preferably 10 to 50 atm. The solvent and the light oil leaving the solvent deasphalting operation are delivered into a solvent recovery apparatus in which the solvent is separated, and a light oil containing substantially no asphaltenes or heavy metals is obtained.

The heavy fraction phase obtained by the separation step contains unreacted asphaltenes and heavy metals, and is recycled to the hydrogen treating step. No special method or apparatus is required for this recycling transfer, since the heavy fraction phase does not contain any solid, such as catalyst and metal sulfides. The quantity of the heavy fraction to be recycled depends on the properties of the feedstock oil and the conditions for the treatment, and while the whole fraction can be recycled, it is also possible to omit a part thereof. It is further possible to omit the whole quantity of the heavy fraction from the recycling treatment, if the hydrotreating step has a sufficiently high rate of asphaltene decomposition for each pass, the quantity of the heavy fraction is considerably small, and the yield of the light oil is not sharply reduced.

According to the hydrotreatment employing the catalyst of this invention, it is possible to obtain oil having improved quality by reducing impurities, such as asphaltene and vanadium, sharply. The oil obtained has been found to have unique properties differing from those of the product obtained by any known method, irrespective of the type of the feedstock oil used. The hydrocarbon contained in the product obtained according to this invention has a molecular weight of about 200 to about 1,200. The asphaltenes remaining to a slight extent in the oil product have a considerably lower molecular weight than that in the stock oil, and contain sharply reduced quantities of sulfur and heavy metals. A greater proportion of sulfur and nitrogen in the product is present in its light fraction, as opposed to their distribution in the feedstock oil.

In view of the specific properties of the product obtained by hydrotreating the feedstock oil in the presence of the catalyst of this invention, the inventors of this invention have conducted extensive research on hydrotreatment to obtain an oil product having a still higher grade, and developed a two-stage hydrotreating process having a very high industrial advantage.

The two-stage hydrotreating process of this invention comprises the following steps:

(a) bringing a heavy hydrocarbon oil containing asphaltenes into contact with the catalyst of this invention at a temperature of 300° C. to 500° C., a hydrogen pressure of 50 to 250 atm. and a liquid space velocity of 0.1 to 10.0 hours$^{-1}$; and (b) at a temperature of 300° C. to 500° C., a hydrogen pressure of 50 to 250 atm. and a liquid space velocity of 0.1 to 10.0 hours$^{-1}$, bringing at least a portion of the product of step (a) into contact with a catalyst which comprises a porous carrier containing alumina and having composited therewith a first catalytic metal component composed of at least one compound selected from among the oxides and sulfides of the metals belonging to Group VIB of the Periodic Table and a second catalytic metal component composed of at least one compound selected from among the oxides and sulfides of the metals belonging to Group VIII of the Periodic Table, and which catalyst has, with regard to its pores having a diameter of 75 Å or more, the properties: an average pore diameter APD of about 80 Å to about 250 Å, a pore volume PV of about 0.4 cc/g to about 1.5 cc/g, and a surface area SA of about 100 m²/g to about 400 m²/g.

The carrier for the catalyst used in step (b) supports thereon a combination of at least one compound selected from among the oxides and sulfides of the metals belonging to Group VIB of the Periodic Table, and at least one compound selected from among the oxides and sulfides of the metals belonging to Group VIII of the Periodic Table. This combination is preferably a combination of at least one selected from the oxides and sulfides of chromium, molybdenum and tungsten, and at least one selected from among those of cobalt and nickel. The metal component preferably contains about 2 to 40% by weight of the compound of the metal belonging to Group VIB, and about 0.1 to 10% by weight of the compound of the metal belonging to Group VIII, both in terms of the weight of the oxide, based on the total weight of the catalyst. It is desirable to use a catalyst having an average pore diameter APD of about 80 Å to 180 Å in step (b).

Step (b) is intended for removing sulfur, nitrogen, Conradson carbon residue and residual metal. The aforementioned metal components govern the activity of the catalyst for various reactions involved in the hydrotreatment for attaining the purposes for which step (b) is intended. The selection and combination of the metal components depend on the reaction on which the utmost importance should be placed on a case to case basis. For example, a combination of molybenum, and at least one of cobalt, nickel, tungsten and chromium is effective for removing sulfur and metal. A combination of cobalt and molybdenum, or nickel, cobalt and molybdenum is preferred for promoting the activity of the catalyst for desulfurization. In order to promote the activity for denitrification and reduction of Conradson carbon residue, too, it is desirable to add as an auxiliary catalyst component at least one of the compounds of titanium, boron, phosphorus and fluorine, or boron phosphate, or boron fluoride. In this case, the catalyst can effectively contain about 1.0 to 30% by weight of any such auxiliary component, in terms of the weight of the oxide, based on the total weight of the catalyst. Both the catalytic metal component and the auxiliary component can be combined with the carrier by any ordinary method, such as mixing, immersion and spraying.

The catalyst employed for step (b) may be prepared by any known method, if there can be obtained a catalyst having a desired porous structure, particularly an average pore diameter APD of about 80 Å to 250 Å, a pore volume PV of about 0.4 to 1.5 cc/g and a surface area SA of about 100 to 400 m²/g. See, for example, Japanese Patent Publications Nos. 21973/1965, 20911/1971, 46268/1972, 23786/1974, 12397/1975, 38298/1976 10558/1977 and 36435/1978, and Japanese Laid-Open Patent Applications Nos. 31597/1974, 37594/1977 and 96489/1979. The method and conditions of the treatment for step (b), and the particle diameter and shape of the catalyst to be employed therein may be equal to those already described in connection with the hydrotreatment using the catalyst of this invention.

The two-stage hydrotreating process has a great industrial advantage, since it can remove impurities from oil very efficiently with an extremely small hydrogen and catalyst consumption as compared with the known direct sulfurization process.

The carrier for the catalyst used for step (b) is a carrier containing at least 70% by weight of alumina, and preferably composed of alumina alone, or silica and alumina.

The two-stage hydrotreating process of this invention is a superior process which can be utilized for converting substantially the whole quantity of the feedstock heavy oil to a high grade desulfurized oil, even if it is required to treat a very bad heavy oil containing still larger quantities of asphaltenes and heavy metals, or even if it is required to conform to very stringent specifications for the product to be obtained. The industrially advantageous two-stage treatment of any such bad heavy oil may be carried out by physically separating a heavy fraction containing asphaltenes or heavy metals from the product of the first step, and recycling it to the first step, or alternatively, by physically separating such a heavy fraction from the product of the second step and recycling it to the first and/or second step. For the two-stage hydrogen treatment involving such recycling, the inlet for the heavy feedstock oil does not always need to be provided before the first step, but may be positioned between the first and second steps, or between the second step and the step for separating the light and heavy fractions. The step of separating the light and heavy fractions does not require any special method, but may be performed by distillation, solvent deasphalting, or any other ordinary method.

As already point out, the two-stage hydrotreating process of this invention accomplishes efficiently removal of metals from a heavy oil, decomposition of asphaltenes, and desulfurization, thereby producing a product oil having a high added value. The product oil, which contains reduced qunatities of nitrogen and Conradson carbon residue, is an optimum stock for preparing high grade gasoline by catalytic cracking, or kerosene, jet fuel oil and diesel oil by hydrocracking.

If the oil obtained by the two-stage process of this invention is subjected to catalytic cracking in a customary manner, it should not contain any greater than 50 ppm, preferably 10 ppm, of nickel and vanadium, or any greater than 10% by weight, preferably 4% by weight, of Conradson carbon residue. If the oil is used for hydrocracking in a conventional manner, it should not contain any greater than 10 ppm, preferably 1 ppm, of nickel and vanadium by weight, or any greater than 10% by weight, preferably 4% by weight, of Conradson carbon residue, or any greater than 2,000 ppm by weight, preferably 1,500 ppm by weight, of nitrogen. The catalytic cracking of the oil can be carried out by using a known apparatus, for example, a fluidized bed apparatus which is widely used for preparing gasoline having a high octane value. Hydrocracking may be carried out by a fixed bed system to produce kerosene, jet fuel oil, diesel oil, etc.

The following examples will further illustrate the present invention.

EXAMPLES OF CATALYST PREPARATION

EXAMPLE 1

Five liters of demineralized water was placed in a stainless steel container provided with an external mantle heater, and heated to 95° C. 1 Kg of aluminum nitrate, $Al(NO_3)_3.9H_2O$, was dissolved in water to form 2.5 liters of an aqueous solution thereof, and 500 cc of this aqueous solution was added into the container. The solution in the container was held at 95° C., and while it was being stirred, 14% by weight of aqueous ammonia was added to control the solution to pH 8. The solution was aged for one hour under boiling condition to form a seed alumina hydrosol. Then, 500 cc of the aforementioned aqueous aluminum nitrate solution was added into the hydrosol, and the hydrosol was allowed to stand for 10 minutes. The hydrosol had a pH of 4. After it was confirmed that the hydrosol had a temperature of at least 95° C., 14% by weight of aqueous ammonia was added into the hydrosol to control it to pH 9, while it was being stirred, and the hydrosol was allowed to stand for 10 minutes. This pH control operation was repeated three more times i.e. a total of six pH adjustments. Then, the hydrosol was aged for one hour under boiling condition to form an alumina hydrogel. The washing of this hydrogel was carried out by dispersing it in 20 liters of demineralized water and dehydrating it through a vacuum filter. This washing operation was repeated three times, and the hydrogel was dehydrated through the vacuum filter to yield a cake containing about 25% by weight of alumina in terms of $Al_2O_3$. This cake was formed into cylindrical particles having a diameter of 1 mm by an extruder provided with a die having a hole with a diameter of 1.0 mm. The molded product was heated at about 120° C. for two hours for drying, and precalcined at 550° C. in an electric furnace for three hours.

Molybdenum and cobalt were supported on the precalcined product. For this purpose, 400 ml of warm water was added into 151.9 g of ammonium molybdate. An aqueous solution obtained by dissolving 160.5 g of cobalt nitrate in 400 ml of distilled water was added into the ammonium molybdate solution and mixed therewith, and 500 ml of aqueous ammonia having a concentration of 25% by weight was added into the mixture. 35 ml of the solution obtained was diluted with 5 ml of distilled water, and the diluted solution was uniformly sprayed on 50 g of the precalcined product, so that the precalcined product might be impregnated with the solution. The precalcined product was kept in a hermetically sealed condition overnight, and air dried at room temperature. It was, then, dried with hot air at 120° C. for three hours, and calcined at 600° C. for three hours in an air stream, whereby Catalyst I was prepared.

EXAMPLE 2

The procedures of Example 1 were repeated, except that the pH control was repeated at intervals of 15 minutes, whereby Catalyst II containing cobalt and molybdenum was obtained.

EXAMPLE 3

The procedures of Example 1 were repeated, except that the pH control was repeated for 10 times for holding the hydrosol on the acidic side for 5 minutes each time, while it was held for 30 minutes on the alkaline side, whereby Catalyst III containing cobalt and molybdenum, and having an catalyst particle diameter of 1/32 inch was obtained.

Likewise, differently sized catalysts were prepared by using extrusion molding dies having holes with diameters of 0.5 mm, 0.75 mm, 1.5 mm, 2 mm, and 4 mm, and had a catalyst outside particle diameter of 1/64 in., 1/48 in., 1/24 in., 1/16 in. and ⅛ in., respectively. A precalcined product was prepared by the method by which Catalyst III was formed, and catalyst metals were supported on the precalcined product as described in Example 1, whereby Catalyst XV was obtained. This precalcined product was also used to form Catalyst XVI carrying 2% by weight of molybdenum in terms of molybdenum oxide, Catalyst XVII carrying 6% by weight thereof, Catalyst XVIII carrying 10% by weight thereof, and Catalyst XIX carrying 20% by weight thereof.

EXAMPLE 4

Four liters of an aqueous solution of basic aluminum nitrate containing 5% by weight of aluminum in terms of $Al_2O_3$ (formed by dissolving metallic aluminum in nitric acid, $NO_3^-/Al=0.48$) was heated at 150° C. for three hours in a stainless steel autoclave, whereby a white seed alumina hydrosol was obtained. Two liters of the hydrosol solution was diluted with demineralized water to 10 liters, and the diluted solution was heated at 95° C., in a stainless steel container provided with an external mantle heater. Added thereinto was 250 cc of an aqueous solution containing 400 g of aluminum nitrate, $Al(NO_3)_3.9H_2O$, per liter, and the hydrosol was allowed to stand for five minutes. It had a pH of 3. After it was ascertained that the hydrosol had a temperature of at least 95° C., 14% by weight aqueous ammonia was added into the hydrosol to control it to pH 9, while it was being stirred, and the hydrosol was held for 10 minutes. The pH control was repeated two more times i.e. a total of four pH adjustments. Thereafter, the procedures of Example 1 were repeated to yield Catalyst IV containing cobalt and molybdenum.

EXAMPLE 5

Fourteen liters of an aqueous solution of basic aluminum nitrate ($NO_3^-/Al=0.48$) containing 1.6% by weight of aluminum in terms of $Al_2O_3$ was hydrothermally treated as described in Example 4, whereby a seed alumina hydrogel was prepared. 5.3 liters of the hydrogel was diluted to 10 liters, and the diluted hydrogel was heated to 95° C. in a stainless steel vessel provided with an external mantle heater. Added thereinto was 50 cc of an aqueous solution containing 400 g of aluminum nitrate, $Al(NO_3)_3.9H_2O$, per liter, and the hydrogel was held for five minutes. Its pH was 3. Then, while it was held at 95° C., 14% by weight aqueous ammonia was added into the hydrogel to control it to pH 9, while it was being stirred, and the hydrogel was held for 10 minutes. The pH control was repeated once more, and thereafter, the procedures of Example 1 were repeated to yield Catalyst V containing cobalt and molybdenum.

EXAMPLE 6

Fourteen liters of an aqueous solution of basic aluminum nitrate ($NO_3^-/Al=0.48$) containing 1.4% by weight of aluminum in terms of $Al_2O_3$ was heated at 150° C. for three hours in a stainless steel autoclave, whereby a white seed alumina hydrosol was prepared. 6.3 liters of the hydrosol solution was diluted with demineralized water to 10 liters, and the diluted solution was heated to 95° C. in a stainless steel vessel provided with an exernal mantle heater. Added thereinto was 160 cc of an aqueous solution containing 400 g of aluminum nitrate, $Al(NO_3)_3.9H_2O$, per liter, and the hydrosol was held for one hour. Its pH was 3. Then, while the hydrosol was maintained at 95° C., 14% by weight aqueous ammonia was added thereinto to control it to pH 9, while it was being stirred, and the hydrosol was held for one minute. The pH control was repeated once more, and thereafter, the procedures of Example 1 were repeated to yield Catalyst VI containing cobalt and molybdenum.

EXAMPLE 7

An aluminum sulfate solution having a concentration of 76.6 g/liter in terms of $Al_2O_3$ was heated to, and held at 100° C. 18 liters of demineralized water was heated to 100° C. in a container capable of being heated from outside. Added thereinto was 12 liters of the aqueous aluminum sulfate solution, and while they were strongly stirred, an aqueous solution containing 200 g/liter of sodium hydroxide was quickly added thereinto to control it to pH 11. The resulting solution was aged at 100° C. for one hour, while it was being stirred, whereby a seed alumina hydrosol was prepared. Then, 2 liters of aluminum sulfate solution was added into the hydrosol to control it to pH 11, and the hydrosol was held for 55 minutes. The pH control was repeated four more times. The alumina hydrogel was filtered, and washed until no sulfuric acid radical was detected in the filtrate. The filter cake was carefully dispersed in 30 liters of demineralized water to form a sol. The sol was heated to 100° C., and its pH control was repeated three times, whereby an alumina hydrogel was prepared. Then, it was washed by filtration until no sulfuric acid radical was detected in the filtrate, whereby a filter cake was formed. Thereafter, the procedures of Example 1 were repeated to yield Catalyst VII containing cobalt and molybdenum.

EXAMPLE 8

An aqueous solution of aluminum nitrate having a concentration of 50 g/liter in terms of $Al_2O_3$ was heated to, and held at 100° C. 18 liters of demineralized water was heated to 100° C. in a vessel capable of being heated from outside. Added thereinto was 12 liters of the aluminum nitrate solution, and while they were strongly stirred, aqueous ammonia having a concentration of 14% by weight was quickly added thereinto to control it to pH 10. The resulting solution was aged at 100° C. for two hours, while it was being stirred, whereby a seed alumina hydrosol was prepared. Then, 2 liters of aluminum nitrate solution was added into the hydrosol to control it to pH 4, and the hydrosol was held for 5 minutes. Aqueous ammonia having a concentration of 14% by weight was added into the hydrosol to control it to pH 10, and it was held for 55 minutes. The pH control was repeated for nine more times, and the hydrosol was aged at 100° C. for three hours, whereby an alumina hydrogel was obtained. The hydrogel was washed carefully to form a filter cake. Thereafter, the procedures of Example 1 were repeated, except that the calcination was carried out at 700° C. for three hours, to yield Catalyst VIII containing cobalt and molybdenum.

EXAMPLE 9

The procedures of Example 8 were repeated, except that the pH control was repeated seven times, and that the calcination was carried out at 750° C. for three hours, whereby Catalyst IX was prepared.

EXAMPLE 10

Fourteen liters of an aqueous solution of basic aluminum nitrate ($NO_3^-/Al=0.48$) having a concentration of 4% by weight in terms of $Al_2O_3$ was hydrothermally treated at 140° C. for two hours in a stainless steel autoclave, whereby a white seed alumina hydrogel was prepared. Five liters of the hydrogel solution was diluted with demineralized water to 10 liters, and the diluted solution was boiled in a stainless steel container capable of being heated from outside. Added thereinto was one liter of an aqueous solution containing 500 g/liter of aluminum nitrate, $Al(NO_3)_3.9H_2O$, and the solution was held for five minutes. Then, while the hydrosol was maintained at 95° C., aqueous ammonia having a concentration of 14% by weight was added thereinto to control it to pH 10, and the hydrogel was held for five minutes. The pH control was repeated once more, and an alumina hydrogel was obtained. Thereafter, the procedures of Example 1 were repeated, except that the calcination was carried out at 650° C. for three hours, to yield Catalyst X containing cobalt and molybdenum.

EXAMPLE 11

An aqueous sulfuric acid solution was obtained by dissolving 154 g of concentrated sulfuric acid in 5,820 g of demineralized water. A suspension of fine silica particles was prepared by adding 2,276 g of water glass (aqueous sodium silicate solution, JIS No. 3) instantaneously into the aqueous sulfuric acid solution, while it was being strongly stirred. The suspension had a pH of about 5, and contained 8.0% by weight of silica. The whole quantity of the silica suspension was mixed with 8,250 g of an aqueous aluminum sulfate solution containing 8.0% by weight of alumina, whereby a uniform aluminum sulfate-silica suspension (hereinafter referred to simply as the "mixed solution") was obtained.

Then, 2,500 g of the mixed solution was added into 17,500 g of demineralized water in a 40 liter stainless steel vessel with a cover, and while the mixture was being stirred, it was heated to 100° C., and after 370 g of 14% aqueous ammonia was added to precipitate the aluminum in the form of an hydroxide, the solution was controlled to pH 8.0 to 9.0, and held at 100° C. for 20 minutes, while it was being stirred, whereby a seed silica-alumina hydrosol was obtained. 1,000 g of the mixed solution was added into the hydrosol to control it to pH 4, and after stirring and heating were continued for 10 minutes, 160 g of 14 wt % aqueous ammonia was added into the hydrosol. The hydrogel in the vessel had a pH of 8 to 9, and stirring and heating were continued for 20 minutes. The pH control was repeated thirteen times. The hydrogel in the container was transferred into a vacuum filtration apparatus, whereby about 9,000 g of a white filter cake was obtained. The filter cake was dispersed in 30 liters of demineralized water at 80° C., and after elution of sulfate from the precipitate, it was dehydrated and cleaned by the vacuum filtration apparatus. The cleaning operation was repeated five times, whereby 7,200 g of a white filter cake having a solids content of 18.2% by weight was obtained. This cake was extrusion molded by a piston type extruder having a die formed with 50 holes each having a diameter of 1.2 mm. The molded products were dried in a hot air drier, and after evaporation of almost all the water therefrom, they were further dried at 120° C. for one hour. Then, they were precalcined at 550° C. for three hours in an electric furnace, whereby there were ultimately obtained 1,310 g of calcined cylindrical silica-alumina particles each having a diameter of 0.8 mm.

This silica-alumina carrier was found to contain 49% of $SiO_2$, 49% of $Al_2O_3$, 0.5% of $H_2O$, 0.4% of $SO_4$ and 0.01% of $Na_2O$.

Thereafter, the procedures of Example 1 were repeated to yield Catalyst XI containing cobalt and molybdenum.

EXAMPLE 12

20 kg of water was placed in a 40 liter capacity stainless steel vessel with a cover, and 500 g of water glass (JIS No. 3) was added thereinto. After the solution was heated to 95° C., there was added 290 g of an aqueous aluminum sulfate solution containing 8.0% by weight of alumina. This procedure lowered the pH of the solution to 8.0, and there was formed a white precipitate composed of hydroxides of aluminum and silicon. After stirring was continued for 15 minutes, there was formed a seed silica-alumina hydrosol. 500 g of water glass (JIS No. 3) was added into the hydrosol to control its pH to about 11.5. While stirring was further continued for five minutes, 290 g of aqueous aluminum sulfate solution containing 8.0% by weight of alumina was added into the hydrosol, and it was held for 15 minutes. Such alternate addition of water glass and an aqueous solution of aluminum sulfate was repeated five times at regular intervals, whereby a white slurry was formed in the vessel. The slurry was transferred into a vacuum filtration apparatus and cleaned carefully, whereby there was ultimately obtained 4,670 g of a filtered cake having a solids content of 18% by weight. Thereafter, the procedures of Example 11 were repeated to yield 840 g of a silica-alumina carrier composed of 0.8 mm dia. cylindrical particles. The carrier was found to contain 85.5% of $SiO_2$, 13.3% of $Al_2O_3$, 0.05% of $Na_2O$, 0.5% of $H_2O$ and 0.5% of $SO_4$.

EXAMPLE 13

One liter of an aqueous magnesium chloride solution containing 260 g of magnesium chloride, $MgCl_2.6H_2O$, per liter was added into 5 liters of water, and the mixed solution was maintained at room temperature. One liter of an aqueous solution containing 344 g of sodium silicate (JIS No. 3) per liter was added into the aqueous magnesium chloride solution, while it was being stirred, followed by gradual addition of a solution containing 200 g/liter of sodium hydroxide, NaOH, to control the mixed solution to pH 9. The solution was aged at 50° C. for 20 hours, whereby a seed silica hydrosol was obtained. 0.5 liter of the magnesium chloride solution was added into the hydrosol, and it was held for 10 minutes. Then, 0.5 liter of the sodium silicate solution and further the sodium hydroxide solution were added into the hydrosol to control it to pH 9, and the hydrosol was held for 10 minutes. The pH control was repeated four more times. Then, the sodium hydroxide solution was added into the hydrosol to control its pH to 10, and after it was aged at about 50° C. for five hours, there was obtained a silica-magnesia hydrogel. Thereafter, the procedures of Example 1 were repeated to yield Catalyst XIII containing cobalt and molybdenum.

EXAMPLE 14

An aqueous solution containing 428 g/liter of titanium tetrachloride, $TiCl_4$, was prepared by dissolving titanium tetrachloride gradually in distilled water, while it was cooled. There was also prepared an aqueous solution containing 620 g/liter of aluminum nitrate, $Al(NO_3)_2.9H_2O$. Five liters of demineralized water was heated to 95° C. in a glass container provided with an external mantle heater. Added thereinto were 1 liter of the aluminum nitrate solution and 200 cc of the titanium tetrachloride solution. While the mixed solution was maintained at 95° C., 14 wt % aqueous ammonia was added to control it to pH 9. Then, the solution was aged for two hours under boiling conditions, whereby a seed alumina-titania hydrogel was obtained. 500 cc of the aluminum nitrate solution and 100 cc of the titanium tetrachloride solution were added into the hydrogel, and it was held for five minutes, while being stirred. Then, 14 wt % aqueous ammonia was added into the hydrogel to control it to pH 9. The pH control was repeated seven more times, and thereafter, the hydrosol was aged for three hours under boiling condition, whereby an alumina-titania hydrogel was obtained. Thereafter, the procedures of Example 1 were repeated to yield Catalyst XIV containing cobalt and molybdenum.

Comparative Example (Preparation of Sepiolite Catalyst)

Clay-like Spanish sepiolite was dried with hot air at about 120° C. for six hours, and ground in a ball mill for about six hours, whereby there was formed sepiolite powder having a particle size not greater than about 50 mesh, and of which at least 90% of particles had a particle size not greater than 100 mesh.

An aqueous solution of aluminum sulfate having a concentration of 76.6 g/liter in terms of $Al_2O_3$ was heated to, and held at 100° C. Eighteen liters of demineralized water was heated to 100° C. in a vessel capable of being heated from outside. Twelve liters of the aluminum sulfate solution was added into the demineralized water, and while it was being strongly stirred, 4.4 liters of 28% aqueous ammonia was added into the solution quickly to control it to pH 9. Then, the solution was aged at 100° C. for one hour while being stirred, whereby a seed alumina hydrosol was obtained. Two liters of the aluminum sulfate solution was added into the hydrosol, and after it was held for one hour, 28 wt % aqueous ammonia was added into the hydrosol to control it to pH 9, and it was held for one minute. The pH control was repeated nine times. Then, the hydrosol was cleaned until no sulfuric acid radical was detected in the filtrate, whereby there was formed a filter cake having a concentration of about 20% by weight in terms of $Al_2O_3$.

Then, 5 kg of sepiolite powder, 7 kg of the cake (as molding assistance) and 2 kg of water were mixed together, and kneaded carefully in a kneading machine. The kneaded mixture was extrusion molded by an extruder having a die provided with 0.9 mm dia. holes. The molded product was dried at about 120° C. for two hours, and calcined at 500° C. for three hours in an electric oven. Thereafter, the procedures of Example 1 of this invention were repeated to yield Catalyst XXIII containing cobalt and molybdenum.

EXAMPLE 15

Catalyst XX was impregnated with a warm aqueous solution containing about 4 wt % of orthoboric acid to the extent that the catalyst contained 6.5% by weight of boria. The catalyst was dried with hot air at 120° C. for three hours, and calcined at 500° C. for two hours to yield Catalyst XXIV.

The properties of the catalysts prepared as set forth above are shown in Table 3-1. Catalyst XV comprises a carrier having no catalytic metal component supported thereon. "Limit pore volume" referred to in Tables 3-1 and 3-2 shows a value calculated according to the following equation:

$$\text{Limit pore volume (cc/g)} = 0.46/[1-(100/\text{APD})^2]$$

EXAMPLE 16

A cake having a concentration of about 25% by weight in terms of $Al_2O_3$ was obtained as described in connection with Comparative Example 1. Thereafter, the procedures of Example 1. Thereafter, the procedures of Example 1 were repeated to yield Catalyst No. 1 shown in Table 6 which will appear later on.

EXAMPLE 17

A cake having a concentration of about 20% by weight in terms of $Al_2O_3$ was prepared as described in connection with Example 4. This cake was extrusion molded by an extruder having a die provided with 1.0 mm dia. holes. The molded product was quickly dried at about 300° C., and calcined at 550° C. for three hours in an electric oven. Thereafter, the procedures of Example 1 were repeated to yield Catalyst No. 4 shown in Table 6.

EXAMPLE 18

A cake having a concentration of about 20% by weight in terms of $Al_2O_3$ was prepared as described in Comparative Example 1, and thereafter, the procedures of Example 17 were repeated to yield Catalyst No. 6 shown in Table 6.

TABLE 3-1

Properties of Catalyst

| NO. | I | II | III | IV | V | VI | VII | VIII |
|---|---|---|---|---|---|---|---|---|
| Composition (wt %) | | | | | | | | |
| CoO | 2.0 | 2.0 | 1.9 | 1.9 | 1.9 | 2.2 | 2.1 | 1.9 |
| $MoO_3$ | 5.7 | 5.4 | 5.3 | 5.0 | 5.4 | 5.7 | 5.4 | 5.6 |
| $Al_2O_3$ | 90.9 | 91.4 | 91.8 | 92.2 | 92.0 | 89.9 | 91.0 | 91.4 |
| Average catalyst diameter (mm) | 1.0 | 1.0 | 1.0 | 1.0 | 1.0 | 1.0 | 1.0 | 1.0 |
| Pore volume (cc/g) | | | | | | | | |
| 75–100 Å | 0.05 | 0.01 | 0.01 | 0.03 | 0.03 | 0.02 | 0.02 | 0.01 |
| 100–180 Å | 0.50 | 0.45 | 0.11 | 0.06 | 0.05 | 0.03 | 0.12 | 0.07 |
| 180–400 Å | 0.02 | 0.35 | 0.81 | 0.73 | 0.16 | 0.07 | 0.95 | 0.56 |
| 400–500 Å | 0.00 | 0.01 | 0.01 | 0.14 | 0.12 | 0.03 | 0.01 | 0.01 |
| 500–1500 Å | 0.00 | 0.00 | 0.03 | 0.05 | 0.65 | 0.82 | 0.03 | 0.03 |
| >1500 Å | 0.01 | 0.03 | 0.02 | 0.03 | 0.02 | 0.05 | 0.02 | 0.02 |
| Total | 0.58 | 0.85 | 0.99 | 1.04 | 1.03 | 1.03 | 1.15 | 0.70 |
| Specific surface area ($m^2/g$) | 186 | 221 | 165 | 139 | 104 | 65 | 191 | 119 |
| Average pore diameter Å | 125 | 163 | 240 | 298 | 396 | 631 | 241 | 235 |
| Limit pore volume (cc/g) | 1.28 | 0.74 | 0.56 | 0.52 | 0.49 | 0.47 | 0.56 | 0.56 |
| Catalyst density (g/cc) | 0.60 | 0.47 | 0.45 | 0.44 | 0.45 | 0.41 | 0.40 | 0.58 |
| Crushing strength (kg) | 5.3 | 3.2 | 2.6 | 2.1 | 1.9 | 1.3 | 2.2 | 3.3 |

| NO. | IX | X | XV | XVI | XVII | XVIII | XIX |
|---|---|---|---|---|---|---|---|
| Composition (wt %) | | | | | | | |
| CoO | 2.0 | 1.9 | 0.0 | 0.0 | 0.0 | 0.0 | 0.0 |
| $MoO_3$ | 5.4 | 5.4 | 0.0 | 1.9 | 6.1 | 9.8 | 20.3 |
| $Al_2O_3$ | 90.6 | 91.1 | 98.0 | 95.9 | 91.3 | 87.2 | 77.2 |
| Average catalyst diameter (mm) | 1.0 | 1.0 | 1.0 | 1.0 | 1.0 | 1.0 | 1.0 |
| Pore volume (cc/g) | | | | | | | |
| 75–100 Å | 0.02 | 0.01 | 0.02 | 0.02 | 0.01 | 0.01 | 0.01 |
| 100–180 Å | 0.11 | 0.07 | 0.14 | 0.13 | 0.10 | 0.13 | 0.13 |
| 180–400 Å | 0.37 | 0.38 | 0.80 | 0.82 | 0.86 | 0.79 | 0.67 |
| 400–500 Å | 0.02 | 0.01 | 0.02 | 0.02 | 0.01 | 0.01 | 0.01 |
| 500–1500 Å | 0.05 | 0.01 | 0.08 | 0.04 | 0.02 | 0.02 | 0.02 |
| >1500 Å | 0.03 | 0.03 | 0.03 | 0.03 | 0.02 | 0.01 | 0.01 |
| Total | 0.60 | 0.51 | 1.09 | 1.06 | 1.02 | 0.97 | 0.85 |
| Specific surface area ($m^2/g$) | 104 | 83 | 174 | 177 | 169 | 163 | 155 |
| Average pore | 232 | 246 | 251 | 240 | 242 | 238 | 220 |

TABLE 3-1-continued

| Properties of Catalyst | | | | | | | |
|---|---|---|---|---|---|---|---|
| diameter (Å) | | | | | | | |
| Limit pore volume (cc/g) | 0.56 | 0.55 | 0.55 | 0.56 | 0.55 | 0.56 | 0.58 |
| Catalyst density (g/cc) | 0.64 | 0.71 | 0.42 | 0.44 | 0.44 | 0.47 | 0.54 |
| Crushing strength (kg) | 3.5 | 4.1 | 2.0 | 2.1 | 2.4 | 2.7 | 3.3 |

TABLE 3-2

| NO. | Properties of Catalyst | | | | | | | | |
|---|---|---|---|---|---|---|---|---|---|
| | XI | XII | XIII | XIV | XX | XXI | XXII | XXIII | XXIV |
| Composition (wt %) | | | | | | | | | |
| CoO | 2.0 | 2.0 | 2.0 | 2.0 | 1.2 | 4.1 | 3.5 | 2.0 | 1.1 |
| $MoO_3$ | 6.0 | 6.0 | 6.0 | 6.0 | 11.0 | 15.0 | 15.0 | 5.8 | 6.5 |
| $Al_2O_3$ | 45.1 | 10.3 | — | 64.4 | 86.8 | 78.4 | 81.0 | 5.8 | 81.2 |
| $SiO_2$ | 45.1 | 81.4 | 48.0 | — | — | — | — | 52.6 | — |
| $TiO_2$ | — | — | — | 27.6 | — | — | — | — | — |
| MgO | — | — | 45.0 | — | — | — | — | 20.9 | — |
| NiO | — | — | — | — | 0.8 | — | — | — | 0.7 |
| $B_2O_3$ | — | — | — | — | — | — | — | — | 6.5 |
| Average catalyst diameter (mm) | 1.0 | 1.0 | 1.0 | 1.0 | 1.0 | 1.1 | 1.0 | 1.2 | 1.0 |
| Pore volume (cc/g) | | | | | | | | | |
| 75–100 Å | 0.06 | 0.05 | 0.10 | 0.04 | 0.05 | 0.01 | 0.10 | 0.03 | 0.02 |
| 100–180 Å | 0.30 | 0.15 | 0.20 | 0.15 | 0.47 | 0.48 | 0.10 | 0.08 | 0.48 |
| 180–400 Å | 0.60 | 0.63 | 0.40 | 0.28 | 0.02 | 0.07 | 0.04 | 0.14 | 0.02 |
| 400–500 Å | 0.00 | 0.03 | 0.00 | 0.04 | 0.00 | 0.00 | 0.01 | 0.05 | 0.00 |
| 500–1500 Å | 0.06 | 0.12 | 0.03 | 0.08 | 0.00 | 0.01 | 0.05 | 0.39 | 0.00 |
| >1500 Å | 0.02 | 0.03 | 0.02 | 0.02 | 0.00 | 0.01 | 0.21 | 0.03 | 0.00 |
| Total | 1.04 | 1.01 | 0.75 | 0.61 | 0.54 | 0.58 | 0.51 | 0.72 | 0.52 |
| Specific surface area ($m^2/g$) | 189 | 129 | 155 | 97 | 190 | 153 | 93 | 86 | 191 |
| Average pore diameter (Å) | 220 | 312 | 194 | 251 | 115 | 149 | 219 | 336 | 111 |
| Limit pore volume (cc/g) | 0.58 | 0.51 | 0.63 | 0.55 | 1.89 | 0.84 | 0.58 | 0.50 | — |
| Catalyst density (g/cc) | 0.43 | 0.44 | 0.50 | 0.65 | 0.69 | 0.66 | 0.53 | 0.56 | 0.74 |
| Crushing strength (kg) | 2.6 | 2.3 | 3.0 | 3.8 | 5.4 | 4.8 | 4.6 | 2.5 | 6.4 |

EXAMPLE 19

The procedures of Example 10 were repeated, except that the hydrothermal treatment of basic aluminum nitrate was carried out at 150° C. for two hours, whereby Catalyst No. 7 was prepared as shown in Table 6.

EXAMPLE 20

The procedures of Example 19 were repeated, except that the pH control was repeated three times, whereby Catalyst No. 8 was obtained as shown in Table 6.

Attention is now directed to examples concerning the hydro-treatment of the feedstock oils, of which the properties have hereinbefore been shown. The apparatus, and the methods for analyzing the feedstock oil and the oil obtained by the treatment were as follows:

Hydrogen Treating Apparatus

A fixed bed flow type reactor having its pressure, temperature and flow rate controlled automatically was used for the hydro-treatment which will be described in the following examples. The reactor included a stainless steel reaction vessel having an inside diameter of 25 mm and a length of 1,000 mm, and provided centrally therethrough with a downwardly directed thermowell having an outside diameter of 8 mm, The temperature of the reaction vessel was controlled by six electrically heated aluminum blocks. The stock oil was measured by an integrated flow meter, and fed quantitatively into the reaction vessel by a two-throw reciprocating pump. Hydrogen was supplied into the reaction vessel after its flow rate was measured through a high pressure flow meter. The gas and the liquid in the reaction vessel were co-current downwardly. The reaction vessel contained 200 cc of catalyst, and the spaces above and below the catalyst bed were each filled with about 30 cc of inert alumina beads. The effluent from the reaction zone was introduced into a gas-liquid separator, and the liquid separated from the gas was collected into a liquid product receptacle through a pressure control valve, while the gas was caused to flow through a pressure control valve, measured by a wet flow meter, analyzed by process gas chromatography and discharged from the system. The same equipment as hereinabove set forth was used for the two-stage hydrotreatment, except that a pair of reaction vessels were connected in series with each other.

Analysis of Feedstock and Product Oils

The general analysis of the properties was carried out by using customary methods for petroleum analysis. Asphaltene was determined in accordance with the method for analyzing the n-heptane insolubles based on U.O.P. Method No. 614-68. The average molecular weight was determined by vapor pressure osmosis in a pyridine solution at 60° C., using a Hitachi Corona 111 apparatus. The molecular weight distribution was determined by gel permeation chromatography, using a Model LC-08 apparatus made by Nippon Bunseki Kogyo, Japan. A total of four SHODEX gels made by Showa Denko and each in a column having an inside diameter of 20 mm and a length of 600 mm were connected in series with each other. They were one SHODEX A-802, two SHODEX A-803 and one SHODEX A-804. Chloroform was used as a solvent at 30° C., and detection was made by a differential refractometer.

Catalyst Performance Test 1

Experiments were conducted for the hydrotreatment of Boscan crude oil A, of which the properties have been shown in Table 1, at a reaction temperature of 405° C., a hydrogen pressure of 140 atm., a LHSV of 1.0 hour$^{-1}$ and an oil to hydrogen ratio (Normal liter/liter) of 1,000 in order to compare the performance of commercially available Catalysts XX, XXI and XXII used for hydrodesulfurization or hydrodemetallization of heavy hydrocarbon oils, sepiolite Catalyst XXIII for hydrotreatment, and Catalyst III of this invention. The results of the experiments are shown in FIG. 2.

Figure 2:
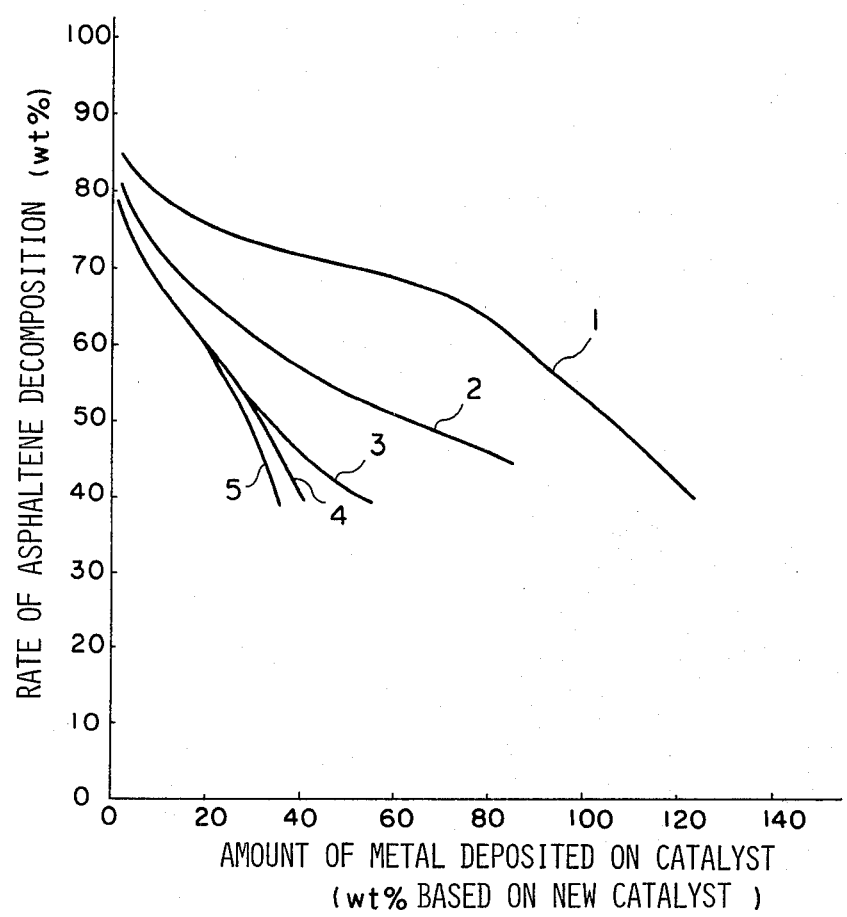
FIG. 2 is a graph showing the relation between the decomposition rate of asphaltenes and the amount of metal deposition on the catalyst.

FIG. 2 is a graph showing the relation, changing with the lapse of time, between the decomposition rate of asphaltenes (wt %) and the quantity of metal deposited by the feedstock oil on the catalyst (wt % according to the new catalyst standard). The quantity of metal deposition indicates a total of vanadium and nickel, as will be the case hereinafter, too. In FIG. 2, curve 1 represents the results obtained with Catalyst III of this invention, curve 2 shows the results of the tests conducted with sepiolite catalyst XXIII, and curves 3, 4 and 5 shows the results obtained with known catalysts XXII, XXI and XX.

As is obvious from the results shown in FIG. 2, the catalyst of this invention defines a remarkable improvement in its activity for decomposition of asphaltenes, and its stability or life over any known catalyst. It will be noted that the catalyst of this invention defines a remarkable improvement over any sepiolite catalyst. Even if about 80% by weight of metal is deposited on the catalyst surface, the catalyst of this invention does not undergo any appreciable reduction in its activity for asphaltene decomposition. Catalysts having such activity and stability have heretofore not been known in the art, but have been developed for the first time by the inventors of this invention.

The oil obtained by the foregoing experiments was analyzed, and examination was made of the average molecular weight of the asphaltene remaining therein, and the variation with the lapse of time in the rate of sulfur and metal removal from asphaltenes. These are shown in FIG. 3 in relation to the quantity of the metal deposited on the catalyst. In FIG. 3, curves 6, 7 and 8 represent the results of the experiments in which the catalyst of this invention was used, and indicate the rate of desulfurization, the rate of metal removal and the average molecular weight of the residual asphaltenes, respectively, in relation to the quantity of the metal deposited on the catalyst. Likewise, curves 9, 10 and 11 represent the results obtained by using known, commercially available Catalyst XXI, and show the rate of desulfurization, the rate of metal removal and the average molecular weight of the residual asphaltenes, respectively, in relation to the quantity of the metal deposited on the catalyst.

It is clearly understood from the results shown in FIG. 3 that the catalyst of this invention can effectively reduce the molecular weight of asphaltenes, and can also efficiently remove sulfur and metal from asphaltenes, as opposed to the known, commercially available catalyst.

Figure 4:
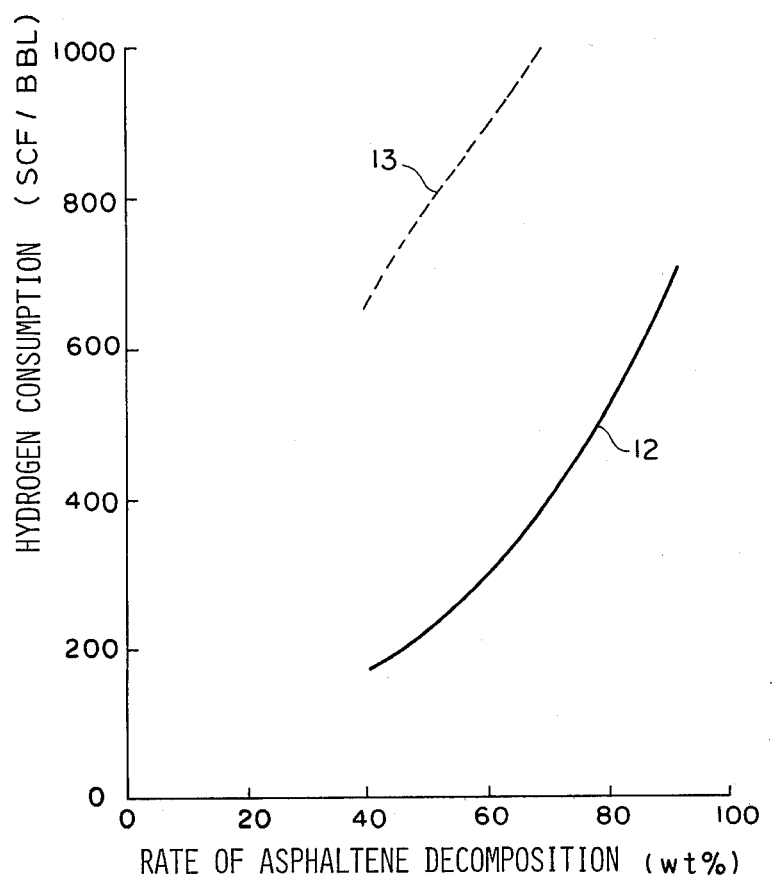
FIG. 4 is a graph showing the relation between the hydrogen consumption and the decomposition rate of asphaltenes.

FIG. 4 shows the relation between the decomposition rate of asphaltenes and the hydrogen consumption. In FIG. 4, curve 12 shows the results obtained by using the catalyst III of this invention, while curve 13 represents those obtained by using known, commercially available Catalyst XXI. It is obvious from the results shown in FIG. 4 that the catalyst of this invention requires extremely less hydrogen for a given rate of asphaltene decomposition than the known catalyst, and has a high degree of selectivity for the hydrotreatment of asphaltenes.

It is noted from the foregoing experimental results that the catalyst of this invention is a very useful catalyst for the hydrotreatment of a heavy hydrocarbon oil containing a large quantity of asphaltenes, particularly for the pretreatment for producing a high grade light oil.

Catalyst Performance Test 2

Commercially available Catalysts XX and XXI, and the Catalyst VII of this invention were tested for hydrotreating deasphalted oil obtained by deasphalting Boscan crude oil with n-pentane as a solvent at a pressure of 40 kg/cm$^2$G, a temperature of 195° C. and a solvent ratio by volume of 7. The deasphalted oil had a specific gravity of 17.1° API, and contained 83.10% by weight of carbon, 11.32% by weight of hydrogen, 46.1% by weight of sulfur, 0.33% by weight of nitrogen, a Conradson carbon residue of 7.96% by weight, 0.10% by weight of asphaltene, 35 ppm by weight of nickel and 306 ppm by weight of vanadium. The conditions for the hydrotreatment included a reaction temperature of 350° C., a hydrogen pressure of 140 atm., a LHSV of 2.0 hours$^{-1}$ and an oil to hydrogen ratio (Normal liter/liter) of 1,000. Table 4 shows the typical properties of the oils obtained after the lapse of about 50 hours, and the conversion ratio for each reaction are shown in Table 4. Boscan crude oil A was also hydrotreated in the same way, and the results shown in Table 4 were obtained.

It is noted from these experimental results that while the known catalysts are more active for the removal of sulfur and vanadium from the feedstock oil not containing asphaltene than the catalyst of this invention, the catalyst of this invention has a higher activity for vanadium removal and asphaltene decomposition if the feedstock oil contains asphaltenes. It is also noted that the catalyst of this invention is suitable for the first step for the two-stage hydrotreatment of a heavy hydrocarbon oil containing large quantities of asphaltenes and heavy metals, by using a known highly active catalyst.

TABLE 4

Properties of oils hydrotreated by various types of catalysts, and rate of each reaction involved.

| Stock oil | Catalyst | Sulfur content (wt %) | Desulfurization rate (wt %) | Vanadium content (ppm) | Vanadium removal rate (wt %) | Asphaltene content (wt %) | Alsphaltene decomposition rate (wt %) |
|---|---|---|---|---|---|---|---|
| DA* | XX | 1.61 | 65 | 48 | 84 | — | — |
| DA | XXI | 3.51 | 24 | 92 | 70 | — | — |
| DA | VII | 3.81 | 17 | 140 | 54 | — | — |
| A | XX | 0.76 | 86 | 372 | 70 | 4.1 | 65 |
| A | XXI | 0.86 | 84 | 310 | 75 | 4.1 | 65 |
| A | VII | 2.47 | 54 | 149 | 88 | 2.4 | 80 |

*Deasphalted oil as hereinbefore referred to.

Examples of Hydrotreatment

Example 2-1

It has already been mentioned that the average pore diameter, APD, of a catalyst has a significant bearing on the activity for decomposition of asphaltenes. Many experiments were conducted to verify the fact, and the following is a description of Example 2-1.

Boscan crude oil A and Khafji vacuum residue C, of which the properties have been shown in Table 1, were hydrotreated by using Catalysts I, II, III, IV, V and VI having the properties shown in Table 3. The tests were conducted under the same conditions as those set forth for Catalyst Performance Test 1 before. Due to the different concentrations of asphaltene in the feedstock oils tested, the activity for asphaltene decomposition was expressed by the secondary reaction rate constant, Ka, according to the following formula, rather than by the rate of asphaltene decomposition:

$$Ka = (1/A_P - 1/A_F) \cdot LHSV$$

in which $A_P$ represents the weight in kg of asphaltenes remaining in 1 kg of the oil obtained after 50 hours of operation, $A_F$ represents the weight in kg of asphaltenes present in 1 kg of the feedstock oil, and LHSV represents the liquid space velocity expressed by the volumes of the feedstock oil fed for one volume of catalyst per hour.

Figure 5:
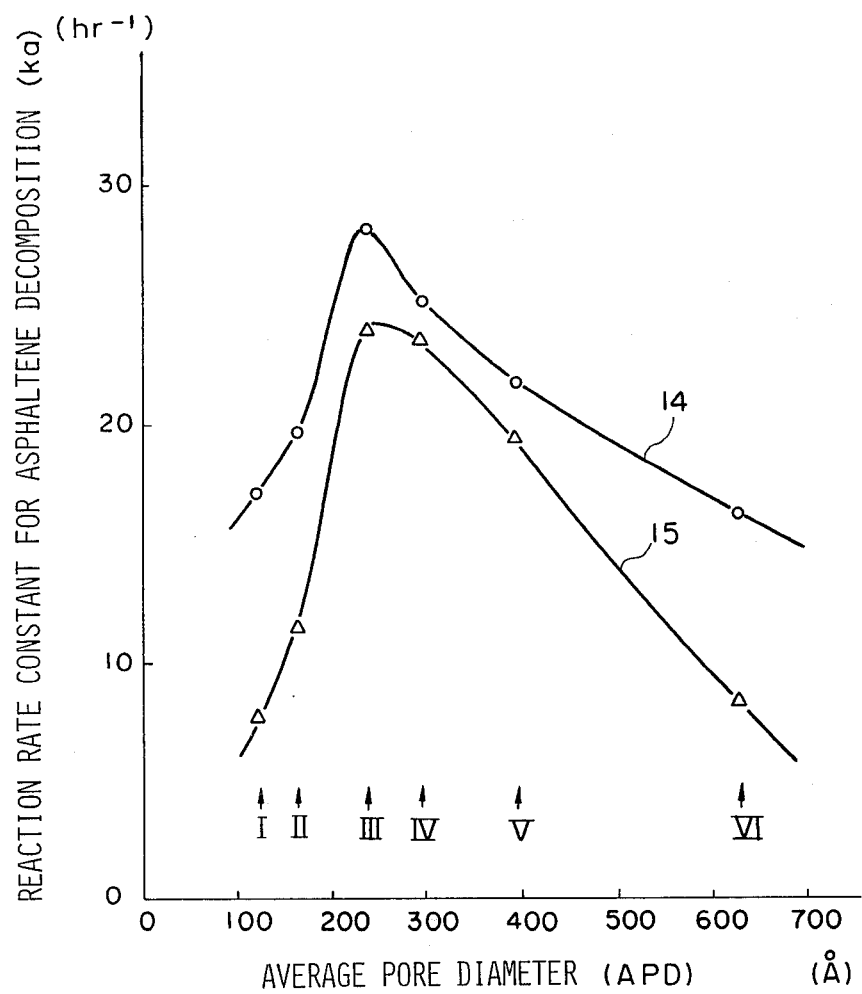
FIG. 5 is a graph showing the reaction rate constant for asphaltene decomposition (Ka) in relation to the average pore diameter (APD)

The test results are graphically shown in FIG. 5, in which curve 14 refers to Boscan crude oil A, and curve 15 to Khafji vacuum residue C. Symbols I, II, III, IV, V and VI refer to the catalysts tested.

It will be understood that the average pore diameter of about 180 Å to about 400 Å provides a satisfactory activity for asphaltene decomposition, and that the range of the average pore diameter which is suitable for asphaltene decomposition hardly differs with the oil to be treated. If the average pore diameter is less than about 180 Å, the diffusion of asphaltene molecules into the pores of the catalyst is seriously inhibited, while a catalyst having an average pore diameter greater than about 500 Å has a reduced surface area which is effective for the reaction, and has its activity lowered sharply by deposition of carbon on its surface. Catalysts III, IV and V fall within the scope of this invention, and have a superior degree of activity for asphaltene decomposition as noted.

Example 2—2

Figure 6:
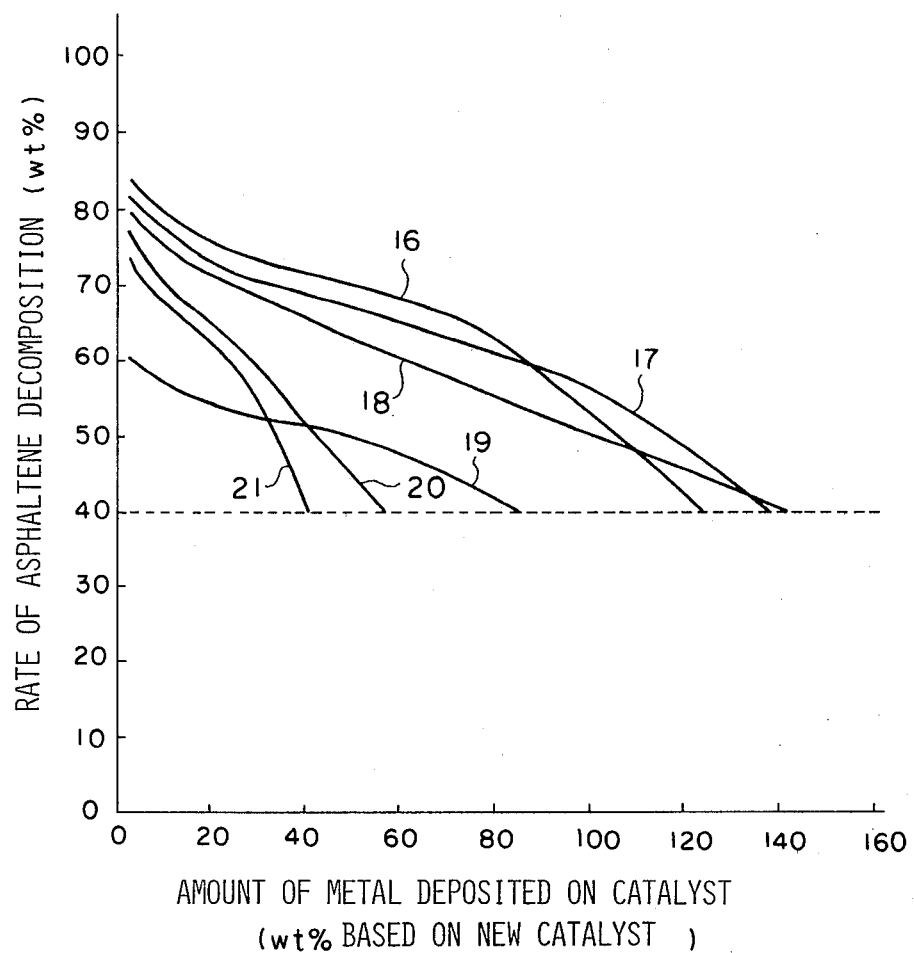
FIG. 6 is another graph showing the relation between the decomposition rate of asphaltenes and the amount of metal deposition on the catalyst.

This set of tests was conducted to examine the stability of the activity of the catalysts. The tests were conducted by treating Boscan crude oil A with Catalysts I to VI under the same conditions as those of Example 2-1 above. The results are shown in FIG. 6, in which curves 16 to 21 refer to Catalysts III, IV, V, VI, II and I, respectively. Table 5 shows the quantity of carbon deposited on the catalyst during each test. This quantity of carbon was determined by washing the catalyst with toluene carefully, drying it at about 80° C. under reduced pressure, picking up a certain amount of a sample, burning it in an oxygen stream at 1,600° C. and measuring the amount of carbon dioxide formed. This method is based on U.O.P. method No. 703-71. This determination was carried out by using a 70 second carbon determinator manufactured by Laboratory Equipment Corporation, U.S.A.

TABLE 5

| | Quantity of Carbon deposited | | | | | |
|---|---|---|---|---|---|---|
| Catalyst | I | II | III | IV | V | VI |
| Dwell time (h) | 340 | 380 | 450 | 840 | 940 | 500 |
| Quantity of carbon deposited (wt % on new catalyst) | 6 | 8 | 12 | 15 | 18 | 40 |

As is obvious from the results of these tests, Catalysts III, IV and V of this invention have a higher activity for asphaltene decomposition than the other catalysts, and a higher degree of stability as they can maintain its activity until after they have had about 80% by weight of metal deposited thereon. Catalyst VI is not only inferior in mechanical strength (crushing strength), but also fails to show satisfactory activity and stability with a large quantity of carbon deposited thereon as is apparent from the analysis of the catalyst used. Although this catalyst has a pore volume which is greater than the limited pore volume defined by the following formula $$PV = \frac{0.46}{1 - (100/APD)^2}$$

its average pore diameter, surface area, and total volume of the pores having a diameter of 180 to 500 Å fail to fall within the ranges defined by this invention. Catalyst I has an average pore diameter and a limited pore volume which are both below the ranges specified by this invention, while Catalyst II, which has a pore volume greater than its limited pore volume, has an average pore diameter which is less than the range specified for this invention. Both of these catalysts show a sharp reduction in activity. Deposition of metal in the pores of the catalyst leads to sharp reduction in the effective diameter, thereby seriously inhibiting the diffusion of asphaltene molecules into the pores. By comparing the test results for Catalysts III, IV and V, it has been found that a catalyst has a high activity for asphaltene decomposition, if its pore volume defined by pores having a diameter of 180 to 400 Å occupies a greater proportion relative to the total pore volume of the pores having a diameter of 180 to 500 Å.

Example 2-3

Figure 7:
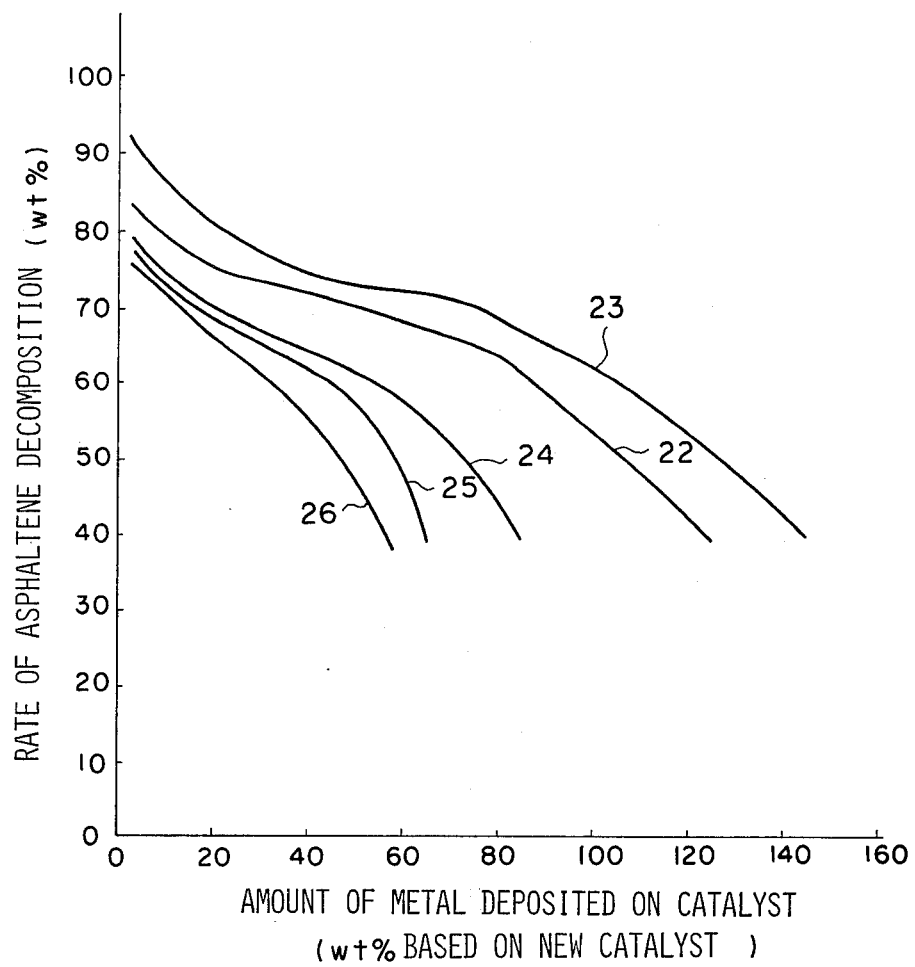
FIG. 7 is still another graph showing the relation between the decomposition rate of asphaltenes and the quantity of metal deposition on the catalyst.

The hydrotreatment of Boscan crude oil A was carried out by using Catalysts III, VII, VIII, IX and X shown in Table 3-1 in order to examine the relation between the stability of the activity of the catalyst and its pores. The conditions for the treatment were equal to those of Example 2—2. The test results are shown in FIG. 7, in which curves 22 to 26 refer to Catalysts III, VII, VIII, IX and X, respectively. Catalyst X has a pore volume which is smaller than its limit pore volume. Its average pore diameter, surface area, and total volume of the pores having a diameter of 180 to 500 Å all fall within the ranges specified by this invention. However, as it hardly shows a satisfactory activity when it has had about 50% by weight of metal deposited thereon, this catalyst is not suitable for the hydrotreatment of a heavy hydrocarbon oil containing asphaltenes. Catalysts VIII, III and VII have higher activity and stability in the order mentioned. Catalysts having a pore volume which is greater than the limit pore volume as specified according to this invention are more efficiently used per unit volume which they fill in a reactor, and suitable for the hydrotreatment of heavy hydrocarbon oils.

Example 2-4

Figure 8:
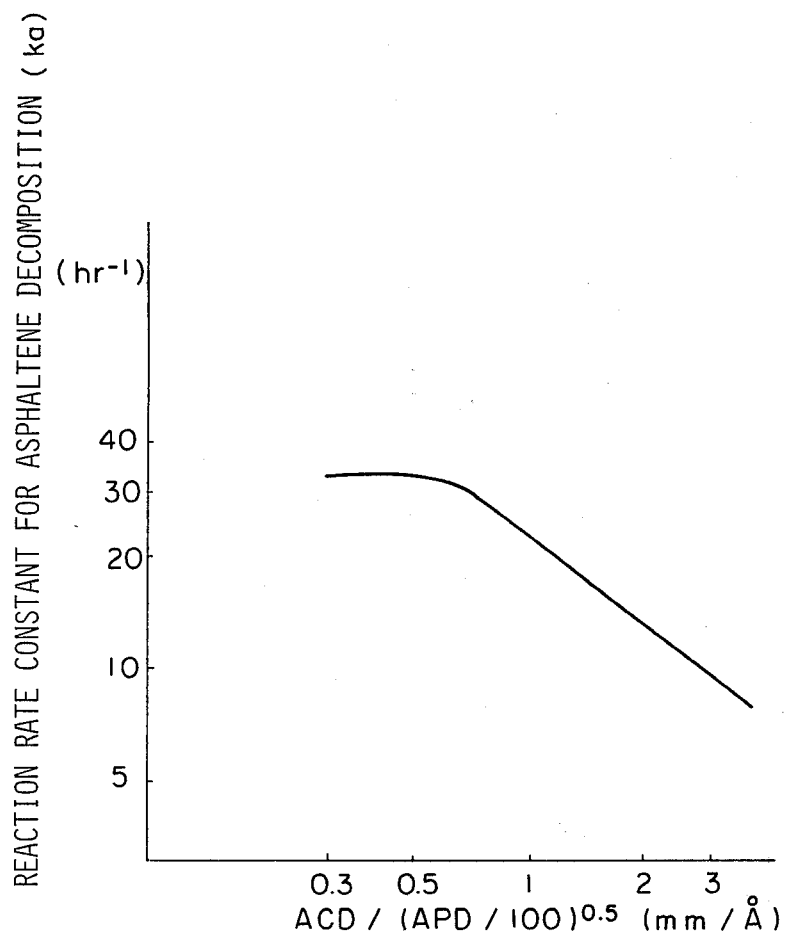
FIG. 8 is a graph showing the reaction rate constant for asphaltene decomposition (ka) in relation to ACD/(APD/100)$^{0.5}$.

The hydrotreatment of Boscan crude oil A was carried out under the same conditions as those set forth in Example 3 above by using Catalysts III prepared in Example 2-3 of Catalyst Preparation and having average catalyst diameters, ACD, of 0.52 mm, 0.69 mm, 1.0 mm, 1.4 mm, 2.1 mm and 4.1 mm, respectively, in order to examine the relation between the particle diameter and its activity. After about 50 hours of operation, the concentration of asphaltene in each oil produced was examined, and attempts were made to determine its relation to the reaction rate constant Ka, i.e., $ACD/(APD/100)^{0.5}$ as shown in Example 2-1. This relation is shown in FIG. 8. It is noted from FIG. 8 that the activity of the catalyst is sharply reduced, if the value of $ACD/(APD/100)^{0.5}$ exceeds about 1.0. Therefore, it is important to ensure that the average catalyst diameter, ACD, of the catalyst be less than the value of $(APD/100)^{0.5}$.

Catalyst Performance Test 3

Various catalysts having an alumina carrier were tested for crushing strength. The results are shown in Table 6. It is noted from Table 6 that no catalyst shows an industrially satisfactory strength greater than about 1.5 kg, if the volume of the pores having a diameter of at least 1,500 Å exceeds about 0.03 cc/g. In other words, the crushing strength of the catalyst is sharply reduced, with an increase in the volume of the pores having a diameter of at least 1,500 Å.

In Table 6, Catalysts No. 2, No. 3, No. 5 and No. 9 correspond to Catalysts III, IV, V and VI, respectively, and Catalysts No. 1, No. 4, No. 6, No. 7 and No. 8 refer to Examples Nos. 16, 17, 18, 19 and 20, respectively.

TABLE 6

Crushing Strength of Catalyst

| No. | ACD (mm) | PV (cc/g) | APD (Å) | Pore Volume* | Crushing Strength (kg) |
|---|---|---|---|---|---|
| 1 | 1.0 | 1.00 | 231 | 0.06 | 1.4 |
| 2 | 1.0 | 0.99 | 240 | 0.02 | 2.6 |
| 3 | 1.0 | 1.04 | 298 | 0.03 | 2.1 |
| 4 | 1.0 | 1.04 | 318 | 0.08 | 1.0 |
| 5 | 1.0 | 1.03 | 396 | 0.02 | 1.9 |
| 6 | 1.0 | 1.08 | 421 | 0.09 | 0.9 |
| 7 | 1.0 | 1.05 | 462 | 0.02 | 1.8 |
| 8 | 1.0 | 1.14 | 540 | 0.06 | 1.2 |
| 9 | 1.0 | 1.03 | 631 | 0.05 | 1.3 |

*Volume (cc/g) of pores having a dia. of at least 1,500 Å.

Catalyst Performance Test 4

Many catalysts having a pore volume less than 0.05 cc/g for pores having a diameter of at least 1,500 Å were tested for crushing strength (SCS), and attempts were made to determine its relation to the average pore diameter, APD, average catalyst diameter ACD and total pore volume PV. As the result, the following relation was established:

$$SCS = 762 \times ACD \times APD^{-0.5} \times e^{-3.95 \times PV/(PV+0.3)}$$

Figure 9:
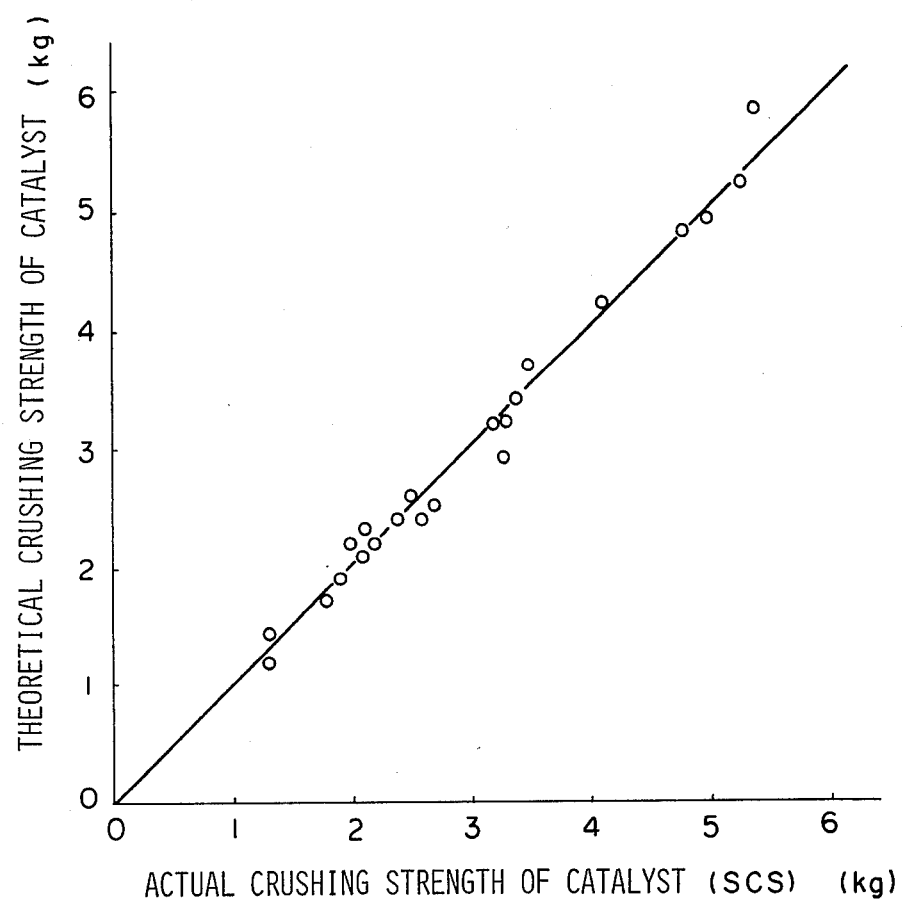
FIG. 9 is a graph comparing the theoretical and actual values for the compressive strength of the catalyst.

FIG. 9 compares the values of strength calculated from this formula, and those which were actually measured. In FIG. 9, each dot on the curve indicates the coincidence of the theoretical and actual values.

Therefore, it is noted that in order to obtain an industrially necessary strength of at least 1.5 kg, a catalyst should have a total pore volume not greater than the value calculated by the following formula:

$$PV = \frac{1.19}{0.5 \ln APD - \ln ACD - 2.28} - 0.300$$

Example 2-5

Boscan crude oil A and Khafji vacuum residue were hydrotreated at a reaction temperature of 405° C., a hydrogen pressure of 140 atm., a LHSV of 0.5 hour$^{-1}$, and a hydrogen to oil ratio (N liter/liter) of 1,000, by using Catalysts III, XI, XII, XIII and XIV having different carriers. Table 7 shows the properties of the oils produced after 50 hours of operation. It is obvious from the results shown in Table 7 that any porous carrier composed of at least one selected from among the elements belonging to Groups II, III and IV of the Periodic Table is effective as a carrier for the catalyst of this invention.

TABLE 7

Properties of oils hydrotreated by various types of carriers

| | Carrier | | | | |
|---|---|---|---|---|---|
| Properties | III | XI | XII | XIII | XIV |
| Feedstock oil A | | | | | |
| Asphaltenes wt % | 1.6 | 1.7 | 1.8 | 2.0 | 2.1 |
| Conradson carbon residue wt % | 7.8 | 6.0 | 8.1 | 6.3 | 6.8 |
| Sulfur wt % | 1.6 | 1.2 | 1.5 | 1.4 | 1.5 |
| Metal ppm | | | | | |
| Ni | 8 | 10 | 9 | 11 | 12 |
| V | 40 | 51 | 50 | 58 | 79 |
| Feedstock oil C | | | | | |
| Asphaltenes wt % | 1.8 | 2.0 | 1.9 | 2.3 | 2.6 |

TABLE 7-continued

| | Properties of oils hydrotreated by various types of carriers | | | | |
|---|---|---|---|---|---|
| | Carrier | | | | |
| Properties | III | XI | XII | XIII | XIV |
| Conradson carbon residue wt % | 9.2 | 9.0 | 10.5 | 9.6 | 9.7 |
| Sulfur wt % | 2.0 | 1.9 | 2.3 | 2.0 | 1.9 |
| Metal ppm | | | | | |
| Ni | 13 | 13 | 14 | 14 | 15 |
| V | 14 | 16 | 18 | 20 | 25 |

Example 2-6

Figure 10:
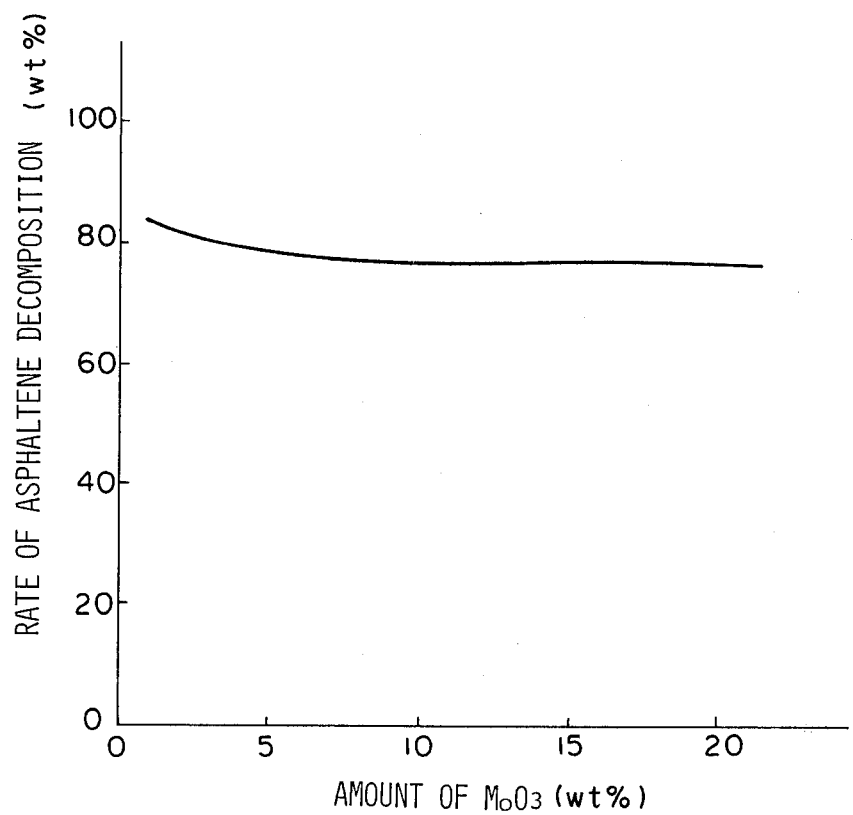
FIG. 10 is a graph showing the relation betwen the decomposition rate of asphaltenes and the amount of $MoO_3$ supported.
Figure 11A:
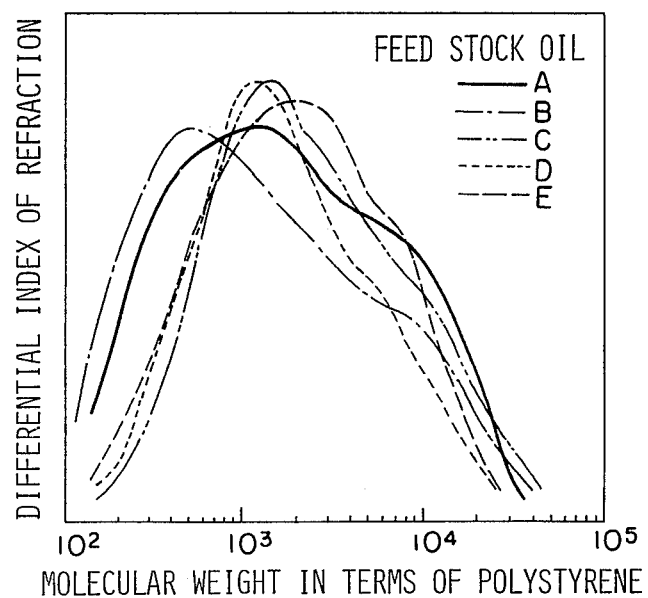
FIG. 11(a) is a graph showing the molecular weight distribution for the oils to be hydrotreated.
Figure 11B:
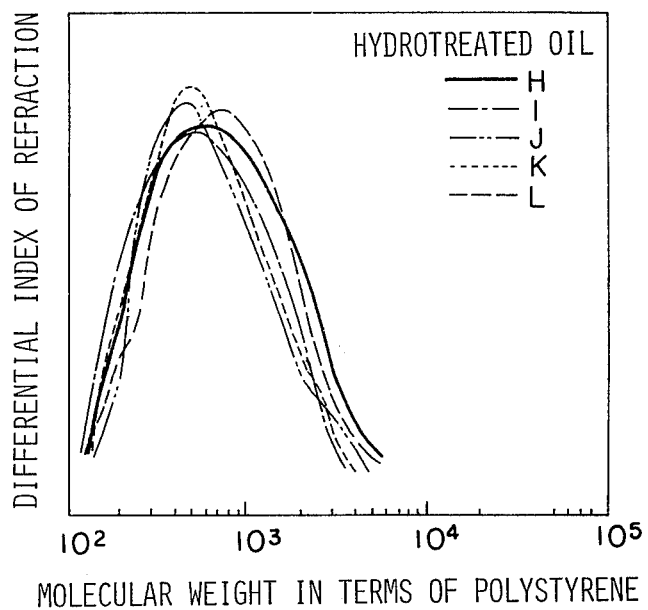
FIG. 11(b) is a graph showing the molecular weight distribution for the oils which have been hydrotreated.

This example was intended for examining the relation between the activity of a catalyst containing only molybdenum as the catalytic metal component, and the amount of the molybdenum supported on an alumina carrier. For this purpose, Boscan crude oil A was hydrotreated at a temperature of 405° C., a hydrogen pressure of 140 atm., a LHSV of 1.0 hour$^{-1}$ and a hydrogen to oil ratio (N liter/liter) of 1,000 by using Catalyst XV, XVI, XVII, XVIII and XIX shown in Table 3-1. The relation between the rate of asphaltene decomposition and the amount of $MoO_3$ was examined after about 50 hours of operation. The results are shown in FIG. 10. These results indicate that such catalysts carrying only molybdenum as the catalytic metal component have a sufficiently high activity for asphaltene decomposition, and that their activity increases with a decrease in the amount of molybdenum.

about 1,000 hours of operation. As is obvious from the results shown therein, the catalysts of this invention show a high rate of asphaltene decomposition irrespective of the feedstock oil involved, and produce oil containing extremely little vanadium and nickel, and reduced quantities of sulfur, nitrogen and Conradson carbon residue, and having a lower molecular weight. Thus, it will be understood that the catalysts of this invention are suitable for hydrotreating heavy hydrocarbon oils as a means for their pretreatment. The oils produced were found to have mostly a molecular weight of about 200 to 2,000, and an average molecular weight not greater than 1,000. As is apparent from their chemical analysis, these oils can be easily formed into a high grade light hydrocarbon oil if hydrotreated with a catalyst having a high activity for reactions, such as hydrodesulfurization and hydrodenitrification. FIG. 11 compares the molecular weight distributions of the feedstock oil and the product obtained by hydrotreatment.

The oils obtained as described above were hydrotreated at a temperature of 390° C., a hydrogen pressure of 140 atm., a LHSV of 0.5 hour$^{-1}$ and a hydrogen to oil ratio (N liter/liter) of 1,000 by using Catalyst XX which was suitable for hydrodesulfurization and hydrodenitrification of oil fractions. Table 9 shows the properties of the oils thereby produced after about 500 hours of operation. The results shown in Table 9 teach that the two-stage hydrotreatment according to this invention is effective for forming low sulfur fuel oil containing only 0.5% by weight of sulfur from a heavy oil containing asphaltenes.

TABLE 8

| | Properties of Hydrotreated oils | | | | |
|---|---|---|---|---|---|
| | Boscan crude oil (II) | Athabasca bitumen (I) | Khafji vacuum residue (J) | Gach Saran vacuum residue (K) | Kuwait vacuum residue (L) |
| Specific gravity API | 20.5 | 17.5 | 14.2 | 14.8 | 13.2 |
| Sulfur wt % | 1.74 | 2.01 | 2.43 | 1.63 | 2.78 |
| Nitrogen wt % | 0.44 | 0.37 | 0.32 | 0.49 | 0.37 |
| Conradson carbon residue wt % | 7.4 | 6.8 | 13.8 | 11.1 | 14.4 |
| Asphaltenes wt % | 1.4 | 2.2 | 4.0 | 1.65 | 1.91 |
| Metal wt ppm | | | | | |
| Ni | 6 | 18 | 12 | 15 | 10 |
| V | 21 | 34 | 16 | 15 | 7 |
| Average mol wt | 850 | 720 | 540 | 555 | 580 |

Example 2-7

The feedstock oils shown in Table 1 were hydrogen treated at a temperature of 405° C., a hydrogen pressure of 140 atm., a LHSV of 0.67 hour$^{-1}$ and a hydrogen to oil ratio (N liter/liter) of 1,000 by using Catalyst VII. Table 8 shows the properties of the oils produced after

TABLE 9

| | Properties of oils treated with two-stage hydrotreating process | | | | |
|---|---|---|---|---|---|
| | Boscan crude oil (II) | Athabasca bitumen (I) | Khafji vacuum residue (J) | Gach Saran vacuum residue (K) | Kuwait vacuum residue (L) |
| Specific gravity API | 22.6 | 22.5 | 19.9 | 21.1 | 19.2 |
| Sulfur wt % | 0.23 | 0.31 | 0.39 | 0.25 | 0.49 |
| Nitrogen wt % | 0.26 | 0.29 | 0.21 | 0.29 | 0.29 |
| Conradson carbon residue wt % | 2.30 | 2.24 | 5.09 | 3.73 | 5.70 |
| Asphaltenes wt % | 0.67 | 1.16 | 2.11 | 0.84 | 1.09 |
| Metal wt ppm | | | | | |
| Ni | 1.3 | 8.3 | 5.5 | 5.8 | 5.2 |
| V | 2.9 | 14.9 | 5.1 | 3.5 | 1.8 |

Example 2-8

This example was intended for showing that the two-stage hydrotreatment according to this invention is highly advantageous for the treatment of heavy oil containing a large quantity of asphaltenes. For this purpose, Khafji vacuum residue was subjected to prolonged two-stage hydrotreatment under the conditions set forth in Table 10 by using Catalyst VII of this invention for the first step of the process, and known desulfurization catalyst XX for the second step. For the sake of comparison, one-stage hydrodesulfurization was carried out under the conditions set forth in Table 10 by using typically known desulfurization catalyst XXI. During these treatments, the reaction temperature was raised with a reduction in the catalyst activity to maintain a sulfur content of about 0.5% in the product. FIG. 12 shows the reaction temperature varying with the lapse of time.

TABLE 10

| Conditions for hydrotreatment | | | |
|---|---|---|---|
| | One-stage hydrodesulfurization | Two-stage hydrodesulfurization | |
| | | First step | Second step |
| Hydrogen pressure (atm.) | 140 | 140 | 140 |
| LHSV (hour$^{-1}$) | 0.2 | 0.6 | 0.3 |
| Hydrogen to oil ratio (N lit./lit.) | 1,000 | 1,000 | 1,000 |

As is apparent from FIG. 12, the reaction temperature reached 425° C. after only about 3,500 hours of operation for one-stage hydrodesulfurization in a conventional manner. The temperature of 425° C. is the level at which an ordinary industrially operating desulfurizer ends its operation. On the other hand, the two-stage hydrodesulfurization according to this invention did not have its reaction temperature reach 420° C. even after about 8,000 hours of operation, and proved itself to be fully capable of operation for as long a time as one year continuously.

Example 2-9

This example is intended for showing that the two-stage hydrotreatment according to this invention makes it possible to produce oil capable of being treated in an ordinary catalytic cracking apparatus, directly from heavy oil containing a large quantity of heavy metals.

Gach Saran atmospheric residue was subjected to two-stage hydrotreatment under the conditions set forth in Table 11 by using the Catalyst VII of this invention for the first step of the process, and Catalyst XXIV obtained by adding boria to desulfurization catalyst XX, and thus having an increased activity for denitrification and reduction of Conradson carbon residue, for the second step.

TABLE 11

| Conditions for two-stage hydrotreatment | | |
|---|---|---|
| | First step | Second step |
| Reaction temp. (°C.) | 405 | 405 |
| Hydrogen pressure (atm.) | 140 | 140 |
| LHSV (hr$^{-1}$) | 0.6 | 1.2 |
| Hydrogen to oil ratio (N liter/liter) | 1,000 | 1,000 |

Table 12 shows the properties of the oil produced after about 500 hours of operation for the two-stage treatment. The oil thus produced had a total vanadium and nickel content not greater than 10 ppm, and a Conradson carbon residue content not greater than 4% by weight. This oil is, thus, suitable for catalytic cracking.

TABLE 12

| Properties of oil produced | |
|---|---|
| Properties | Feedstock oil F |
| Specific gravity (°API) | 21.1 |
| Sulfur (wt %) | 0.39 |
| Nitrogen (wt %) | 0.21 |
| Conradson carbon residue (wt %) | 3.7 |
| Asphaltenes (wt %) | 0.3 |
| Metals (wt ppm): Nickel | 1.4 |
| Vanadium | 0.3 |

Example 2-10

This example shows a combination of the two-stage process with other processes, which is intended for obtaining light oil containing substantially no asphaltene or heavy metal, from heavy oil containing a large quantity of asphaltenes. Tests were conducted by using a pilot plant constructed by connecting a solvent deasphalting process directly with the first step of the two-stage process, so that the heavy fraction leaving the deasphalting process could be recycled into the first step, and the light oil leaving the deasphalting process could be subjected to the second step of treatment.

Khafji vacuum residue C was supplied at a flow rate of 170 cc per hour, and mixed with a gas rich in hydrogen, so that a hydrogen to oil ratio (N liter/liter) of 1,000 could be obtained. This mixture was pre-heated, and supplied for the first step treatment. The first step treatment was carried out by using a co-current downward flow type reactor provided with a reaction vessel having an inside diameter of 50 mm, a length of 3,000 mm and a relatively thick stainless steel wall, and filled with 660 cc of Catalyst VII of this invention. The conditions for the first step hydrotreatment were as shown in Table 13.

The product of the first step treatment was separated into a gas which was rich in hydrogen, and a substantially liquid reaction product. The gas-liquid separation was carried out at 150° C. and a pressure which was substantially equal to that which had prevailed in the reaction vessel. The gas rich in hydrogen was cleaned of its impurities, such as hydrogen sulfide and ammonia, in an amine washing apparatus, and reused after it was mixed with the makeup hydrogen gas to be fed into the reaction process. About 10% of gas was removed from the system in which the gas containing light hydrocarbon gas was being circulated, so that no undue elevation in the concentration of such light hydrocarbon gas might occur. The liquid reaction product was delivered into the deasphalting process.

TABLE 13

| Conditions for hydrotreatment | | |
|---|---|---|
| | First step | Second step |
| Reaction temp. (°C.) | 405 | 380 |
| Hydrogen pressure (atm.) | 140 | 90 |
| LHSV (hr$^{-1}$) | 0.25* | 1.0 |
| Hydrogen to oil ratio (N liter/liter) | 1,000 | 1,000 |

*LHSV for new material

Deasphalting was carried out by using n-butane as a solvent, and at a solvent ratio of 7, an overhead extraction temperature of 135° C., a bottom extraction temperature of 125° C. and a pressure of 40 atm. The greater part of the liquid reaction product obtained above was separated into the solvent phase. The solvent phase was introduced into a solvent recovery apparatus, and the solvent was separated by evaporation, whereby light oil containing substantially no asphaltene or heavy metal was obtained. The heavy fraction remaining undissolved in the solvent was raised in pressure by heating at about 250° C., and recycled into the first step of the hydrotreating process.

Deasphalting was carried out by a rotary disc extraction column comprising a column having an inside diameter of 28 mm and a height of 690 mm, and provided internally with 102 discs each having a diameter of 18 mm, and a stationary zone attached to the bottom of the column, and having an inside diameter of 53.5 mm and a height of 515 mm. The heavy fraction from the deasphalting step was recycled into upstream of the zone where the oil was mixed with the gas rich in hydrogen.

The operation could be continued for about 600 hours. There was obtained high grade light oil containing extremely little asphaltene and heavy metal. Its properties are shown in Table 14. The light oil could be produced with a yield of at least 94.5% by weight, and the hydrogen consumption was 820 SCF/BBL. A considerable degree of desulfurization took place in addition to the decomposition of asphaltene and removal of metal during the first step of treatment. In this example, a desulfurization rate of about 58% was observed.

The light oil thus obtained was, then, subjected to the second step hydrotreatment under the conditions set forth in Table 13 in the presence of Catalyst XXIV, using an apparatus similar to that which had been used for the first step. Table 14 shows the properties of the oil obtained after about 300 hours of operation. The oil showed a yield of 92.6% by weight of the feedstock oil, with a hydrogen consumption of 455 SCF/BBL.

TABLE 14

| Properties of hydrotreated oil | | |
|---|---|---|
| | Product from first step | Product from second step |
| Specific gravity (°API) | 17.8 | 23.7 |
| Sulfur (wt %) | 2.11 | 0.21 |
| Nitrogen (wt %) | 0.31 | 0.10 |
| Conradson carbon residue (wt %) | 5.72 | 2.03 |
| Asphaltenes (wt %) | trace | trace |
| Metal (ppm): Nickel | 0.4 | 0.03 |
| Vanadium | 0.1 | 0.01 |

The light oil ultimately obtained by the foregoing treatment contained substantially no asphaltenes, and had a very low metal content. Thus, it provides an ideal starting material for ordinary hydrocracking, fluidized catalytic cracking, and the like.

Example 3-1 (Cracking of hydrotreated oil)

The oil obtained by treatment with hydrogen as set forth in Example 2-9 was tested for catalytic cracking by using a riser type pilot plant. The pilot plant consisted mainly of a catalyst feeding tank, a riser reactor, a stripper and a product recovery system. The catalyst was a commercially available equilibrium catalyst composed of zeolite dispersed in amorphous silica-alumina, and containing 60.4% by weight of $SiO_2$, 36% by weight of $Al_2O_3$, 2.8% by weight of $Re_2O_5$, 0.5% by weight of Na, 20 ppm of Ni, 40 ppm of V and 2,700 ppm of Fe. The catalyst in the feeding tank was maintained in fluidized form on a nitrogen stream, discharged through an orifice at the bottom of the tank, and introduced into the feedstock oil feeding zone. The catalyst was mixed with the oil supplied in atomized form through a spray nozzle, and the mixture was delivered into the riser reactor, in which the catalyst caused cracking of the oil. The riser reactor comprised a stainless pipe having an inside diameter of 3.2 mm and a length of 35 m, and which was, as a whole, held at a constant temperature by a salt bath containing barium chloride. The operating conditions were controlled as shown in Table 15.

Table 16 shows a typical yield of the product obtained after about five hours of normal operation under the conditions set forth in Table 15. The gasoline thus obtained had a research octane number of 91.0.

TABLE 15

| Conditions for reaction | |
|---|---|
| Reaction zone temp. | About 530° C. |
| Stripper temp. | About 530° C. |
| Catalyst feeding tank temp. | About 650° C. |
| Oil retention time in riser pipe | 4.5 sec. |
| Catalyst/oil weight ratio | 9.5 |
| Oil flow rate | 540 g/h |

TABLE 16

| Yield of product and conversion ratio | |
|---|---|
| Debutanized gasoline | 55.0 vol. % |
| Total $C_4$ | 14.3 vol. % |
| Total $C_3$ | 13.0 vol. % |
| $C_2^-$— | 5.2 wt % |
| Conversion rate (430° F.) | 78.4 wt % |

Example 3-2 (Cracking of hydrotreated oil)

The oil produced as set forth in Example 2-10 (of which the properties are shown in Table 14) was subjected to hydrocracking by using Catalyst XX and the apparatus which had been used for the second step of hydrotreatment in Example 2-10. The reaction was caused to take place at a temperature of 420° C., a hydrogen pressure of 180 atm., a LHSV of 0.3 hour$^{-1}$ and a hydrogen to oil ratio (N liter/liter) of 1,000. The yields of the products obtained by hydrocracking and their properties are shown in Tables 17 and 18, respectively. Naphtha, kerosene and light oil showed a total yield of 69.8 vol. %, with a hydrogen consumption of 1,740 SCF/BBL.

TABLE 17

| Yields of products obtained by hydrocracking | |
|---|---|
| $H_2$ wt % | −2.7 |
| (SCF/BBL) | 1,740 |
| $H_2S$ + $NH_3$ wt % | 0.3 |
| $C_1$-$C_4$ wt % | 2.0 |
| Naphtha vol % | 21.6 |
| ($C_5$-350° F.) | |
| Kerosene vol % | 15.7 |
| (350-450° F.) | |
| Light oil vol % | 32.5 |
| (450-650° F.) | |
| Atmospheric residue | 46.9 |
| (650° F.+) vol % | |

TABLE 18

| | Properties of oils obtained by hydrocracking | | | |
|---|---|---|---|---|
| | Specific gravity API | Sulfur ppm | Nitrogen ppm | Aniline point °C. |
| Naptha (C$_5$-350° F.) | 56.7 | trace | 3 | 50 |
| Kerosene (350-450° F.) | 40.0 | 4 | 5 | 48 |
| Light oil (450-650° F.) | 34.8 | 15 | 24 | 54 |
| Atmospheric residue (650° F.$^+$) | 26.6 | 110 | 290 | 84 |

Example 2-11 (Hydrotreatment)

This example is directed to the preparation of the catalyst of this invention in the reaction system.

Boscan crude oil A was hydrotreated at a temperature of 405° C., a hydrogen pressure of 140 atm., a LHSV of 1.0 hour$^{-1}$ and a hydrogen to oil ratio (N liter/liter) of 1,000 in the presence of the alumina carrier XV of this invention on which no catalytic metal component was supported. The results shown in FIG. 13 were obtained. It will be noted from FIG. 13 that the alumina carrier showed an increasing activity for asphaltene decomposition with an increase in the deposition of vanadium (vanadyl sulfide), and this activity remained substantially constant after the amount of vanadium deposited on the carrier exceeded about 10% by weight. Thus, the catalytic metal component for the catalyst of this invention does not always need to be attached to the carrier outside the reaction system, but may be appropriately formed within the reaction system, if vanadium and other metals contained in the feedstock oil are utilized. More specifically, a carrier which satisfies the requirements specified by this invention is brought into contact with a heavy hydrocarbon oil containing at least 200 ppm by weight of vanadium in a hydrogen atmosphere at a temperature of 350° C. to 450° C. and a hydrogen pressure of 50 to 250 atm., so that at least about 10% by weight of vanadium may be deposited on the carrier, and activated, whereby a catalyst having a desired activity can be formed in situ.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for hydrotreating a heavy hydrocarbon oil containing asphaltenes, said process comprising the step of:
reacting the heavy hydrocarbon oil with hydrogen at a temperature of between 300° and 500° C., a hydrogen pressure of between 50 and 250 atm. and a liquid space velocity of between 0.1 and 10 hour$^{-1}$ in the presence of a catalyst comprising:
a porous carrier composed of one or more inorganic oxides of at least one member selected from the group consisting of the elements belonging to Groups II, III and IV of the Periodic Table; and
one or more catalytic metal components composited with said carrier, the metal of said catalytic metal components being selected from the group consisting of the metals belonging to groups VB, VIB, VIII and IB of the Periodic Table, said catalytic metal components being present in an amount of between about 0.1% and about 30% in terms of metal oxide based on the total weight of said catalyst, said catalyst having the following pore characteristics (a)-(c) with regard to its pores having a diameter of 75 Å or more:
(a) an average pore diameter APD being between about 180 and about 500 Å,
(b) a total pore volume PV in terms of cc/g being at least a value X calculated according to the following equation:

$$X = \frac{0.46}{1 - \left(\frac{100}{APD}\right)^2}$$

the volume of pores with a diameter of between about 180 and about 500 Å being at least about 0.35 cc/g, the volume of pores with a diameter of at least 1500 Å being not greater than about 0.03 cc/g, and
(c) a total surface area SA being at least about 104 m$^2$/g, said catalyst having an average catalyst diameter ACD of at least about 0.6 mm.

2. A process as set forth in claim 1, wherein said total volume PV is not greater than a value X' calculated according to the following equation:

$$X' = \frac{1.19}{0.5 \ln APD - \ln ACD - 2.28} - 0.300$$

where ln is a symbol representing a natural logarithm.

3. A process as set forth in claim 1, wherein said average pore diameter APD is between 180 Å and 400 Å, said total pore volume PV being between 0.5 cc/g and 1.5 cc/g, said total surface area SA being at least 104 m$^2$/g, the volume of pores with a diameter of not greater than 100 Å being not greater than 0.1 cc/g, said average catalyst diameter ACD being between about 0.6 mm and about 1.5 mm.

4. A process as set forth in claim 1, wherein the volume of pores having a diameter of between 180 Å and 400 Å is at least a half of the total volume of pores having a diameter of between 180 Å and 500 Å.

5. A process as set forth in claim 1, wherein said inorganic oxide is at least one member selected from the group consisting of alumina, silica, titania, boria, zirconia, silica-alumina, silica-magnesia, alumina-magnesia, alumina-titania, silica-titania, alumina-boria, alumina-zirconia and silica-zirconia.

6. A process as set forth in claim 1, wherein the metal of said one or more catalytic metal components is at least one member selected from the group consisting of vanadium, chromium, molybdenum, tungsten, cobalt, nickel and copper, said catalytic metal components being in the form of an elemental metal, an oxide, a sulfide or a mixture thereof.

7. A process as set forth in claim 1, further comprising separating the product from step (a) into a hydrogen-rich gas and a liquid product, separating said liquid product into a substantially asphaltene-free and heavy metal-free light oil fraction and a heavy fraction, and recycling said heavy fraction to step (a).

8. A process as set forth in claim 7, wherein said heavy hydrocarbon oil contains at least 2% by weight of asphaltenes and at least 80 ppm by weight of nickel and vanadium.

9. A process as set forth in any one of claims 1 through 4, further comprising the step of:

(b) reacting at least a part of the product from step (a) with hydrogen at a temperature of between 300° and 500° C., a hydrogen pressure of between 50 and 250 atm. and a liquid space velocity of between 0.1 and 10 hours$^{-1}$ in the presence of a catalyst including a porous carrier containing alumina and having composited therewith a combination of first and second catalytic metal components, the metal of said first catalytic metal component being at least one member selected from the group consisting of the metals belonging to Group VIB of the Periodic Table, the metal of said second catalytic metal component being at least one member selected from the group consisting of the metals belonging to Group VIII of the Periodic Table, said catalyst having, with regard to its pores with a diameter of 75 Å or more, the properties of: an average pore diameter being between about 80 and about 250 Å a total pore volume being between about 0.4 and about 1.5 cc/g, and a total surface area being between about 100 and about 400 m$^2$/g.

10. A process as set forth in claim 9, wherein the metal of said first catalytic metal component of the catalyst of step (b) is selected from the group consisting of chromium, molybdenum and tungsten, and the metal of said second catalytic metal component of the catalyst of step (b) is selected from the group consisting of cobalt and nickel, said first and second catalytic metal component being present in amounts of between about 2 and about 40% by weight and between about 0.1 and about 10% by weight, in terms of oxide, based on the total weight of said catalyst of step (b), respectively.

11. A process as set forth in claim 9, wherein the catalyst of step (b) further includes an auxiliary catalytic component containing at least one member selected from the group consisting of titanium, boron, phosphorus and fluorine.

12. A process as set forth in claim 11, wherein said auxiliary catalytic component is selected from the group consisting of boron phosphate, boron fluoride and a mixture thereof.

13. A process as set forth in claim 9, wherein said alumina-containing carrier of the catalyst of step (b) is alumina or silica-alumina.

14. A process as set forth in claim 9, wherein a part of the reaction product from step (a) is separated into a hydrogen-rich gas and a liquid product, said liquid product being separated into a substantially asphaltene-free and heavy metal-free light oil fraction and a heavy fraction, said heavy fraction being recycled to step (a).

15. A process as set forth in claim 9, wherein the reaction product from step (b) is separated into a hydrogen-rich gas and a liquid product, said liquid product being separated into a substantially asphaltene-free and heavy metal-free light oil fraction and a heavy fraction, said heavy fraction being recycled to step (a) or (b).

* * * * *